United States Patent
Mitsuhashi et al.

[11] Patent Number: 6,093,345
[45] Date of Patent: Jul. 25, 2000

[54] OPTICALLY ACTIVE COMPOUND, LIQUID CRYSTAL COMPOSITION CONTAINING THE SAME, AND LIQUID CRYSTAL ELECTRO-OPTIC ELEMENT USING THE SAME

[75] Inventors: Shigeru Mitsuhashi; Yoshimasa Matsushima, both of Tokyo; Takashi Imai, Kanagawa; Kiichi Mori, Kanagawa; Mamoru Yamada, Kanagawa; Hiroshi Sugiyama, Tokyo; Misao Yagi, Tokyo; Hitoshi Kondo, Tokyo; Toshimitsu Hagiwara, Tokyo, all of Japan

[73] Assignee: Takasago International Corporation, Tokyo, Japan

[21] Appl. No.: 08/091,406

[22] Filed: Jul. 14, 1993

Related U.S. Application Data

[63] Continuation of application No. 07/779,528, Oct. 18, 1991, abandoned.

[30] Foreign Application Priority Data

Oct. 19, 1990 [JP] Japan ..................................... 2-279079

[51] Int. Cl.[7] ........................ C09K 19/34; G02F 1/133; C07C 41/00; C07D 239/02
[52] U.S. Cl. ...................... 252/299.61; 568/630; 349/18; 544/298
[58] Field of Search ...................... 252/299.61; 568/630; 349/182; 544/298

[56] References Cited

U.S. PATENT DOCUMENTS

| | | | |
|---|---|---|---|
| 4,728,458 | 3/1988 | Higuchi et al. | 252/299.65 |
| 4,732,699 | 3/1988 | Higuchi et al. | 252/299.66 |
| 4,786,730 | 11/1988 | Shibata et al. | 544/335 |
| 4,866,199 | 9/1989 | Shibata et al. | 560/65 |
| 4,873,018 | 10/1989 | Nohira et al. | 252/299.01 |
| 4,911,861 | 3/1990 | Higuchi et al. | 252/299.65 |
| 4,954,600 | 9/1990 | Hachiya et al. | 528/89 |
| 5,051,506 | 9/1991 | Wand et al. | 544/289 |
| 5,100,579 | 3/1992 | Higuchi et al. | 252/299.65 |
| 5,120,468 | 6/1992 | Saito et al. | 252/299.61 |
| 5,124,068 | 6/1992 | Krause et al. | 252/299.61 |
| 5,130,048 | 7/1992 | Wand et al. | 252/299.01 |
| 5,167,855 | 12/1992 | Wand et al. | 252/299.01 |
| 5,180,520 | 1/1993 | Wand et al. | 252/299.61 |

FOREIGN PATENT DOCUMENTS 267585  5/1988  European Pat. Off. .

*Primary Examiner*—C. H. Kelly
*Attorney, Agent, or Firm*—Sughrue, Mion, Zinn, Macpeak & Seas, PLLC

[57] ABSTRACT

An optically active compound represented by formula (I):

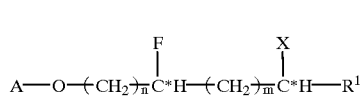

wherein A represents

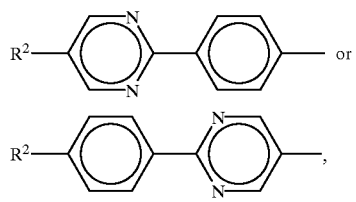

wherein $R^2$ represents an alkyl group having from 8 to 12 carbon atoms; $R^1$ represents a straight chain alkyl group having from 2 to 5 carbon atoms; X represents a fluorine atom or a methyl group; n represents 1 or 2; m represents an integer of from 0 to 3; and C* represents an asymmetric carbon atom, and a liquid crystal composition containing the same are disclosed. The compound exhibits large spontaneous polarization and low viscosity and, when added to an achiral base liquid crystal composition, induces a chiral nematic phase in which the helical pitch has small temperature dependence.

3 Claims, No Drawings

OPTICALLY ACTIVE COMPOUND, LIQUID CRYSTAL COMPOSITION CONTAINING THE SAME, AND LIQUID CRYSTAL ELECTRO-OPTIC ELEMENT USING THE SAME

This is a Continuation of application Ser. No. 07/779,528 filed Oct. 18, 1991 abandoned.

FILED OF THE INVENTION

This invention relates to a novel optically active compound and a liquid crystal composition containing the same which can be used in liquid crystal electro-optic elements. More particularly, it relates to an optically active compound having two asymmetric carbon atoms, at least one of which is substituted with a fluorine atom, and to a liquid crystal composition containing the same.

BACKGROUND OF THE INVENTION

Liquid crystal displays have been used in various embodiments such as watches and desk calculators because of their flatness, lightness, and low electric power consumption. With the advancement of integrated circuits (IC), liquid crystal displays have been increasing the display size and extending their use in computers, liquid crystal TV sets, etc. in place of conventional cathode-ray tubes.

However, nematic liquid crystals which have conventionally been used have a slow response time of from 10 to 50 milli-seconds and also undergo a reduction in display contrast ratio with increases in number of pixels and in display area.

In the state-of-the-art liquid crystal displays, the above-described disadvantages are coped with by fitting each pixel with a thin film transistor (TFT) to achieve so-called active matrix driving or by increasing the angle of twist of liquid crystal molecules sandwiched between a pair of substrates to 220° to 270° (called super-twisted nematic: STN).

Mounting of TFT according to the former means not only entails very high cost but has a poor yield, resulting in an increased production cost. Cost reduction by introducing a large-scale production line having been studied, there is a limit due to essential involvement of many production steps. Further, ever since the appearance of high-definition televisions (HDTV), there has been an increasing demand of liquid crystal displays making a high-density display. In nature of TFT and nematic liquid crystals, it is nevertheless considered very difficult to increase display density.

On the other hand, although the STN mode exhibits an increased contrast ratio, it has a slow response time of from 100 to 200 milliseconds and is thus limited in its application.

It has therefore been keenly demanded to develop a liquid crystal element which achieves high-density displaying at a fast response time. Perroelectric liquid crystal display elements form the nucleus of such expectations.

Ever since the report of N. A. Clark, et al. on surface-stabilized ferroelectric liquid crystal devices (SSFLD) (refer to N. A. Clark, et al., *Appl. Phys. Lett.*, Vol. 36, p. 899 (1980), extensive studies have been directed to ferroelectric liquid crystals with the attention on their fast response time. However, ferroelectric liquid crystal display elements have not yet been put to practical use due to problems of response time, molecular orientation, etc. still remaining unsolved. For example, the molecular orientation of ferroelectric liquid crystals proved more complicated than suggested by Clark, et al. That is, the director of liquid crystal molecules is apt to be twisted in smectic layers, with which a high contrast cannot be obtained. Further, the layers have been believed to be aligned upright and perpendicular to the upper and lower substrates (bookshelf structure) but, in fact, were found to have a bent structure (chevron structure). As a result, zigzag defects appear to reduce a contrast ratio. As an approach to solutions to these orientation problems, improved orientation methods have recently been proposed, such as-use of an oblique SiO-deposited cell.

With respect to response time, it was believed in the early stage of studies that ferroelectric liquid crystal elements have a response in several microseconds. In fact, however, the highest of the so far reached response times is only several tens of microseconds. That is, in ferroelectric liquid crystal elements, since a response time of one pixel decides a refreshing time of a display unlike nematic liquid crystal elements, advantages of ferroelectric liquid crystals cannot be made full use of unless a fast response time of from 20 to 30 microseconds or less is reached.

A response time is considered dependent on spontaneous polarization and rotational viscosity of liquid crystal materials and intensity of the applied electric field. Considering a limit of voltage which can be applied in practice with IC, an improvement in response time should be realized through optimization of rotational viscosity and spontaneous polarization of liquid crystal materials. Under the present situation, sufficiently fast response time has not yet been obtained.

Hence, a search has been made preponderantly for liquid crystal compounds having large spontaneous polarization and low rotational viscosity. However, compounds exhibiting high spontaneous polarization generally have high viscosity, and few compounds satisfying both of these requirements have been discovered.

In general, a ferroelectric liquid crystal material comprises an achiral base liquid crystal composition showing a smectic C phase (Sc phase) to which optically active compounds called chiral dopants are added to form a ferroelectric liquid crystal composition. This is because, for one thing, performance requirements cannot be satisfied by a single material and, for another thing, it is aimed at to allot each of required performance properties to each compound so as to make a mixed system as simple as possible taking advantage of the fact that various physical properties including orientation vary depending on the structure of liquid crystal compounds used. Namely, in order to satisfy many physical properties required for ferroelectric liquid crystals, it is advantageous to divide the functions among components as simply as possible. In many cases, phenylpyrimidine type liquid crystal compounds having advantageous viscosity properties are utilized as an achiral base. In actual use, however, properties of the resulting ferroelectric liquid crystal composition, such as viscosity and response time, greatly vary depending on the properties of optically active compounds added thereto. Accordingly, an optically active compound to be added is required to exhibit moderate spontaneous polarization and low viscosity to provide a liquid crystal composition exhibiting a fast response time while giving no adverse influence on the performance of the achiral base, such as a temperature range.

Further, in order to obtain satisfactory orientation, ferroelectric liquid crystals are often required to have a smectic A phase (SA phase) in which orientation can be effected with relative ease and, if possible, a nematic phase in a higher temperature range. This being the case, when a chiral dopant is added to an achiral base having a phase sequence of isotropic, nematic, SA, and Sc phases, the N and Sc phases become a chiral nematic phase (N* phase) and a chiral smectic C phase (Sc* phase), respectively, in each of which a helical structure is induced.

In order that the ferroelectric liquid crystals show satisfactory orientation and satisfactory bistability for use as a ferroelectric liquid crystal electro-optic element, each of the N* and Sc* phases should have a helical pitch several times longer than the cell thickness. To achieve this, addition of only one kind of a chiral dopant is not sufficient, and it is necessary to use a chiral dopant in combination with an optically active compound showing an opposite helical sense. Besides, every optically active compound has its own direction, positive or negative, in spontaneous polarization. The helical sense of the N* and Sc* phases and the direction of spontaneous polarization are independently decided by the structure of an optically active compound without being correlated to each other. Therefore, mixing of optically active compounds makes the problem more complicated.

Hence, it is required to control the helix in the N* and Sc* phases with optically active compounds of as small kinds as possible while obtaining effective spontaneous polarization.

The problem to be considered here is temperature dependence of the helical pitch in the N* and Sc* phases induced by a chiral dopant. The helical pitch is required not only to be sufficiently longer over the cell thickness as mentioned above but to have small temperature dependence. Even with a sufficiently long helical pitch, large temperature dependence would result in great variation of orientation.

Thus, optically active compounds and compositions thereof for use in ferroelectric liquid crystal elements are demanded to satisfy a variety of performance properties. Accordingly, an optically active compound which responds at a fast time, gives no noticeable influence on the temperature range of an achiral base, and has small temperature dependence of the helical pitch is of great importance for further advancement of ferroelectric liquid crystals. For the time being, only a few of such compounds have been reported.

On the other hand, an optically active compound is also used as a chiral dopant in nematic liquid crystal materials for use in nematic liquid crystal displays. Such an optically active compound is needed for preventing occurrence of so-called reverse domains in which liquid crystal molecules are twisted to an opposite direction and also for stably maintaining the angle of twist of molecules in the cell. Therefore, the above-mentioned importance of temperature dependence of a helical pitch in an N* phase-also applies to a chiral dopant to be added to nematic liquid crystals used in twisted nematic (TN) and also STN mode display elements. For example, if a chiral dopant to be used shows high positive dependence on temperature (i.e., the pitch is broadened with an increase in temperature), it must be mixed with a chiral dopant having an opposite tendency to offset the temperature dependence, which makes the chiral dopant mixing system more complicated.

Further, chiral dopants currently used for nematic liquid crystals comprise a mixture of at least 4 kinds of optically active compounds for the purpose of controlling the helical pitch in the N* phase and reducing the temperature dependence of the helical pitch. Not a few of these optically active compounds exhibit no liquid crystalline properties and, when added to a nematic liquid crystal, cause a drop of the nematic phase-isotropic phase transition temperature.

SUMMARY OF THE INVENTION

An object of the present invention is to provide an optically active compound which has a large spontaneous polarization, a low viscosity, and a fast response time, whose helical pitch shown in the N* phase, etc. has small temperature dependence, and which is suitable for use in ferroelectric liquid crystal materials required to satisfy various performance properties at a time.

Another object of the present invention is to provide an optically active compound useful as a chiral dopant for nematic liquid crystals to induce a chiral nematic phase whose helical pitch shows small temperature dependence.

The inventors have conducted extensive investigations to develop a compound which has large spontaneous polarization and low viscosity for accomplishing a fast response time of ferroelectric liquid crystal materials and which, when added to an achiral base liquid crystal composition, exhibits an N* phase whose helical pitch has small temperature dependence, and thus reached the present invention.

The present invention relates to an optically active compound represented by formula (I):

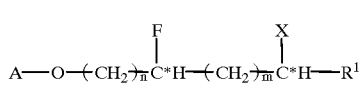

(I)

wherein A represents

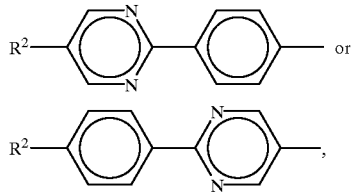

wherein $R^2$ represents an alkyl group having from 8 to 12 carbon atoms; $R^1$ represents a straight chain alkyl group having from 2 to 5 carbon atoms; X represents a fluorine atom or a methyl group; n represents 1 or 2; m represents an integer of from 0 to 3; and C* represents an asymmetric carbon atom.

The present invention also relates to a liquid crystal composition containing at least one compound represented by formula (I).

The present invention further relates to a liquid crystal electro-optic element using a liquid crystal composition containing at least one compound represented by formula (I).

DETAILED DESCRIPTION OF THE INVENTION

Known optically active compounds relevant to the compounds of the present invention include 2-fluoro-substituted compounds shown below:

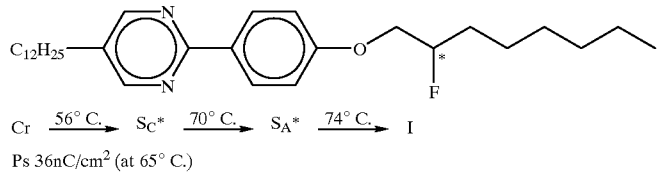

(refer to JP-A-63-22042 (the term "JP-A" as used herein means an "unexamined published Japanese patent application"), JP-A-1-207280, Nohira, et al. Dai 13-kai Ekisho Toronkai Yokoshu, IZ02 (1987))

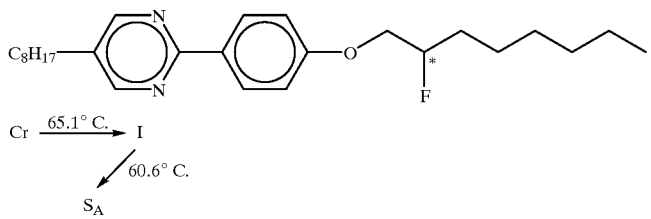

(refer to JP-A-63-190842)

These 2-fluoro compounds have a relatively large spontaneous polarization (Ps) and a fast response time. However, as described in JP-A-63-190842, the helical pitch in the N* phase has considerable negative temperature dependence, which is an unfavorable property for use as a chiral dopant.

2-Fluoro-substituted optically active compounds shown below are also relevant to the present invention:

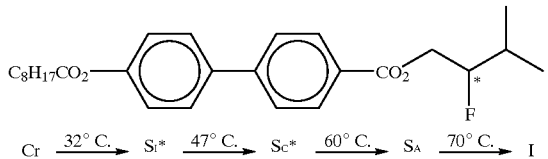

(refer to JP-A-62-111939)

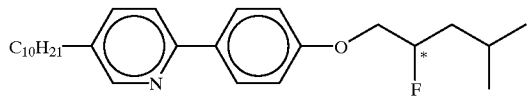

m.p.: 77–78° C.
(refer to JP-A-63-190842)

Of these compounds, that disclosed in JP-A-62-111939 exhibits a relatively large spontaneous polarization (72 nC/cm$^2$) similarly to the above described 2-fluoro-substituted compounds. However, as the inventors of the present invention previously demonstrated in JP-A-2-36154, compounds having an ester type core structure have a slow response time. An improvement on this point seems to appear in the compound proposed in JP-A-63-190842. The publication giving no description about liquid crystalline properties and physical properties of the compound, the inventors of the present invention synthesized the following compound for comparison.

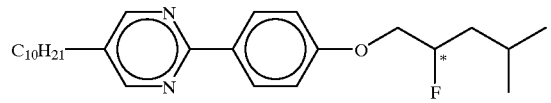

As a result of comparison, the Ps of this compound was found similar to that of the compound having no branch at the molecular terminal thereof (refer to JP-A-63-22042), proving no effect of introducing a branch to the terminal.

Further, the following compound shown in the working example of JP-A-1-118593 is also relevant to the present invention.

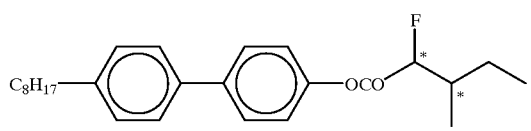

Max. Ps=188 nC/cm$^2$ (at 76.6° C.)

It is likely that this compound has a slow response time because of its ester structure, though having a plurality of branches. Moreover, the Ps is equal to that of the following compound disclosed in the same publication, revealing no particular effect of introducing a plurality of asymmetric carbon atoms.

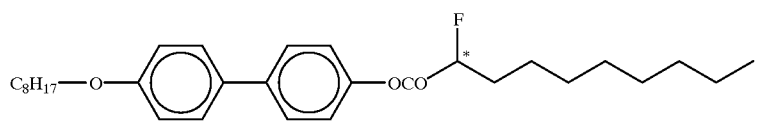

Max. Ps=192 nC/cm² (at 102.5° C.)

On the other hand, the inventors have previously proposed phenylpyrimidine type compounds having a fluoro-substituted optically active group at the 3-position which are equal to 2-fluoro-substituted compounds in spontaneous polarization and response time and also reduce temperature dependence of the helical pitch in the N* phase (refer to U.S. patent application Ser. No. 07/738,638).

The compounds according to the present invention are phenylpyrimidine type compounds having a 2- or 3-fluoro-substituted asymmetric carbon and, in addition, another asymmetric carbon atom in the molecular terminal side. While it is known that spontaneous polarization is largely influenced by asymmetric carbon close to the core, the inventors succeeded in obtaining further increased spontaneous polarization by introducing another asymmetric carbon atom to the side of the molecular terminal.

For example, (2'S,5'S)-5-(2'-fluoro-5'-methylheptyloxy)-2-(4-decylphenyl)pyrimidine, one of the compounds of the present invention, exhibits a very large spontaneous polarization of about 175 nC/cm$^{-2}$ at a temperature only 3° C. below the upper limit for the Sc* phase. When this compound is used as a chiral dopant, such large spontaneous polarization would be made use of to provide a liquid crystal composition having an increased response time.

The plurality of asymmetric carbon atoms in the compounds of the present invention also take an important role in the helical direction and pitch and temperature dependence of the helical pitch in a chiral nematic phase. For example, a 2-fluoro-4-methylalkanol derivative, included in the scope of the present invention, changes its direction of spontaneous polarization from positive to negative on replacement of (R)-asymmetric carbon to (S)-asymmetric carbon at the 2-position. Where the asymmetric carbon atoms at the 4-positions are both in an (S)-configuration, the helical direction in the chiral nematic phase is counterclockwise. Thus, the compounds of the present invention have a great advantage in that the direction of spontaneous polarization and the helical direction in the chiral nematic phase can be controlled individually by changing the steric configuration of the two asymmetric carbon atoms thereof.

It was additionally ascertained that temperature dependence of a helical pitch in an N* phase as generally observed in 2-fluoro derivatives (see JP-A-63-190842) can be considerably reduced by introducing two asymmetric carbon atoms.

As stated above, the compounds according to the present invention exhibit markedly improved performance properties owing to the two asymmetric carbon atoms introduced and thus possess very excellent properties as a chiral dopant to be added to nematic or smectic achiral base liquid crystals.

The following compounds having a plurality of asymmetric carbon atoms are known:

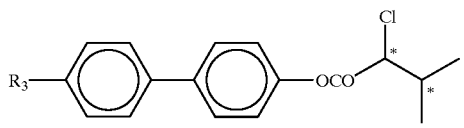

wherein $R_3$ is an alkyl group, an alkoxy group, an alkanoyloxy group, or an alkoxycarbonyloxy group.

(Refer to JP-A-63-37188)

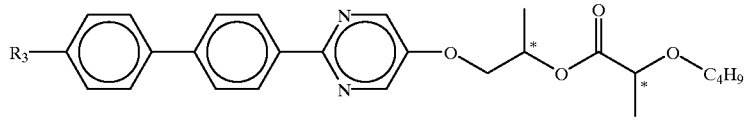

wherein $R_4$ is an alkyl or alkoxy group.
(Refer to Miyazawa, et al., Dai 14-Kai Ekisho Toronkai, IB119 (1988), Ohno, et al., Dai 14-Kai Ekisho Toronkai, IB101 (1988), and JP-A-64-50)

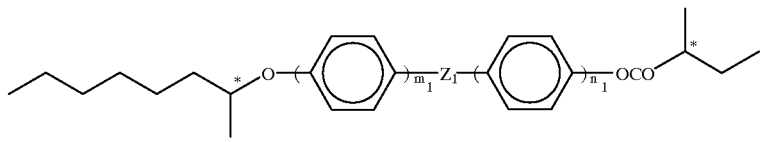

wherein $m_1$ and $n_1$ each is 1 or 2; and $Z_i$, is —COO— or —OCO—.
(Refer to Takehara, et al., Dai 14-Kai Ekisho Toronkai, IB102 (1988) and JP-A-64-47737)

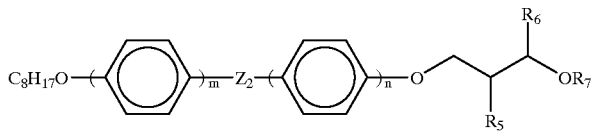

wherein m and n each is 1 or 2; $R_5$ and $R_6$ each is $CH_3$ or $—OCH_3$; $R_7$ is an alkyl group; and $Z_2$ is $—COO—$, $—OCO—$, or a single bond.

(Refer to JP-A-2-85227)

These compounds, however, have been developed with considerations only for spontaneous polarization or the helical direction in an N phase, with no reference to temperature dependence of the helical pitch. Moreover, liquid crystalline properties are observed only with the tricyclic compounds but not with the bicyclic compounds except those of JP-A-63-37188. Tricyclic compounds, when added as a chiral dopant to nematic or smectic liquid crystals, naturally increase the viscosity of the system and are therefore disadvantageous for use in either of such liquid crystal systems.

In addition, while exhibiting large spontaneous polarization, the compounds of JP-A-63-37188 are chlorine-substituted compounds and are therefore optically and chemically instable.

The compounds according to the present invention are bicyclic while exhibiting liquid crystalline properties and are therefore advantageous from the viewpoint of viscosity. Besides, they are optically and chemically stable fluoro-substituted compounds and thus exhibit sufficient stability.

As stated, the present invention has been completed based on the finding that existence of a plurality of chemically stable asymmetric carbon atoms leads to increased spontaneous polarization, increased response time, and markedly reduced temperature dependence of the helical pitch in an N* phase.

Among the optically active compounds represented by formula (I), particularly preferred as a chiral dopant for ferroelectric liquid crystals are those in which n is 1 and m is 2 or 3. From the standpoint of temperature dependence of the helical pitch in the N* phase, preferred as a chiral dopant for nematic liquid crystals are those in which n is 1 and m is from 0 to 3 and those in which n is 2 and m is 1.

The optically active compounds of formula (I) can generally be synthesized as follows.

(A) Compound wherein n=1, m=2, X=$CH_3$:

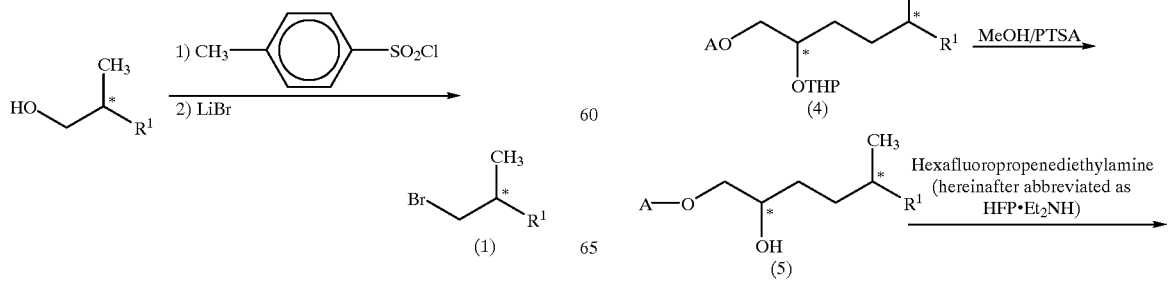

(A group

will hereinafter be referred to as Ts)

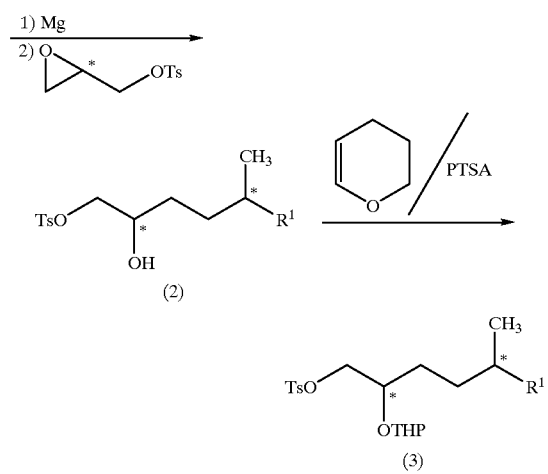

(wherein THP represents a tetrahydropyranyl group, and PTSA respresents p-toluenesulfonic acid; hereinafter the same)

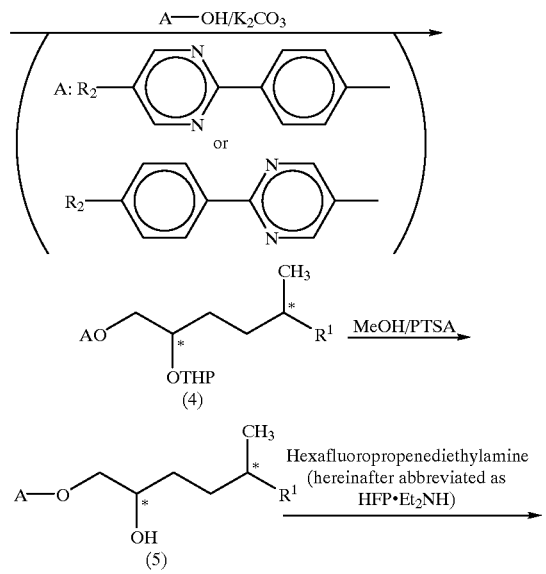

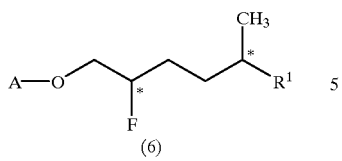
(B) Compounds wherein n=1, m=3, X=CH₃:
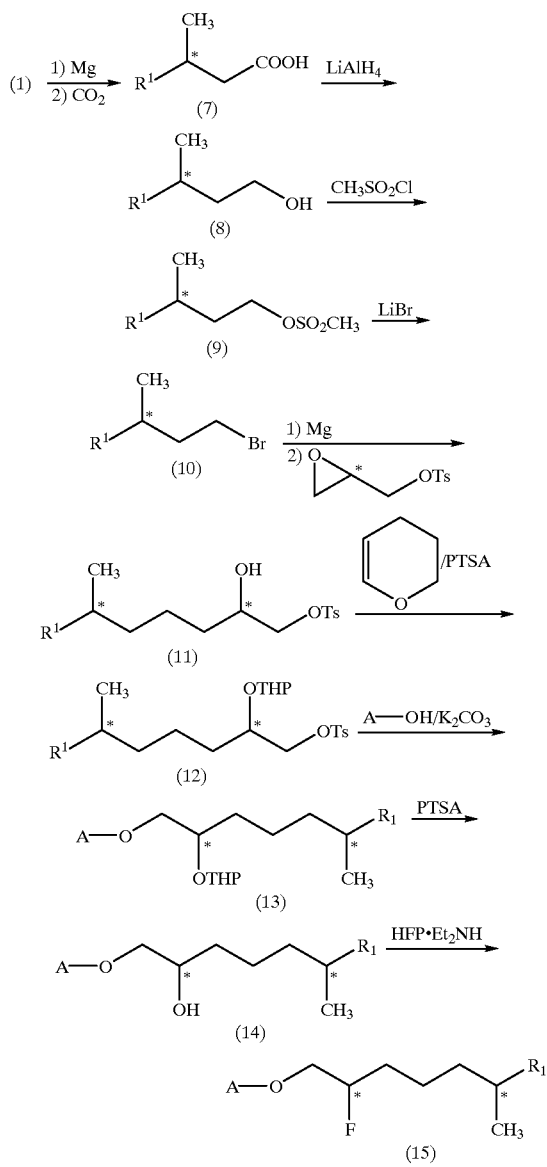
(C) Compounds wherein n=1, m=1, X=CH₃:
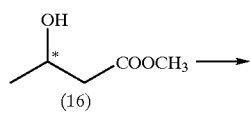
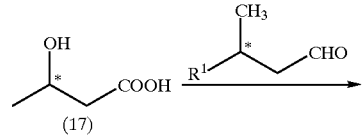
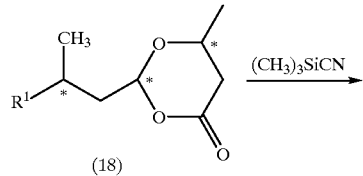
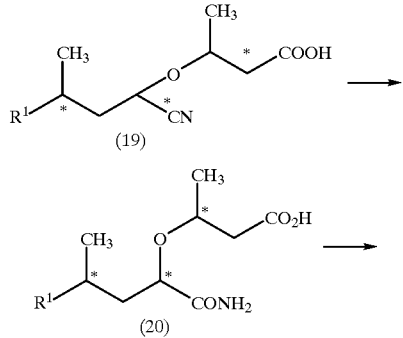
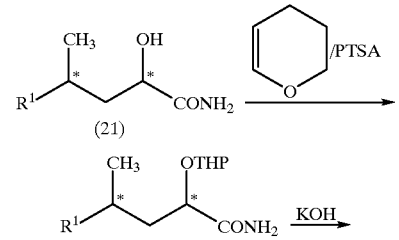
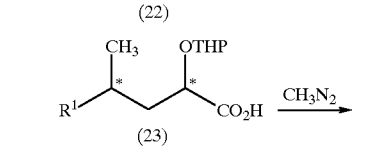
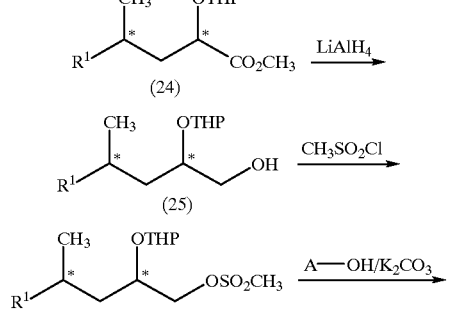
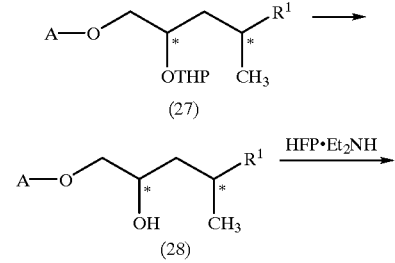

-continued
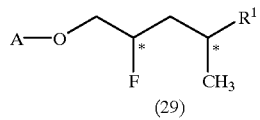
(29)
(D) Compounds wherein n=1, m=0, X=CH₃:
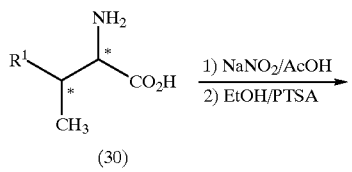
(30)
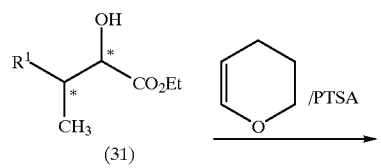
(31)
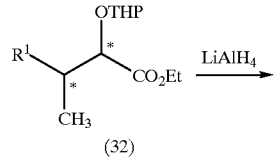
(32)
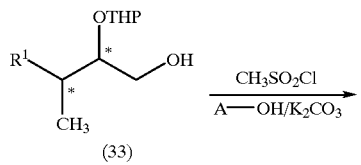
(33)
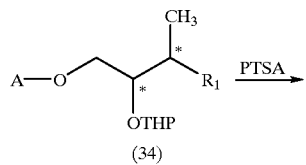
(34)
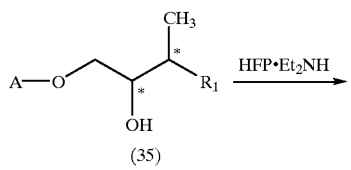
(35)
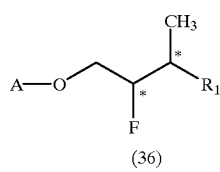
(36)
(E) Compounds wherein n=2, m=1, X=F:
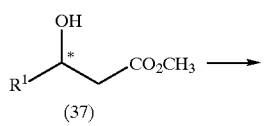
(37)
-continued
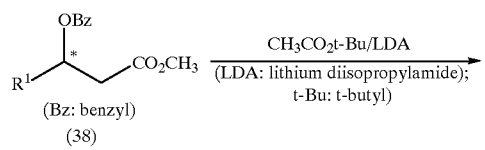
(38)
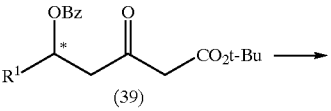
(39)
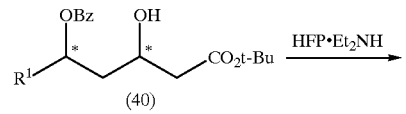
(40)
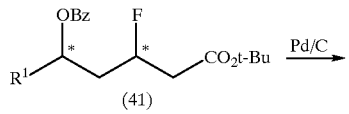
(41)
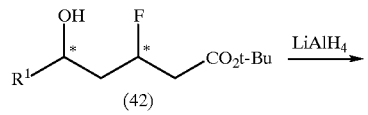
(42)
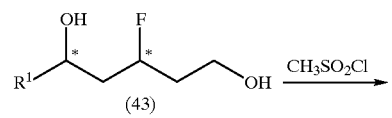
(43)
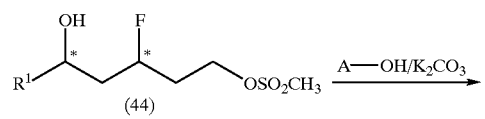
(44)
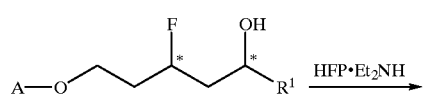
(45)
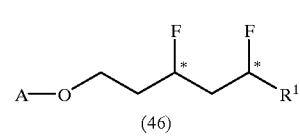
(46)
(F) Compound wherein n=2, m=1, X=CH₃:
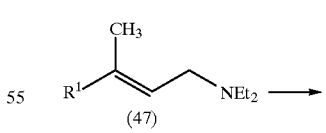
(47)
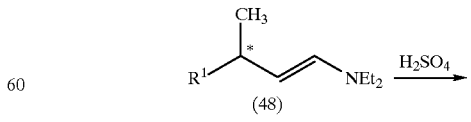
(48)
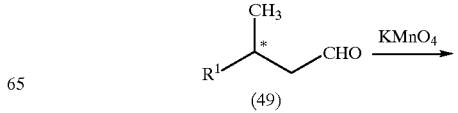
(49)

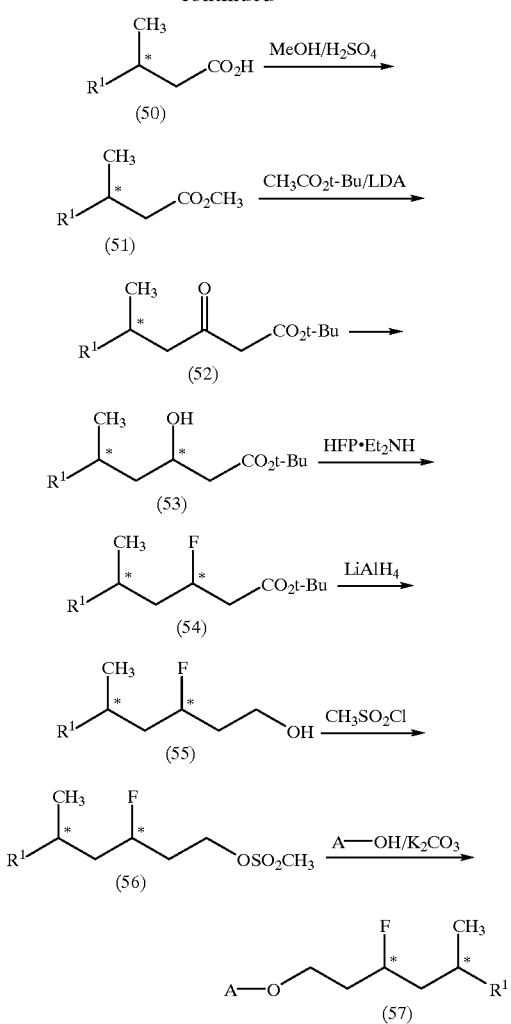

In process (A), an optically active 2-methylalkanol is reacted with p-toluenesulfonyl chloride to obtain a p-toluenesulfonic acid ester, which is then reacted with lithium bromide to obtain a 2-methylalkyl bromide (1). Compound (1) is converted to a Grignard reagent and reacted with optically active glycidyl p-toluenesulfonate to obtain a 2-hydroxy-5-methylalkyl p-toluenesulfonate (2).

The 2-hydroxyl group of compound (2) is reacted with 3,4-dihydro-2H-pyran at room temperature to obtain a tetrahydropyranyloxy derivative (3) wherein the 2-hydroxyl group is protected with THP. Compound (3) is then reacted with a 2-(4-hydroxyphenyl)-5-alkylpyrimidine or a 2-(4-alkylphenyl)-5-hydroxypyrimidine synthesized by the processes disclosed in JP-A-61-22072 and JP-A-2-69467 to obtain an ether derivative (4). The protective group of compound (4) is removed by using p-toluenesulfonic acid to obtain compound (5), which is then fluorinated with hexafluoropropenediethylamine to obtain a desired compound (6). This fluorination reaction is known to induce inversion of the steric configuration.

In process (B), the optically active 2-methylalkyl bromide (1) prepared in process (A) is converted to a Grignard reagent, which is then reacted with carbon dioxide to obtain a 3-methylalkanoic acid (7). Compound (7) is reduced by using lithium aluminum hydride to obtain a 3-methylalkanol (8). Compound (8) is brominated in the same manner as in process (A), and the resulting bromide (10) is converted to a Grignard reagent, which is then reacted with optically active glycidyl p-toluenesulfonate to obtain a 2-hydroxy-6-methylalkyl p-toluenesulfonate (11). Compound (11) is further treated in the same manner as in process A to obtain a desired compound (15).

In process (C), optically active methyl 3-hydroxybutyrate (16) is hydrolyzed to obtain optically active 3-hydroxybutyric acid (17). Compound (17) is reacted with an optically active 3-methylalkanal in accordance with the process disclosed in D. Seebach, Angew. Chem. Int. Ed. Engl., vol. 25 (2), p. 178 (1986) to obtain a dioxanone derivative (18). Compound (18) is treated with trimethylsilyl cyanide and titanium tetrachloride to obtain a β-alkoxycarboxylic acid derivative (19).

The nitrile group of compound (19) is oxidized to obtain an acid amide (20), which is then treated with lithium diisopropylamide to obtain a 2-hydroxy-4-methylalkanoic acid amide (21). Confirm at this stage that the optical purity of the 2-position and the rate of diastereomer excess are both 100%. Then, the hydroxyl group at the 2-position of compound (21) is protected in the same manner as in process (A), and the resulting acid amide (22) is hydrolyzed to obtain a carboxylic acid (23), which is then esterified to obtain a carboxylic acid ester (24).

Compound (24) is reduced with lithium aluminum hydride in the same manner as in process (B) to obtain an alkanol derivative (25), which is then reacted with methanesulfonyl chloride to obtain a methanesulfonyl ester (26). Compound (26) is further treated in the same manner as in process (A) to obtain a desired compound (29).

In process (D), the amino group of an optically active 2-amino-3-methylalkanoic acid (30) is converted to a hydroxyl group via a diazonium salt, and the carboxylic group is then esterified to obtain a 2-hydroxy-3-methylalkanoic acid ester (31). The hydroxyl group of compound (31) is protected by the reaction with 3,4-dihydro-2H-pyran to obtain compound (32). Compound (32) is reduced in the same manner as in process (B), and the resulting alcohol is treated in the same manner as in process (A) to obtain a desired compound (36).

In process (E), the hydroxyl group of an optically active 3-hydroxyalkanoic acid ester (37) is protected with a benzyl group to obtain compound (38), which is then reacted with t-butyl acetate in the presence of lithium diisopropylamide to obtain a 5-benzyloxy-3-oxoalkanoic acid ester (39). Compound (39) is subjected to enantioselective hydrogenation to obtain a 3-hydroxy derivative (40). Compound (40) is fluorinated with hexafluoropropenediethylamine to obtain a 3-fluoro compound (41). Compound (41) is hydrogenolyzed in the presence of palladium-on-carbon to obtain a 5-hydroxy-3-fluoro derivative (42). Compound (42) is reduced in the same manner as in process (B) to obtain an alkanol (43), which is then reacted with methanesulfonyl chloride to obtain a methanesulfonic acid ester (44). Compound (44) is further treated in the same manner as in process (A) to obtain a desired compound (46).

In process (F), a 3-methyl-2-alkenyldiethylamine (47) is subjected to enantioselective isomerization to obtain an optically active 3-methylenamine (48). Compound (48) is treated with sulfuric acid to obtain an aldehyde (49), which is then oxidized with potassium permanganate to obtain a 3-methylalkanoic acid (50). Compound (50) is converted to a methyl ester (51) and further treated in the same manner as in process (E) to obtain a 5-methyl-3-oxyalkanoic acid ester (52). Compound (52) is successively subjected to enantioselective hydrogenation, fluorination, and reduction in the same manner as in process (E) to obtain a 5-methyl-3-fluoroalkanol (55). Compound (55) is treated in the same manner as in process (A) to obtain a desired compound (57).

Specific examples of the optically active compounds of formula (I) are shown below.

2-[4-(2'-Fluoro-3'-methylpentyloxy)phenyl]-5-octylpyrimidine
2-[4-(2'-Fluoro-3'-methylpentyloxy)phenyl]-5-nonylpyrimidine
2-[4-(2'-Fluoro-3'-methylpentyloxy)phenyl]-5-decylpyrimidine
2-[4-(2'-Fluoro-3'-methylpentyloxy)phenyl]-5-undecylpyrimidine
2-[4-(2'-Fluoro-3'-methylpentyloxy)phenyl]-5-dodecylpyrimidine
5-(2'-Fluoro-3'-methylpentyloxy)-2-(4-octylphenyl)pyrimidine
5-(2'-Fluoro-3'-methylpentyloxy)-2-(4-nonylphenyl)pyrimidine
5-(2'-Fluoro-3'-methylpentyloxy)-2-(4-decylphenyl)pyrimidine
5-(2'-Fluoro-3'-methylpentyloxy)-2-(4-undecylphenyl)pyrimidine
5-(2'-Fluoro-3'-methylpentyloxy)-2-(4-dodecylphenyl)pyrimidine
2-[4-(2'-Fluoro-3'-methylhexyloxy)phenyl]-5-octylpyrimidine
2-[4-(2'-Fluoro-3'-methylhexyloxy)phenyl]-5-nonylpyrimidine
2-[4-(2'-Fluoro-3'-methylhexyloxy)phenyl]-5-decylpyrimidine
2-[4-(2'-Fluoro-3'-methylhexyloxy)phenyl]-5-undecylpyrimidine
2-[4-(2'-Fluoro-3'-methylhexyloxy)phenyl]-5-dodecylpyrimidine
5-(2'-Fluoro-3'-methylhexyloxy)-2-(4-octylphenyl)pyrimidine
5-(2'-Fluoro-3'-methylhexyloxy)-2-(4-nonylphenyl)pyrimidine
5-(2'-Fluoro-3'-methylhexyloxy)-2-(4-decylphenyl)pyrimidine
5-(2'-Fluoro-3'-methylhexyloxy)-2-(4-undecylphenyl)pyrimidine
5-(2'-Fluoro-3'-methylhexyloxy)-2-(4-dodecylphenyl)pyrimidine
2-[4-(2'-Fluoro-3'-methylheptyloxy)phenyl]-5-octylpyrimidine
2-[4-(2'-Fluoro-3'-methylheptyloxy)phenyl]-5-nonylpyrimidine
2-[4-(2'-Fluoro-3'-methylheptyloxy)phenyl]-5-decylpyrimidine
2-[4-(2'-Fluoro-3'-methylheptyloxy)phenyl]-5-undecylpyrimidine
2-[4-(2'-Fluoro-3'-methylheptyloxy)phenyl]-5-dodecylpyrimidine
5-(2'-Fluoro-3'-methylheptyloxy)-2-(4-octylphenyl)pyrimidine
5-(2'-Fluoro-3'-methylheptyloxy)-2-(4-nonylphenyl)pyrimidine
5-(2'-Fluoro-3'-methylheptyloxy)-2-(4-decylphenyl)pyrimidine
5-(2'-Fluoro-3'-methylheptyloxy)-2-(4-undecylphenyl)pyrimidine
5-(2'-Fluoro-3'-methylheptyloxy)-2-(4-dodecylphenyl)pyrimidine
2-[4-(2'-Fluoro-3'-methyloctyloxy)phenyl]-5-octylpyrimidine
2-[4-(2'-Fluoro-3'-methyloctyloxy)phenyl]-5-nonylpyrimidine
2-[4-(2'-Fluoro-3'-methyloctyloxy)phenyl]-5-decylpyrimidine
2-[4-(2'-Fluoro-3'-methyloctyloxy)phenyl]-5-undecylpyrimidine
2-[4-(2'-Fluoro-3'-methyloctyloxy)phenyl]-5-dodecylpyrimidine
5-(2'-Fluoro-3'-methyloctyloxy)-2-(4-octylphenyl)pyrimidine
5-(2'-Fluoro-3'-methyloctyloxy)-2-(4-nonylphenyl)pyrimidine
5-(2'-Fluoro-3'-methyloctyloxy)-2-(4-decylphenyl)pyrimidine
5-(2'-Fluoro-3'-methyloctyloxy)-2-(4-undecylphenyl)pyrimidine
5-(2'-Fluoro-3'-methyloctyloxy)-2-(4-dodecylphenyl)pyrimidine
2-[4-(2'-Fluoro-4'-methylhexyloxy)phenyl]-5-octylpyrimidine
2-[4-(2'-Fluoro-4'-methylhexyloxy)phenyl]-5-nonylpyrimidine
2-[4-(2'-Fluoro-4'-methylhexyloxy)phenyl]-5-decylpyrimidine
2-[4-(2'-Fluoro-4'-methylhexyloxy)phenyl]-5-undecylpyrimidine
2-[4-(2'-Fluoro-4'-methylhexyloxy)phenyl]-5-dodecylpyrimidine
5-(2'-Fluoro-4'-methylhexyloxy)-2-(4-octylphenyl)pyrimidine
5-(2'-Fluoro-4'-methylhexyloxy)-2-(4-nonylphenyl)pyrimidine
5-(2'-Fluoro-4'-methylhexyloxy)-2-(4-decylphenyl)pyrimidine
5-(2'-Fluoro-4'-methylhexyloxy)-2-(4-undecylphenyl)pyrimidine
5-(2'-Fluoro-4'-methylhexyloxy)-2-(4-dodecylphenyl)pyrimidine
2-[4-(2'-fluoro-4'-methylheptyloxy)phenyl]-5-octylpyrimidine
2-[4-(2'-fluoro-4'-methylheptyloxy)phenyl]-5-nonylpyrimidine
2-[4-(2'-fluoro-4'-methylheptyloxy)phenyl]-5-decylpyrimidine
2-[4-(2'-fluoro-4'-methylheptyloxy)phenyl]-5-undecylpyrimidine
2-[4-(2'-fluoro-4'-methylheptyloxy)phenyl]-5-dodecylpyrimidine
5-(2'-Fluoro-4'-methylheptyloxy)-2-(4-octylphenyl)pyrimidine
5-(2'-Fluoro-4'-methylheptyloxy)-2-(4-nonylphenyl)pyrimidine
5-(2'-Fluoro-4'-methylheptyloxy)-2-(4-decylphenyl)pyrimidine
5-(2'-Fluoro-4'-methylheptyloxy)-2-(4-undecylphenyl)pyrimidine
5-(2'-Fluoro-4'-methylheptyloxy)-2-(4-dodecylphenyl)pyrimidine
2-[4-(2'-Fluoro-4'-methyloctyloxy)phenyl]-5-octylpyrimidine
2-[4-(2'-Fluoro-4'-methyloctyloxy)phenyl]-5-nonylpyrimidine
2-[4-(2'-Fluoro-4'-methyloctyloxy)phenyl]-5-decylpyrimidine
2-[4-(2'-Fluoro-4'-methyloctyloxy)phenyl]-5-undecylpyrimidine
2-[4-(2'-Fluoro-4'-methyloctyloxy)phenyl]-5-dodecylpyrimidine 5-(2'-Fluoro-4'-methyloctyloxy)-2-(4-octylphenyl)pyrimidine
5-(2'-Fluoro-4'-methyloctyloxy)-2-(4-nonylphenyl)pyrimidine
5-(2'-Fluoro-4'-methyloctyloxy)-2-(4-decylphenyl)pyrimidine
5-(2'-Fluoro-4'-methyloctyloxy)-2-(4-undecylphenyl)pyrimidine
5-(2'-Fluoro-4'-methyloctyloxy)-2-(4-dodecylphenyl)pyrimidine
2-[4-(2'-Fluoro-4'-methylnonyloxy)phenyl]-5-octylpyrimidine
2-[4-(2'-Fluoro-4'-methylnonyloxy)phenyl]-5-nonylpyrimidine
2-[4-(2'-Fluoro-4'-methylnonyloxy)phenyl]-5-decylpyrimidine
2-[4-(2'-Fluoro-4'-methylnonyloxy)phenyl]-5-undecylpyrimidine
2-[4-(2'-Fluoro-4'-methylnonyloxy)phenyl]-5-dodecylpyrimidine
5-(2'-Fluoro-4'-methylnonyloxy)-2-(4-octylphenyl)pyrimidine
5-(2'-Fluoro-4'-methylnonyloxy)-2-(4-nonylphenyl)pyrimidine
5-(2'-Fluoro-4'-methylnonyloxy)-2-(4-decylphenyl)pyrimidine
5-(2'-Fluoro-4'-methylnonyloxy)-2-(4-undecylphenyl)pyrimidine
5-(2'-Fluoro-4'-methylnonyloxy)-2-(4-dodecylphenyl)pyrimidine
2-[4-(2'-Fluoro-5'-methylheptyloxy)phenyl]-5-octylpyrimidine
2-[4-(2'-Fluoro-5'-methylheptyloxy)phenyl]-5-nonylpyrimidine
2-[4-(2'-Fluoro-5'-methylheptyloxy)phenyl]-5-decylpyrimidine
2-[4-(2'-Fluoro-5'-methylheptyloxy)phenyl]-5-undecylpyrimidine
2-[4-(2'-Fluoro-5'-methylheptyloxy)phenyl]-5-dodecylpyrimidine
5-(2'-Fluoro-5'-methylheptyloxy)-2-(4-octylphenyl)pyrimidine
5-(2'-Fluoro-5'-methylheptyloxy)-2-(4-nonylphenyl)pyrimidine
5-(2'-Fluoro-5'-methylheptyloxy)-2-(4-decylphenyl)pyrimidine
5-(2'-Fluoro-5'-methylheptyloxy)-2-(4-undecylphenyl)pyrimidine
5-(2'-Fluoro-5'-methylheptyloxy)-2-(4-dodecylphenyl)pyrimidine
2-[4-(2'-Fluoro-5'-methyloctyloxy)phenyl]-5-octylpyrimidine
2-[4-(2'-Fluoro-5'-methyloctyloxy)phenyl]-5-nonylpyrimidine
2-[4-(2'-Fluoro-5'-methyloctyloxy)phenyl]-5-decylpyrimidine
2-[4-(2'-Fluoro-5'-methyloctyloxy)phenyl]-5-undecylpyrimidine
2-[4-(2'-Fluoro-5'-methyloctyloxy)phenyl]-5-dodecylpyrimidine
5-(2'-Fluoro-5'-methyloctyloxy)-2-(4-octylphenyl)pyrimidine
5-(2'-Fluoro-5'-methyloctyloxy)-2-(4-nonylphenyl)pyrimidine
5-(2'-Fluoro-5'-methyloctyloxy)-2-(4-decylphenyl)pyrimidine
5-(2'-Fluoro-5'-methyloctyloxy)-2-(4-undeyclphenyl)pyrimidine
5-(2'-Fluoro-5'-methyloctyloxy)-2-(4-dodecylphenyl)pyrimidine
2-[4-(2'-Fluoro-5'-methylnonyloxy)phenyl]-5-octylpyrimidine
2-[4-(2'-Fluoro-5'-methylnonyloxy)phenyl]-5-nonylpyrimidine
2-[4-(2'-Fluoro-5'-methylnonyloxy)phenyl]-5-decylpyrimidine
2-[4-(2'-Fluoro-5'-methylnonyloxy)phenyl]-5-undecylpyrimidine
2-[4-(2'-Fluoro-5'-methylnonyloxy)phenyl]-5-dodecylpyrimidine
5-(2'-Fluoro-5'-methylnonyloxy)-2-(4-octylphenyl)pyrimidine
5-(2'-Fluoro-5'-methylnonyloxy)-2-(4-nonylphenyl)pyrimidine
5-(2'-Fluoro-5'-methylnonyloxy)-2-(4-decylphenyl)pyrimidine
5-(2'-Fluoro-5'-methylnonyloxy)-2-(4-undecylphenyl)pyrimidine
5-(2'-Fluoro-5'-methylnonyloxy)-2-(4-dodecylphenyl)pyrimidine
2-[4-(2'-Fluoro-5'-methyldecyloxy)phenyl]-5-octylpyrirnidine
2-[4-(2'-Fluoro-5'-methyldecyloxy)phenyl]-5-nonylpyrimidine
2-[4-(2'-Fluoro-5'-methyldecyloxy)phenyl]-5-decylpyrimidine
2-[4-(2'-Fluoro-5'-methyldecyloxy)phenyl]-5-undecylpyrimidine
2-[4-(2'-Fluoro-5'-methyldecyloxy)phenyl]-5-dodecylpyrimidine
5-(2'-Fluoro-5'-methyldecyloxy)-2-(4-octylphenyl)pyrimidine
5-(2'-Fluoro-5'-methyldecyloxy)-2-(4-nonylphenyl)pyrimidine
5-(2'-Fluoro-5'-methyldecyloxy)-2-(4-decylphenyl)pyrimidine
5-(2'-Fluoro-5'-methyldecyloxy)-2-(4-undecylphenyl)pyrimidine
5-(2'-Fluoro-5'-methyldecyloxy)-2-(4-dodecylphenyl)pyrimidine
2-[4-(2'-Fluoro-6'-methyloctyloxy)phenyl]-5-octylpyrimidine
2-[4-(2'-Fluoro-6'-methyloctyloxy)phenyl]-5-nonylpyrimidine
2-[4-(2'-Fluoro-6'-methyloctyloxy)phenyl]-5-decylpyrimidine
2-[4-(2'-Fluoro-6'-methyloctyloxy)phenyl]-5-undecylpyrimidine
2-[4-(2'-Fluoro-6'-methyloctyloxy)phenyl]-5-dodecylpyrimidine
5-(2'-Fluoro-6'-methyloctyloxy)-2-(4-octylphenyl)pyrimidine
5-(2'-Fluoro-6'-methyloctyloxy)-2-(4-nonylphenyl)pyrimidine
5-(2'-Fluoro-6'-methyloctyloxy)-2-(4-decylphenyl)pyrimidine
5-(2'-Fluoro-6'-methyloctyloxy)-2-(4-undecylphenyl)pyrimidine
5-(2'-Fluoro-6'-methyloctyloxy)-2-(4-dodecylphenyl)pyrimidine
2-[4-(2'-Fluoro-6'-methylnonyloxy)phenyl]-5-octylpyrimidine
2-[4-(2'-Fluoro-6'-methylnonyloxy)phenyl]-5-nonylpyrimidine
2-[4-(2'-Fluoro-6'-methylnonyloxy)phenyl]-5-decylpyrimidine 2-[4-(2'-Fluoro-6'-methylnonyloxy)phenyl]-5-undecylpyrimidine
2-[4-(2'-Fluoro-6'-methylnonyloxy)phenyl]-5-dodecylpyrimidine
5-(2'-Fluoro-6'-methylnonyloxy)-2-(4-octylphenyl)pyrimidine
5-(2'-Fluoro-6'-methylnonyloxy)-2-(4-nonylphenyl)pyrimidine
5-(2'-Fluoro-6'-methylnonyloxy)-2-(4-decylphenyl)pyrimidine
5-(2'-Fluoro-6'-methylnonyloxy)-2-(4-undecylphenyl)pyrimidine
5-(2'-Fluoro-6'-methylnonyloxy)-2-(4-dodecylphenyl)pyrimidine
2-[4-(2'-Fluoro-6'-methyldecyloxy)phenyl]-5-octylpyrimidine
2-[4-(2'-Fluoro-6'-methyldecyloxy)phenyl]-5-nonylpyrimidine
2-[4-(2'-Fluoro-6'-methyldecyloxy)phenyl]-5-decylpyrimidine
2-[4-(2'-Fluoro-6'-methyldecyloxy)phenyl]-5-undecylpyrimidine
2-[4-(2'-Fluoro-6'-methyldecyloxy)phenyl]-5-dodecylpyrimidine
5-(2'-Fluoro-6'-methyldecyloxy)-2-(4-octylphenyl)pyrimidine
5-(2'-Fluoro-6'-methyldecyloxy)-2-(4-nonylphenyl)pyrimidine
5-(2'-Fluoro-6'-methyldecyloxy)-2-(4-decylphenyl)pyrimidine
5-(2'-Fluoro-6'-methyldecyloxy)-2-(4-undecylphenyl)pyrimidine
5-(2'-Fluoro-6'-methyldecyloxy)-2-(4-dodecylphenyl)pyrimidine
2-[4-(2'-Fluoro-6'-methylundecyloxy)phenyl]-5-octylpyrimidine
2-[4-(2'-Fluoro-6'-methylundecyloxy)phenyl]-5-nonylpyrimidine
2-[4-(2'-Fluoro-6'-methylundecyloxy)phenyl]-5-decylpyrimidine
2-[4-(2'-Fluoro-6'-methylundecyloxy)phenyl]-5-undecylpyrimidine
2-[4-(2'-Fluoro-6'-methylundecyloxy)phenyl]-5-dodecylpyrimidine
5-(2'-Fluoro-6'-methylundecyloxy)-2-(4-octylphenyl)pyrimidine
5-(2'-Fluoro-6'-methylundecyloxy)-2-(4-nonylphenyl)pyrimidine
5-(2'-Fluoro-6'-methylundecyloxy)-2-(4-decylphenyl)pyrimidine
5-(2'-Fluoro-6'-methylundecyloxy)-2-(4-undecylphenyl)pyrimidine
5-(2'-Fluoro-6'-methylundecyloxy)-2-(4-dodecylphenyl)pyrimidine
2-[4-(3'-Fluoro-4'-methylhexyloxy)phenyl]-5-octylpyrimidine
2-[4-(3'-Fluoro-4'-methylhexyloxy)phenyl]-5-nonylpyrimidine
2-[4-(3'-Fluoro-4'-methylhexyloxy)phenyl]-5-decylpyrimidine
2-[4-(3'-Fluoro-4'-methylhexyloxy)phenyl]-5-undecylpyrimidine
2-[4-(3'-Fluoro-4'-methylhexyloxy)phenyl]-5-dodecylpyrimidine
5-(3'-Fluoro-4'-methylhexyloxy)-2-(4-octylphenyl)pyrimidine
5-(3'-Fluoro-4'-methylhexyloxy)-2-(4-nonylphenyl)pyrimidine
5-(3'-Fluoro-4'-methylhexyloxy)-2-(4-decylphenyl)pyrimidine
5-(3'-Fluoro-4'-methylhexyloxy)-2-(4-undecylphenyl)pyrimidine
5-(3'-Fluoro-4'-methylhexyloxy)-2-(4-dodecylphenyl)pyrimidine
2-[4-(3'-Fluoro-4'-methylheptyloxy)phenyl]-5-octylpyrimidine
2-[4-(3'-Fluoro-4'-methylheptyloxy)phenyl]-5-nonylpyrimidine
2-[4-(3'-Fluoro-4'-methylheptyloxy)phenyl]-5-decylpyrimidine
2-[4-(3'-Fluoro-4'-methylheptyloxy)phenyl]-5-undecylpyrimidine
2-[4-(3'-Fluoro-4'-methylheptyloxy)phenyl]-5-dodecylpyrimidine
5-(3'-Fluoro-4'-methylheptyloxy)-2-(4-octylphenyl)pyrimidine
5-(3'-Fluoro-4'-methylheptyloxy)-2-(4-nonylphenyl)pyrimidine
5-(3'-Fluoro-4'-methylheptyloxy)-2-(4-decylphenyl)pyrimidine
5-(3'-Fluoro-4'-methylheptyloxy)-2-(4-undecylphenyl)pyrimidine
5-(3'-Fluoro-4'-methylheptyloxy)-2-(4-dodecylphenyl)pyrimidine
2-[4-(3'-Fluoro-4'-methyloctyloxy)phenyl]-5-octylpyrimidine
2-[4-(3'-Fluoro-4'-methyloctyloxy)phenyl]-5-nonylpyrimidine
2-[4-(3'-Fluoro-4'-methyloctyloxy)phenyl]-5-decylpyrimidine
2-[4-(3'-Fluoro-4'-methyloctyloxy)phenyl]-5-undecylpyrimidine
2-[4-(3'-Fluoro-4'-methyloctyloxy)phenyl]-5-dodecylpyrimidine
5-(3'-Fluoro-4'-methyloctyloxy)-2-(4-octylphenyl)pyrimidine
5-(3'-Fluoro-4'-methyloctyloxy)-2-(4-nonylphenyl)pyrimidine
5-(3'-Fluoro-4'-methyloctyloxy)-2-(4-decylphenyl)pyrimidine
5-(3'-Fluoro-4'-methyloctyloxy)-2-(4-undecylphenyl)pyrimidine
5-(3'-Fluoro-4'-methyloctyloxy)-2-(4-dodecylphenyl)pyrimidine
2-[4-(3'-Fluoro-4'-methylnonyloxy)phenyl]-5-octylpyrimidine
2-[4-(3'-Fluoro-4'-methylnonyloxy)phenyl]-5-nonylpyrimidine
2-[4-(3'-Fluoro-4'-methylnonyloxy)phenyl]-5-decylpyrimidine
2-[4-(3'-Fluoro-4'-methylnonyloxy)phenyl]-5-undecylpyrimidine
2-[4-(3'-Fluoro-4'-methylnonyloxy)phenyl]-5-dodecylpyrimidine
5-(3'-Fluoro-4'-methylnonyloxy)-2-(4-octylphenyl)pyrimidine
5-(3'-Fluoro-4'-methylnonyloxy)-2-(4-nonylphenyl)pyrimidine
5-(3'-Fluoro-4'-methylnonyloxy)-2-(4-decylphenyl)pyrimidine
5-(3'-Fluoro-4'-methylnonyloxy)-2-(4-undecylphenyl)pyrimidine
5-(3'-Fluoro-4'-methylnonyloxy)-2-(4-dodecylphenyl)pyrimidine
2-[4-(3'-Fluoro-5'-methylheptyloxy)phenyl]-5-octylpyrimidine 2-[4-(3'-Fluoro-5'-methylheptyloxy)phenyl]-5-nonylpyrimidine
2-[4-(3'-Fluoro-5'-methylheptyloxy)phenyl]-5-decylpyrimidine
2-[4-(3'-Fluoro-5'-methylheptyloxy)phenyl]-5-undecylpyrimidine
2-[4-(3'-Fluoro-5'-methylheptyloxy)phenyl]-5-dodecylpyrimidine
5-(3'-Fluoro-5'-methylheptyloxy)-2-(4-octylphenyl)pyrimidine
5-(3'-Fluoro-5'-methylheptyloxy)-2-(4-nonylphenyl)pyrimidine
5-(3'-Fluoro-5'-methylheptyloxy)-2-(4-decylphenyl)pyrimidine
5-(3'-Fluoro-5'-methylheptyloxy)-2-(4-undecylphenyl)pyrimidine
5-(3'-Fluoro-5'-methylheptyloxy)-2-(4-dodecylphenyl)pyrimidine
2-[4-(3'-Fluoro-5'-methyloctyloxy)phenyl]-5-octylpyrimidine
2-[4-(3'-Fluoro-5'-methyloctyloxy)phenyl]-5-nonylpyrimidine
2-[4-(3'-Fluoro-5'-methyloctyloxy)phenyl]-5-decylpyrimidine
2-[4-(3'-Fluoro-5'-methyloctyloxy)phenyl]-5-undecylpyrimidine
2-[4-(3'-Fluoro-5'-methyloctyloxy)phenyl]-5-dodecylpyrimidine
5-(3'-Fluoro-5'-methyloctyloxy)-2-(4-octylphenyl)pyrimidine
5-(3'-Fluoro-5'-methyloctyloxy)-2-(4-nonylphenyl)pyrimidine
5-(3'-Fluoro-5'-methyloctyloxy)-2-(4-decylphenyl)pyrimidine
5-(3'-Fluoro-5'-methyloctyloxy)-2-(4-undecylphenyl)pyrimidine
5-(3'-Fluoro-5'-methyloctyloxy)-2-(4-dodecylphenyl)pyrimidine
2-[4-(3'-Fluoro-5'-methylnonyloxy)phenyl]-5-octylpyrimidine
2-[4-(3'-Fluoro-5'-methylnonyloxy)phenyl]-5-nonylpyrimidine
2-[4-(3'-Fluoro-5'-methylnonyloxy)phenyl]-5-decylpyrimidine
2-[4-(3'-Fluoro-5'-methylnonyloxy)phenyl]-5-undecylpyrimidine
2-[4-(3'-Fluoro-5'-methylnonyloxy)phenyl]-5-dodecylpyrimidine
5-(3'-Fluoro-5'-methylnonyloxy)-2-(4-octylphenyl)pyrimidine
5-(3'-Fluoro-5'-methylnonyloxy)-2-(4-nonylphenyl)pyrimidine
5-(3'-Fluoro-5'-methylnonyloxy)-2-(4-decyllphenyl)pyrimidine
5-(3'-Fluoro-5'-methylnonyloxy)-2-(4-undecylphenyl)pyrimidine
5-(3'-Fluoro-5'-methylnonyloxy)-2-(4-dodecylphenyl)pyrimidine
2-[4-(3'-Fluoro-5'-methyldecyloxy)phenyl]-5-octylpyrimidine
2-[4-(3'-Fluoro-5'-methyldecyloxy)phenyl]-5-nonylpyrimidine
2-[4-(3'-Fluoro-5'-methyldecyloxy)phenyl]-5-decylpyrimidine
2-[4-(3'-Fluoro-5'-methyldecyloxy)phenyl]-5-undecylpyrimidine
2-[4-(3'-Fluoro-5'-methyldecyloxy)phenyl]-5-dodecylpyrimidine
5-(3'-Fluoro-5'-methyldecyloxy)-2-(4-octylphenyl)pyrimidine
5-(3'-Fluoro-5'-methyldecyloxy)-2-(4-nonylphenyl)pyrimidine
5-(3'-Fluoro-5'-methyldecyloxy)-2-(4-decylphenyl)pyrimidine
5-(3'-Fluoro-5'-methyldecyloxy)-2-(4-undecylphenyl)pyrimidine
5-(3'-Fluoro-5'-methyldecyloxy)-2-(4-dodecylphenyl)pyrimidine
2-[4-(3'-Fluoro-6'-methyloctyloxy)phenyl]-5-octylpyrimidine
2-[4-(3'-Fluoro-6'-methyloctyloxy)phenyl]-5-nonylpyrimidine
2-[4-(3'-Fluoro-6'-methyloctyloxy)phenyl]-5-decylpyrimidine
2-[4-(3'-Fluoro-6'-methyloctyloxy)phenyl]-5-undecylpyrimidine
2-[4-(3'-Fluoro-6'-methyloctyloxy)phenyl]-5-dodecylpyrimidine
5-(3'-Fluoro-6'-methyloctyloxy)-2-(4-octylphenyl)pyrimidine
5-(3'-Fluoro-6'-methyloctyloxy)-2-(4-nonylphenyl)pyrimidine
5-(3'-Fluoro-6'-methyloctyloxy)-2-(4-decylphenyl)pyrimidine
5-(3'-Fluoro-6'-methyloctyloxy)-2-(4-undecylphenyl)pyrimidine
5-(3'-Fluoro-6'-methyloctyloxy)-2-(4-dodecylphenyl)pyrimidine
2-[4-(3'-Fluoro-6'-methylnonyloxy)phenyl]-5-octylpyrimidine
2-[4-(3'-Fluoro-6'-methylnonyloxy)phenyl]-5-nonylpyrimidine
2-[4-(3'-Fluoro-6'-methylnonyloxy)phenyl]-5-decylpyrimidine
2-[4-(3'-Fluoro-6'-methylnonyloxy)phenyl]-5-undecylpyrimidine
2-[4-(3'-Fluoro-6'-methylnonyloxy)phenyl]-5-dodecylpyrimidine
5-(3'-Fluoro-6'-methylnonyloxy)-2-(4-octylphenyl)pyrimidine
5-(3'-Fluoro-6'-methylnonyloxy)-2-(4-nonylphenyl)pyrimidine
5-(3'-Fluoro-6'-methylnonyloxy)-2-(4-decylphenyl)pyrimidine
5-(3'-Fluoro-6'-methylnonyloxy)-2-(4-undecylphenyl)pyrimidine
5-(3'-Fluoro-6'-methylnonyloxy)-2-(4-dodecylphenyl)pyrimidine
2-[4-(3'-Fluoro-6'-methyldecyloxy)phenyl]-5-octylpyrimidine
2-[4-(3'-Fluoro-6'-methyldecyloxy)phenyl]-5-nonylpyrimidine
2-[4-(3'-Fluoro-6'-methyldecyloxy)phenyl]-5-decylpyrimidine
2-[4-(3'-Fluoro-6'-methyldecyloxy)phenyl]-5-undecylpyrimidine
2-[4-(3'-Fluoro-6'-methyldecyloxy)phenyl]-5-dodecylpyrimidine
5-(3'-Fluoro-6'-methyldecyloxy)-2-(4-octylphenyl)pyrimidine
5-(3'-Fluoro-6'-methyldecyloxy)-2-(4-nonylphenyl)pyrimidine
5-(3'-Fluoro-6'-methyldecyloxy)-2-(4-decylphenyl)pyrimidine
5-(3'-Fluoro-6'-methyldecyloxy)-2-(4-undecylphenyl)pyrimidine 5-(3'-Fluoro-6'-methyldecyloxy)-2-(4-dodecylphenyl) pyrimidine
2-[4-(3'-Fluoro-6'-methylundecyloxy)phenyl]-5-octylpyrimidine
2-[4-(3'-Fluoro-6'-methylundecyloxy)phenyl]-5-nonylpyrimidine
2-[4-(3'-Fluoro-6'-methylundecyloxy)phenyl]-5-decylpyrimidine
2-[4-(3'-Fluoro-6'-methylundecyloxy)phenyl]-5-undecylpyrimidine
2-[4-(3'-Fluoro-6'-methylundecyloxy)phenyl]-5-dodecylpyrimidine
5-(3'-Fluoro-6'-methylundecyloxy)-2-(4-octylphenyl) pyrimidine
5-(3'-Fluoro-6'-methylundecyloxy)-2-(4-nonylphenyl) pyrimidine
5-(3'-Fluoro-6'-methylundecyloxy)-2-(4-decylphenyl) pyrimidine
5-(3'-Fluoro-6'-methylundecyloxy)-2-(4-undecylphenyl) pyrimidine
5-(3'-Fluoro-6'-methylundecyloxy)-2-(4-dodecylphenyl) pyrimidine
2-[4-(3'-Fluoro-7'-methylnonyloxy)phenyl]-5-octylpyrimidine
2-[4-(3'-Fluoro-7'-methylnonyloxy)phenyl]-5-nonylpyrimidine
2-[4-(3'-Fluoro-7'-methylnonyloxy)phenyl]-5-decylpyrimidine
2-[4-(3'-Fluoro-7'-methylnonyloxy)phenyl]-5-undecylpyrimidine
2-[4-(3'-Fluoro-7'-methylnonyloxy)phenyl]-5-dodecylpyrimidine
5-(3'-Fluoro-7'-methylnonyloxy)-2-(4-octylphenyl) pyrimidine
5-(3'-Fluoro-7'-methylnonyloxy)-2-(4-nonylphenyl) pyrimidine
5-(3'-Fluoro-7'-methylnonyloxy)-2-(4-decylphenyl) pyrimidine
5-(3'-Fluoro-7'-methylnonyloxy)-2-(4-undecylphenyl) pyrimidine
5-(3'-Fluoro-7'-methylnonyloxy)-2-(4-dodecylphenyl) pyrimidine
2-[4-(3'-Fluoro-7'-methyldecyloxy)phenyl]-5-octylpyrimidine
2-[4-(3'-Fluoro-7'-methyldecyloxy)phenyl]-5-nonylpyrimidine
2-[4-(3'-Fluoro-7'-methyldecyloxy)phenyl]-5-decylpyrimidine
2-[4-(3'-Fluoro-7'-methyldecyloxy)phenyl]-5-undecylpyrimidine
2-[4-(3'-Fluoro-7'-methyldecyloxy)phenyl]-5-dodecylpyrimidine
5-(3'-Fluoro-7'-methyldecyloxy)-2-(4-octylphenyl) pyrimidine
5-(3'-Fluoro-7'-methyldecyloxy)-2-(4-nonylphenyl) pyrimidine
5-(3'-Fluoro-7'-methyldecyloxy)-2-(4-decylphenyl) pyrimidine
5-(3'-Fluoro-7'-methyldecyloxy)-2-(4-undecylphenyl) pyrimidine
5-(3'-Fluoro-7'-methyldecyloxy)-2-(4-dodecylphenyl) pyrimidine
2-[4-(3'-Fluoro-7'-methylundecyloxy)phenyl]-5-octylpyrimidine
2-[4-(3'-Fluoro-7'-methylundecyloxy)phenyl]-5-nonylpyrimidine
2-[4-(3'-Fluoro-7'-methylundecyloxy)phenyl]-5-decylpyrimidine
2-[4-(3'-Fluoro-7'-methylundecyloxy)phenyl]-5-undecylpyrimidine
2-[4-(3'-Fluoro-7'-methylundecyloxy)phenyl]-5-dodecylpyrimidine
5-(3'-Fluoro-7'-methylundecyloxy)-2-(4-octylphenyl) pyrimidine
5-(3'-Fluoro-7'-methylundecyloxy)-2-(4-nonylphenyl) pyrimidine
5-(3'-Fluoro-7'-methylundecyloxy)-2-(4-decylphenyl) pyrimidine
5-(3'-Fluoro-7'-methylundecyloxy)-2-(4-undecylphenyl) pyrimidine
5-(3'-Fluoro-7'-methylundecyloxy)-2-(4-dodecylphenyl) pyrimidine
2-[4-(3'-Fluoro-7'-methyldodecyloxy)phenyl]-5-octylpyrimidine
2-[4-(3'-Fluoro-7'-methyldodecyloxy)phenyl]-5-nonylpyrimidine
2-[4-(3'-Fluoro-7'-methyldodecyloxy)phenyl]-5-decylpyrimidine
2-[4-(3'-Fluoro-7'-methyldodecyloxy)phenyl]-5-undecylpyrimidine
2-[4-(3'-Fluoro-7'-methyldodecyloxy)phenyl]-5-dodecylpyrimidine
5-(3'-Fluoro-7'-methyldodecyloxy)-2-(4-octylphenyl) pyrimidine
5-(3'-Fluoro-7'-methyldodecyloxy)-2-(4-nonylphenyl) pyrimidine
5-(3'-Fluoro-7'-methyldodecyloxy)-2-(4-decylphenyl) pyrimidine
5-(3'-Fluoro-7'-methyldodecyloxy)-2-(4-undecylphenyl) pyrimidine
5-(3'-Fluoro-7'-methyldodecyloxy)-2-(4-dodecylphenyl) pyrimidine
2-[4-(2',3'-difluoropentyloxy)phenyl]-5-octylpyrimidine
2-[4-(2',3'-difluoropentyloxy)phenyl]-5-nonylpyrimidine
2-[4-(2',3'-difluoropentyloxy)phenyl]-5-decylpyrimidine
2-[4-(2',3'-difluoropentyloxy)phenyl]-5-undecylpyrimidine
2-[4-(2',3'-Difluoropentyloxy)phenyl]-5-dodecylpyrimidine
5-(2',3'-Difluoropentyloxy)-2-(4-octylphenyl)pyrimidine
5-(2',3'-Difluoropentyloxy)-2-(4-nonylphenyl)pyrimidine
5-(2',3'-Difluoropentyloxy)-2-(4-decylphenyl)pyrimidine
5-(2',3'-Difluoropentyloxy)-2-(4-undecylphenyl)pyrimidine
5-(2',3'-Difluoropentyloxy)-2-(4-dodecylphenyl)pyrimidine
2-[4-(2',3'-Difluorohexyloxy)phenyl]-5-octylpyrimidine
2-[4-(2',3'-Difluorohexyloxy)phenyl]-5-nonylpyrimidine
2-[4-(2',3'-Difluorohexyloxy)phenyl]-5-decylpyrimidine
2-[4-(2',3'-Difluorohexyloxy)phenyl]-5-undecylpyrimidine
2-[4-(2',3'-Difluorohexyloxy)phenyl]-5-dodecylpyrimidine
5-(2',3'-Difluorohexyloxy)-2-(4-octylphenyl)pyrimidine
5-(2',3'-Difluorohexyloxy)-2-(4-nonylphenyl)pyrimidine
5-(2',3'-Difluorohexyloxy)-2-(4-decylphenyl)pyrimidine
5-(2',3'-Difluorohexyloxy)-2-(4-undecylphenyl)pyrimidine
5-(2',3'-Difluorohexyloxy)-2-(4-dodecylphenyl)pyrimidine
2-[4-(2',3'-Difluoroheptyloxy)phenyl]-5-octylpyrimidine
2-[4-(2',3'-Difluoroheptyloxy)phenyl]-5-nonylpyrimidine
2-[4-(2',3'-Difluoroheptyloxy)phenyl]-5-decylpyrimidine
2-[4-(2',3'-Difluoroheptyloxy)phenyl]-5-undecylpyrimidine
2-[4-(2',3'-Difluoroheptyloxy)phenyl]-5-dodecylpyrimidine
5-(2',3'-Difluoroheptyloxy)-2-(4-octylphenyl)pyrimidine
5-(2',3'-Difluoroheptyloxy)-2-(4-nonylphenyl)pyrimidine
5-(2',3'-Difluoroheptyloxy)-2-(4-decylphenyl)pyrimidine
5-(2',3'-Difluoroheptyloxy)-2-(4-undecylphenyl)pyrimidine
5-(2',3'-Difluoroheptyloxy)-2-(4-dodecylphenyl)pyrimidine
2-[4-(2',3'-Difluorooctyloxy)phenyl]-5-octylpyrimidine
2-[4-(2',3'-Difluorooctyloxy)phenyl]-5-nonylpyrimidine
2-[4-(2',3'-Difluorooctyloxy)phenyl]-5-decylpyrimidine 2-[4-(2',3'-Difluorooctyloxy)phenyl]-5-undecylpyrimidine
2-[4-(2',3'-Difluorooctyloxy)phenyl]-5-dodecylpyrimidine
5-(2',3'-Difluorooctyloxy)-2-(4-octylphenyl)pyrimidine
5-(2',3'-Difluorooctyloxy)-2-(4-nonylphenyl)pyrimidine
5-(2',3'-Difluorooctyloxy)-2-(4-decylphenyl)pyrimidine
5-(2',3'-Difluorooctyloxy)-2-(4-undecylphenyl)pyrimidine
5-(2',3'-Difluorooctyloxy)-2-(4-dodecylphenyl)pyrimidine
2-[4-(2',4'-Difluorohexyloxy)phenyl]-5-octylpyrimidine
2-[4-(2',4'-Difluorohexyloxy)phenyl]-5-nonylpyrimidine
2-[4-(2',4'-Difluorohexyloxy)phenyl]-5-decylpyrimidine
2-[4-(2',4'-Difluorohexyloxy)phenyl]-5-undecylpyrimidine
2-[4-(2',4'-Difluorohexyloxy)phenyl]-5-dodecylpyrimidine
5-(2',4'-Difluorohexyloxy)-2-(4-octylphenyl)pyrimidine
5-(2',4'-Difluorohexyloxy)-2-(4-nonylphenyl)pyrimidine
5-(2',4'-Difluorohexyloxy)-2-(4-decylphenyl)pyrimidine
5-(2',4'-Difluorohexyloxy)-2-(4-undecylphenyl)pyrimidine
5-(2',4'-Difluorohexyloxy)-2-(4-dodecylphenyl)pyrimidine
2-[4-(2',4'-Difluoroheptyloxy)phenyl]-5-octylpyrimidine
2-[4-(2',4'-Difluoroheptyloxy)phenyl]-5-nonylpyrimidine
2-[4-(2',4'-Difluoroheptyloxy)phenyl]-5-decylpyrimidine
2-[4-(2',4'-Difluoroheptyloxy)phenyl]-5-undecylpyrimidine
2-[4-(2',4'-Difluoroheptyloxy)phenyl]-5-dodecylpyrimidine
5-(2',4'-Difluoroheptyloxy)-2-(4-octylphenyl)pyrimidine
5-(2',4'-Difluoroheptyloxy)-2-(4-nonylphenyl)pyrimidine
5-(2',4'-Difluoroheptyloxy)-2-(4-decylphenyl)pyrimidine
5-(2',4'-Difluoroheptyloxy)-2-(4-undecylphenyl)pyrimidine
5-(2',4'-Difluoroheptyloxy)-2-(4-dodecylphenyl)pyrimidine
2-[4-(2',4'-Difluorooctyloxy)phenyl]-5-octylpyrimidine
2-[4-(2',4'-Difluorooctyloxy)phenyl]-5-nonylpyrimidine
2-[4-(2',4'-Difluorooctyloxy)phenyl]-5-decylpyrimidine
2-[4-(2',4'-Difluorooctyloxy)phenyl]-5-undecylpyrimidine
2-[4-(2',4'-Difluorooctyloxy)phenyl]-5-dodecylpyrimidine
5-(2',4'-Difluorooctyloxy)-2-(4-octylphenyl)pyrimidine
5-(2',4'-Difluorooctyloxy)-2-(4-nonylphenyl)pyrimidine
5-(2',4'-Difluorooctyloxy)-2-(4-decylphenyl)pyrimidine
5-(2',4'-Difluorooctyloxy)-2-(4-undecylphenyl)pyrimidine
5-(2',4'-Difluorooctyloxy)-2-(4-dodecylphenyl)pyrimidine
2-[4-(2',4'-Difluorononyloxy)phenyl]-5-octylpyrimidine
2-[4-(2',4'-Difluorononyloxy)phenyl]-5-nonylpyrimidine
2-[4-(2',4'-Difluorononyloxy)phenyl]-5-decylpyrimidine
2-[4-(2',4'-Difluorononyloxy)phenyl]-5-undecylpyrimidine
2-[4-(2',4'-Difluorononyloxy)phenyl]-5-dodecylpyrimidine
5-(2',4'-Difluorononyloxy)-2-(4-octylphenyl)pyrimidine
5-(2',4'-Difluorononyloxy)-2-(4-nonylphenyl)pyrimidine
5-(2',4'-Difluorononyloxy)-2-(4-decylphenyl)pyrimidine
5-(2',4'-Difluorononyloxy)-2-(4-undecylphenyl)pyrimidine
5-(2',4'-Difluorononyloxy)-2-(4-dodecylphenyl)pyrimidine
2-[4-(2',5'-Difluoroheptyloxy)phenyl]-5-octylpyrimidine
2-[4-(2',5'-Difluoroheptyloxy)phenyl]-5-nonylpyrimidine
2-[4-(2',5'-Difluoroheptyloxy)phenyl]-5-decylpyrimidine
2-[4-(2',5'-Difluoroheptyloxy)phenyl]-5-undecylpyrimidine
2-[4-(2',5'-Difluoroheptyloxy)phenyl]-5-dodecylpyrimidine
5-(2',5'-Difluoroheptyloxy)-2-(4-octylphenyl)pyrimidine
5-(2',5'-Difluoroheptyloxy)-2-(4-nonylphenyl)pyrimidine
5-(2',5'-Difluoroheptyloxy)-2-(4-decylphenyl)pyrimidine
5-(2',5'-Difluoroheptyloxy)-2-(4-undecylphenyl)pyrimidine
5-(2',5'-Difluoroheptyloxy)-2-(4-dodecylphenyl)pyrimidine
2-[4-(2',5'-Difluorooctyloxy)phenyl]-5-octylpyrimidine
2-[4-(2',5'-Difluorooctyloxy)phenyl]-5-nonylpyrimidine
2-[4-(2',5'-Difluorooctyloxy)phenyl]-5-decylpyrimidine
2-[4-(2',5'-Difluorooctyloxy)phenyl]-5-undecylpyrimidine
2-[4-(2',5'-Difluorooctyloxy)phenyl]-5-dodecylpyrimidine
5-(2',5'-Difluorooctyloxy)-2-(4-octylphenyl)pyrimidine
5-(2',5'-Difluorooctyloxy)-2-(4-nonylphenyl)pyrimidine
5-(2',5'-Difluorooctyloxy)-2-(4-decylphenyl)pyrimidine
5-(2',5'-Difluorooctyloxy)-2-(4-undecylphenyl)pyrimidine
5-(2',5'-Difluorooctyloxy)-2-(4-dodecylphenyl)pyrimidine
2-[4-(2',5'-Difluorononyloxy)phenyl]-5-octylpyrimidine
2-[4-(2',5'-Difluorononyloxy)phenyl]-5-nonylpyrimidine
2-[4-(2',5'-Difluorononyloxy)phenyl]-5-decylpyrimidine
2-[4-(2',5'-Difluorononyloxy)phenyl]-5-undecylpyrimidine
2-[4-(2',5'-Difluorononyloxy)phenyl]-5-dodecylpyrimidine
5-(2',5'-Difluorononyloxy)-2-(4-octylphenyl)pyrimidine
5-(2',5'-Difluorononyloxy)-2-(4-nonylphenyl)pyrimidine
5-(2',5'-Difluorononyloxy)-2-(4-decylphenyl)pyrimidine
5-(2',5'-Difluorononyloxy)-2-(4-undecylphenyl)pyrimidine
5-(2',5'-Difluorononyloxy)-2-(4-dodecylphenyl)pyrimidine
2-[4-(2',5'-Difluorodecyloxy)phenyl]-5-octylpyrimidine
2-[4-(2',5'-Difluorodecyloxy)phenyl]-5-nonylpyrimidine
2-[4-(2',5'-Difluorodecyloxy)phenyl]-5-decylpyrimidine
2-[4-(2',5'-Difluorodecyloxy)phenyl]-5-undecylpyrimidine
2-[4-(2',5'-Difluorodecyloxy)phenyl]-5-dodecylpyrimidine
5-(2',5'-Difluorodecyloxy)-2-(4-octylphenyl)pyrimidine
5-(2',5'-Difluorodecyloxy)-2-(4-nonylphenyl)pyrimidine
5-(2',5'-Difluorodecyloxy)-2-(4-decylphenyl)pyrimidine
5-(2',5'-Difluorodecyloxy)-2-(4-undecylphenyl)pyrimidine
5-(2',5'-Difluorodecyloxy)-2-(4-dodecylphenyl)pyrimidine
2-[4-(2',6'-Difluorooctyloxy)phenyl]-5-octylpyrimidine
2-[4-(2',6'-Difluorooctyloxy)phenyl]-5-nonylpyrimidine
2-[4-(2',6'-Difluorooctyloxy)phenyl]-5-decylpyrimidine
2-[4-(2',6'-Difluorooctyloxy)phenyl]-5-undecylpyrimidine
2-[4-(2',6'-Difluorooctyloxy)phenyl]-5-dodecylpyrimidine
5-(2',6'-Difluorooctyloxy)-2-(4-octylphenyl)pyrimidine
5-(2',6'-Difluorooctyloxy)-2-(4-nonylphenyl)pyrimidine
5-(2',6'-Difluorooctyloxy)-2-(4-decylphenyl)pyrimidine
5-(2',6'-Difluorooctyloxy)-2-(4-undecylphenyl)pyrimidine
5-(2',6'-Difluorooctyloxy)-2-(4-dodecylphenyl)pyrimidine
2-[4-(2',6'-Difluorononyloxy)phenyl]-5-octylpyrimidine
2-[4-(2',6'-Difluorononyloxy)phenyl]-5-nonylpyrimidine
2-[4-(2',6'-Difluorononyloxy)phenyl]-5-decylpyrimidine
2-[4-(2',6'-Difluorononyloxy)phenyl]-5-undecylpyrimidine
2-[4-(2',6'-Difluorononyloxy)phenyl]-5-dodecylpyrimidine
5-(2',6'-Difluorononyloxy)-2-(4-octylphenyl)pyrimidine
5-(2',6'-Difluorononyloxy)-2-(4-nonylphenyl)pyrimidine
5-(2',6'-Difluorononyloxy)-2-(4-decylphenyl)pyrimidine
5-(2',6'-Difluorononyloxy)-2-(4-undecylphenyl)pyrimidine
5-(2',6'-Difluorononyloxy)-2-(4-dodecylphenyl)pyrimidine
2-[4-(2',6'-Difluorodecyloxy)phenyl]-5-octylpyrimidine
2-[4-(2',6'-Difluorodecyloxy)phenyl]-5-nonylpyrimidine
2-[4-(2',6'-Difluorodecyloxy)phenyl]-5-decylpyrimidine
2-[4-(2',6'-Difluorodecyloxy)phenyl]-5-undecylpyrimidine
2-[4-(2',6'-Difluorodecyloxy)phenyl]-5-dodecylpyrimidine
5-(2',6'-Difluorodecyloxy)-2-(4-octylphenyl)pyrimidine
5-(2',6'-Difluorodecyloxy)-2-(4-nonylphenyl)pyrimidine
5-(2',6'-Difluorodecyloxy)-2-(4-decylphenyl)pyrimidine
5-(2',6'-Difluorodecyloxy)-2-(4-undecylphenyl)pyrimidine
5-(2',6'-Difluorodecyloxy)-2-(4-dodecylphenyl)pyrimidine
2-[4-(2',6'-Difluoroundecyloxy)phenyl]-5-octylpyrimidine
2-[4-(2',6'-Difluoroundecyloxy)phenyl]-5-nonylpyrimidine
2-[4-(2',6'-Difluoroundecyloxy)phenyl]-5-decylpyrimidine
2-[4-(2',6'-Difluoroundecyloxy)phenyl]-5-undecylpyrimidine
2-[4-(2',6'-Difluoroundecyloxy)phenyl]-5-dodecylpyrimidine
5-(2',6'-Difluoroundecyloxy)-2-(4-octylphenyl)pyrimidine
5-(2',6'-Difluoroundecyloxy)-2-(4-nonylphenyl)pyrimidine
5-(2',6'-Difluoroundecyloxy)-2-(4-decylphenyl)pyrimidine
5-(2',6'-Difluoroundecyloxy)-2-(4-undecylphenyl)pyrimidine
5-(2',6'-Difluoroundecyloxy)-2-(4-dodecylphenyl)pyrimidine
2-[4-(3',4'-Difluorohexyloxy)phenyl]-5-octylpyrimidine
2-[4-(3',4'-Difluorohexyloxy)phenyl]-5-nonylpyrimidine
2-[4-(3',4'-Difluorohexyloxy)phenyl]-5-decylpyrimidine 2-[4-(3',4'-Difluorohexyloxy)phenyl]-5-undecylpyrimidine
2-[4-(3',4'-Difluorohexyloxy)phenyl]-5-dodecylpyrimidine
5-(3',4'-Difluorohexyloxy)-2-(4-octylphenyl)pyrimidine
5-(3',4'-Difluorohexyloxy)-2-(4-nonylphenyl)pyrimidine
5-(3',4'-Difluorohexyloxy)-2-(4-decylphenyl)pyrimidine
5-(3',4'-Difluorohexyloxy)-2-(4-undecylphenyl)pyrimidine
5-(3',4'-Difluorohexyloxy)-2-(4-dodecylphenyl)pyrimidine
2-[4-(3',4'-Difluoroheptyloxy)phenyl]-5-octylpyrimidine
2-[4-(3',4'-Difluoroheptyloxy)phenyl]-5-nonylpyrimidine
2-[4-(3',4'-Difluoroheptyloxy)phenyl]-5-decylpyrimidine
2-[4-(3',4'-Difluoroheptyloxy)phenyl]-5-undecylpyrimidine
2-[4-(3',4'-Difluoroheptyloxy)phenyl]-5-dodecylpyrimidine
5-(3',4'-Difluoroheptyloxy)-2-(4-octylphenyl)pyrimidine
5-(3',4'-Difluoroheptyloxy)-2-(4-nonylphenyl)pyrimidine
5-(3',4'-Difluoroheptyloxy)-2-(4-decylphenyl)pyrimidine
5-(3',4'-Difluoroheptyloxy)-2-(4-undecylphenyl)pyrimidine
5-(3',4'-Difluoroheptyloxy)-2-(4-dodecylphenyl)pyrimidine
2-[4-(3',4'-Difluorooctyloxy)phenyl]-5-octylpyrimidine
2-[4-(3',4'-Difluorooctyloxy)phenyl]-5-nonylpyrimidine
2-[4-(3',4'-Difluorooctyloxy)phenyl]-5-decylpyrimidine
2-[4-(3',4'-Difluorooctyloxy)phenyl]-5-undecylpyrimidine
2-[4-(3',4'-Difluorooctyloxy)phenyl]-5-dodecylpyrimidine
5-(3',4'-Difluorooctyloxy)-2-(4-octylphenyl)pyrimidine
5-(3',4'-Difluorooctyloxy)-2-(4-nonylphenyl)pyrimidine
5-(3',4'-Difluorooctyloxy)-2-(4-decylphenyl)pyrimidine
5-(3',4'-Difluorooctyloxy)-2-(4-undecylphenyl)pyrimidine
5-(3',4'-Difluorooctyloxy)-2-(4-dodecylphenyl)pyrimidine
2-[4-(3',4'-Difluorononyloxy)phenyl]-5-octylpyrimidine
2-[4-(3',4'-Difluorononyloxy)phenyl]-5-nonylpyrimidine
2-[4-(3',4'-Difluorononyloxy)phenyl]-5-decylpyrimidine
2-[4-(3',4'-Difluorononyloxy)phenyl]-5-undecylpyrimidine
2-[4-(3',4'-Difluorononyloxy)phenyl]-5-dodecylpyrimidine
5-(3',4'-Difluorononyloxy)-2-(4-octylphenyl)pyrimidine
5-(3',4'-Difluorononyloxy)-2-(4-nonylphenyl)-pyrimidine
5-(3',4'-Difluorononyloxy)-2-(4-decylphenyl)pyrimidine
5-(3',4'-Difluorononyloxy)-2-(4-undecylphenyl)pyrimidine
5-(3',4'-Difluorononyloxy)-2-(4-dodecylphenyl)pyrimidine
2-[4-(3',5'-Difluoroheptyloxy)phenyl]-5-octylpyrimidine
2-[4-(3',5'-Difluoroheptyloxy)phenyl]-5-nonylpyrimidine
2-[4-(3',5'-Difluoroheptyloxy)phenyl]-5-decylpyrimidine
2-[4-(3',5'-Difluoroheptyloxy)phenyl]-5-undecylpyrimidine
2-[4-(3',5'-Difluoroheptyloxy)phenyl]-5-dodecylpyrimidine
5-(3',5'-Difluoroheptyloxy)-2-(4-octylphenyl)pyrimidine
5-(3',5'-Difluoroheptyloxy)-2-(4-nonylphenyl)pyrimidine
5-(3',5'-Difluoroheptyloxy)-2-(4-decylphenyl)pyrimidine
5-(3',5'-Difluoroheptyloxy)-2-(4-undecylphenyl)pyrimidine
5-(3',5'-Difluoroheptyloxy)-2-(4-dodecylphenyl)pyrimidine
2-[4-(3',5'-Difluorooctyloxy)phenyl]-5-octylpyrimidine
2-[4-(3',5'-Difluorooctyloxy)phenyl]-5-nonylpyrimidine
2-[4-(3',5'-Difluorooctyloxy)phenyl]-5-decylpyrimidine
2-[4-(3',5'-Difluorooctyloxy)phenyl]-5-undecylpyrimidine
2-[4-(3',5'-Difluorooctyloxy)phenyl]-5-dodecylpyrimidine
5-(3',5'-Difluorooctyloxy)-2-(4-octylphenyl)pyrimidine
5-(3',5'-Difluorooctyloxy)-2-(4-nonylphenyl)pyrimidine
5-(3',5'-Difluorooctyloxy)-2-(4-decylphenyl)pyrimidine
5-(3',5'-Difluorooctyloxy)-2-(4-undecylphenyl)pyrimidine
5-(3',5'-Difluorooctyloxy)-2-(4-dodecylphenyl)pyrimidine
2-[4-(3',5'-Difluorononyloxy)phenyl]-5-octylpyrimidine
2-[4-(3',5'-Difluorononyloxy)phenyl]-5-nonylpyrimidine
2-[4-(3',5'-Difluorononyloxy)phenyl]-5-decylpyrimidine
2-[4-(3',5'-Difluorononyloxy)phenyl]-5-undecylpyrimidine
2-[4-(3',5'-Difluorononyloxy)phenyl]-5-dodecylpyrimidine
5-(3',5'-Difluorononyloxy)-2-(4-octylphenyl)pyrimidine
5-(3',5'-Difluorononyloxy)-2-(4-nonylphenyl)pyrimidine
5-(3',5'-Difluorononyloxy)-2-(4-decylphenyl)pyrimidine
5-(3',5'-Difluorononyloxy)-2-(4-undecylphenyl)pyrimidine
5-(3',5'-Difluorononyloxy)-2-(4-dodecylphenyl)pyrimidine
2-[4-(3',5'-Difluorodecyloxy)phenyl]-5-octylpyrimidine
2-[4-(3',5'-Difluorodecyloxy)phenyl]-5-nonylpyrimidine
2-[4-(3',5'-Difluorodecyloxy)phenyl]-5-decylpyrimidine
2-[4-(3',5'-Difluorodecyloxy)phenyl]-5-undecylpyrimidine
2-[4-(3',5'-Difluorodecyloxy)phenyl]-5-dodecylpyrimidine
5-(3',5'-Difluorodecyloxy)-2-(4-octylphenyl)pyrimidine
5-(3',5'-Difluorodecyloxy)-2-(4-nonylphenyl)pyrimidine
5-(3',5'-Difluorodecyloxy)-2-(4-decylphenyl)pyrimidine
5-(3',5'-Difluorodecyloxy)-2-(4-undecylphenyl)pyrimidine
5-(3',5'-Difluorodecyloxy)-2-(4-dodecylphenyl)pyrimidine
2-[4-(3',6'-Difluorooctyloxy)phenyl]-5-octylpyrimidine
2-[4-(3',6'-Difluorooctyloxy)phenyl]-5-nonylpyrimidine
2-[4-(3',6'-Difluorooctyloxy)phenyl]-5-decylpyrimidine
2-[4-(3',6'-Difluorooctyloxy)phenyl]-5-undecylpyrimidine
2-[4-(3',6'-Difluorooctyloxy)phenyl]-5-dodecylpyrimidine
5-(3',6'-Difluorooctyloxy)-2-(4-octylphenyl)pyrimidine
5-(3',6'-Difluorooctyloxy)-2-(4-nonylphenyl)pyrimidine
5-(3',6'-Difluorooctyloxy)-2-(4-decylphenyl)pyrimidine
5-(3',6'-Difluorooctyloxy)-2-(4-undecylphenyl)pyrimidine
5-(3',6'-Difluorooctyloxy)-2-(4-dodecylphenyl)pyrimidine
2-[4-(3',6'-Difluorononyloxy)phenyl]-5-octylpyrimidine
2-[4-(3',6'-Difluorononyloxy)phenyl]-5-nonylpyrimidine
2-[4-(3',6'-Difluorononyloxy)phenyl]-5-decylpyrimidine
2-[4-(3',6'-Difluorononyloxy)phenyl]-5-undecylpyrimidine
2-[4-(3',6'-Difluorononyloxy)phenyl]-5-dodecylpyrimidine
5-(3',6'-Difluorononyloxy)-2-(4-octylphenyl)pyrimidine
5-(3',6'-Difluorononyloxy)-2-(4-nonylphenyl)pyrimidine
5-(3',6'-Difluorononyloxy)-2-(4-decylphenyl)pyrimidine
5-(3',6'-Difluorononyloxy)-2-(4-undecylphenyl)pyrimidine
5-(3',6'-Difluorononyloxy)-2-(4-dodecylphenyl)pyrimidine
2-[4-(3',6'-Difluorodecyloxy)phenyl]-5-octylpyrimidine
2-[4-(3',6'-Difluorodecyloxy)phenyl]-5-nonylpyrimidine
2-[4-(3',6'-Difluorodecyloxy)phenyl]-5-decylpyrimidine
2-[4-(3',6'-Difluorodecyloxy)phenyl]-5-undecylpyrimidine
2-[4-(3',6'-Difluorodecyloxy)phenyl]-5-dodecylpyrimidine
5-(3',6'-Difluorodecyloxy)-2-(4-octylphenyl)pyrimidine
5-(3',6'-Difluorodecyloxy)-2-(4-nonylphenyl)pyrimidine
5-(3',6'-Difluorodecyloxy)-2-(4-decylphenyl)pyrimidine
5-(3',6'-Difluorodecyloxy)-2-(4-undecylphenyl)pyrimidine
5-(3',6'-Difluorodecyloxy)-2-(4-dodecylphenyl)pyrimidine
2-[4-(3',6'-Difluoroundecyloxy)phenyl]-5-octylpyrimidine
2-[4-(3',6'-Difluoroundecyloxy)phenyl]-5-nonylpyrimidine
2-[4-(3',6'-Difluoroundecyloxy)phenyl]-5-decylpyrimidine
2-[4-(3',6'-Difluoroundecyloxy)phenyl]-5-undecylpyrimidine
2-[4-(3',6'-Difluoroundecyloxy)phenyl]-5-dodecylpyrimidine
5-(3',6'-Difluoroundecyloxy)-2-(4-octylphenyl)pyrimidine
5-(3',6'-Difluoroundecyloxy)-2-(4-nonylphenyl)pyrimidine
5-(3',6'-Difluoroundecyloxy)-2-(4-decylphenyl)pyrimidine
5-(3',6'-Difluoroundecyloxy)-2-(4-undecylphenyl)pyrimidine
5-(3',6'-Difluoroundecyloxy)-2-(4-dodecylphenyl)pyrimidine
2-[4-(3',7'-Difluorononyloxy)phenyl]-5-octylpyrimidine
2-[4-(3',7'-Difluorononyloxy)phenyl]-5-nonylpyrimidine
2-[4-(3',7'-Difluorononyloxy)phenyl]-5-decylpyrimidine
2-[4-(3',7'-Difluorononyloxy)phenyl]-5-undecylpyrimidine
2-[4-(3',7'-Difluorononyloxy)phenyl]-5-dodecylpyrimidine
5-(3',7'-Difluorononyloxy)-2-(4-octylphenyl)pyrimidine
5-(3',7'-Difluorononyloxy)-2-(4-nonylphenyl)pyrimidine
5-(3',7'-Difluorononyloxy)-2-(4-decylphenyl)pyrimidine
5-(3',7'-Difluorononyloxy)-2-(4-undecylphenyl)pyrimidine
5-(3',7'-Difluorononyloxy)-2-(4-dodecylphenyl)pyrimidine
2-[4-(3',7'-Difluorodecyloxy)phenyl]-5-octylpyrimidine
2-[4-(3',7'-Difluorodecyloxy)phenyl]-5-nonylpyrimidine
2-[4-(3',7'-Difluorodecyloxy)phenyl]-5-decylpyrimidine 2-[4-(3',7'-Difluorodecyloxy)phenyl]-5-undecylpyrimidine
2-[4-(3',7'-Difluorodecyloxy)phenyl]-5-dodecylpyrimidine
5-(3',7'-Difluorodecyloxy)-2-(4-octylphenyl)pyrimidine
5-(3',7'-Difluorodecyloxy)-2-(4-nonylphenyl)pyrimidine
5-(3',7'-Difluorodecyloxy)-2-(4-decylphenyl)pyrimidine
5-(3',7'-Difluorodecyloxy)-2-(4-undecylphenyl)pyrimidine
5-(3',7'-Difluorodecyloxy)-2-(4-dodecylphenyl)pyrimidine
2-[4-(3',7'-Difluoroundecyloxy)phenyl]-5-octylpyrimidine
2-[4-(3',7'-Difluoroundecyloxy)phenyl]-5-nonylpyrimidine
2-[4-(3',7'-Difluoroundecyloxy)phenyl]-5-decylpyrimidine
2-[4-(3',7'-Difluoroundecyloxy)phenyl]-5-undecylpyrimidine
2-[4-(3',7'-Difluoroundecyloxy)phenyl]-5-dodecylpyrimidine
5-(3',7'-Difluoroundecyloxy)-2-(4-octylphenyl)pyrimidine
5-(3',7'-Difluoroundecyloxy)-2-(4-nonylphenyl)pyrimidine
5-(3',7'-Difluoroundecyloxy)-2-(4-decylphenyl)pyrimidine
5-(3',7'-Difluoroundecyloxy)-2-(4-undecylphenyl)pyrimidine
5-(3',7'-Difluoroundecyloxy)-2-(4-dodecylphenyl)pyrimidine
2-[4-(3',7'-Difluorododecyloxy)phenyl]-5-octylpyrimidine
2-[4-(3',7'-Difluorododecyloxy)phenyl]-5-nonylpyrimidine
2-[4-(3',7'-Difluorododecyloxy)phenyl]-5-decylpyrimidine
2-[4-(3',7'-Difluorododecyloxy)phenyl]-5-undecylpyrimidine
2-[4-(3',7'-Difluorododecyloxy)phenyl]-5-dodecylpyrimidine
5-(3',7'-Difluorododecyloxy)-2-(4-octylphenyl)pyrimidine
5-(3',7'-Difluorododecyloxy)-2-(4-nonylphenyl)pyrimidine
5-(3',7'-Difluorododecyloxy)-2-(4-decylphenyl)pyrimidine
5-(3',7'-Difluorododecyloxy)-2-(4-undecylphenyl)pyrimidine
5-(3',7'-Difluorododecyloxy)-2-(4-dodecylphenyl)pyrimidine Each of these compounds has four stereoisomers due to two asymmetric carbon atoms.

The optically active compounds of formula (I) can be used as a mixture with compounds having no optically active group and merely exhibiting a smectic C phase to prepare liquid crystal compositions. Examples of such compounds are shown below.

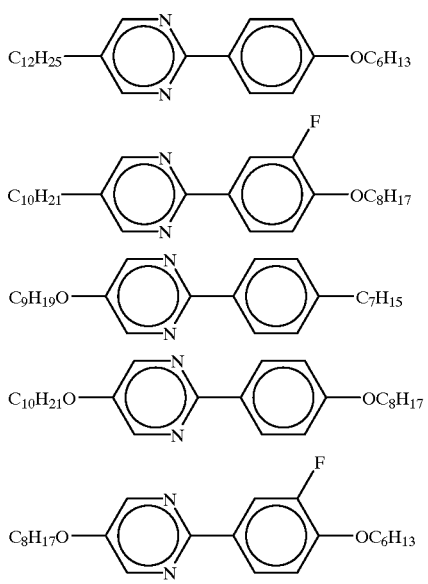

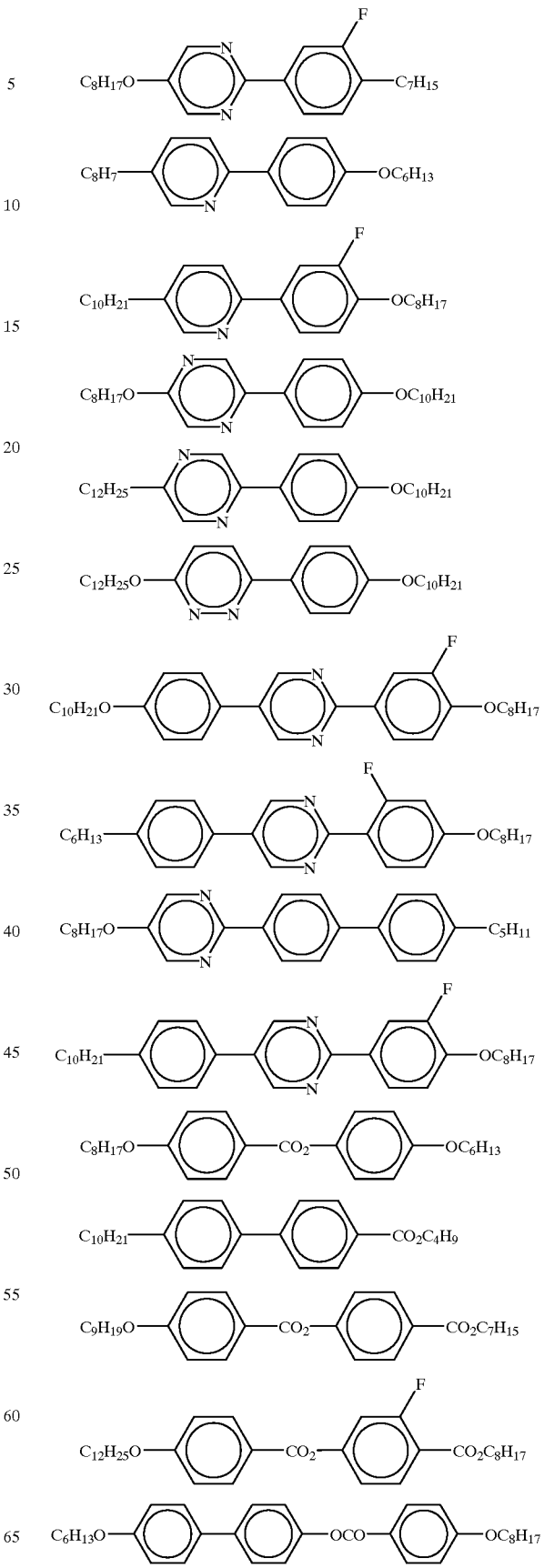

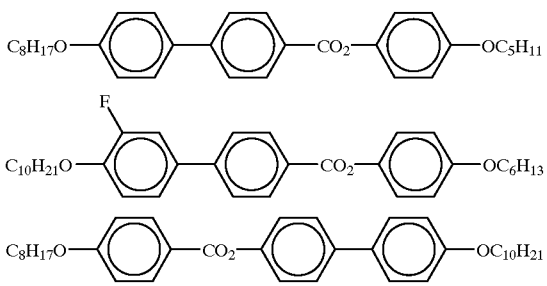

Liquid crystal compositions mainly comprising phenylpyrimidine type compounds are excellent in terms of response time.

Further, the optically active compounds of the present invention can be mixed with commercially available nematic liquid crystal compositions to obtain chiral nematic liquid crystal compositions.

The present invention is now illustrated in greater detail with reference to Examples, but it should be understood that the present invention is not deemed to be limited thereto.

In the foregoing description and the following Examples, a cell used for measurements is a cell comprising a pair of glass substrates each having a transparent electrode, with a polyimide orientation membrane being coated on one side of the substrate and rubbed, assembled with a cell gap of about 2.5 μm.

A spontaneous polarization (Ps) was obtained from a polarization inversion current with a triangular wave of ±10 V applied. A tilt angle was obtained from the extinction position under a crossed Nicol with a square wave of ±20 V applied. A response time was obtained from the speed of change of transmitted light under the same conditions as in the measurement of the tilt angle. The helical pitch in the chiral smectic phase was measured by use of a Cano's wedge cell.

Abbreviations hereinafter used have the following meanings:

I: Isotropic liquid phase

N*: Chiral nematic phase

S$_A$: Smectic A phase

S$_C$*: Chiral smectic C phase

S$_2$, S$_3$: Unidentified chiral smectic phase of higher order

Cr: Crystal phase

Tc: S$_C$*-S$_A$ Phase transition temperature

Ps: Spontaneous polarization

S$_I$*: Chiral smectic I phase

EXAMPLE 1

Synthesis of (2'S,5'S)-2-[4-2'-Fluoro-5'-methylheptyloxyvphenyl]-5-decylpyrimidine Step 1: (S)-2-Methylbutyl bromide (compound (1), R$^1$=ethyl)

In 300 ml flask were charged 100 ml of pyridine and 40 g of (S)-2-methylbutanol (98 ee %) (produced by Tokyo Chemical Industry Co., Ltd.), and the mixture was cooled to 15° C. or less. To the mixture was added 104 g of p-toluenesulfonyl chloride at that temperature over 10 minutes. The inner temperature was returned to room temperature, at which the mixture was allowed to react for 2 hours. Water was added thereto, and the reaction mixture was extracted with ethyl acetate. The extract was washed twice with a saturated sodium chloride aqueous solution. The solvent was removed by distillation under reduced pressure to obtain 104.6 g of (S)-2-methylbutyl p-toluenesulfonate. The resulting compound was put in a 1 l flask, and 300 ml of dimethylformamide (hereinafter abbreviated as DMF) and 47.7 g of lithium bromide (monohydrate) were added thereto, followed by allowing the mixture to react at 60° C. for 5 hours. Water was added thereto, and the reaction mixture was extracted with diethyl ether. The extract was washed twice with water, and diethyl ether was removed by distillation to obtain 60.2 g of a crude product. The crude product was purified by distillation to obtain 45.45 g (66.2%) of the titled compound (b.p.: 55° C./100 mmHg).

MS: 151 (M$^+$).

Step 2: (2R,5S)-2-Hydroxy-5-methylheptyl p-toluenesulfonate (compound (2), R$^1$=ethyl)

In a 100 ml flask were charged 1.7 g of magnesium, 10 ml of dried tetrahydrofuran (hereinafter abbreviated as THF), and a small amount of iodine in a nitrogen stream. The system was heated to 40° C. to activate magnesium. A few drops of a solution of 10.7 g of (S)-2-methylbutyl bromide in 50 ml of dried THF were added thereto through a dropping funnel and, after confirming the commencement of Grignard reaction, the mixture was cooled to 25° C., and the dropwise addition was further continued over 30 minutes to prepare a Grignard reagent.

In a 500 ml flask was put 18 ml of a 0.1 ML$^{-1}$ solution of lithium copper tetrachloride in dried THF, followed by cooling to -50° C. The above prepared Grignard reagent was added thereto over 5 minutes, and the mixture was reacted at that temperature for 20 minutes. To the reaction mixture was added dropwise a solution of 8.07 g of (R)-glycidyl p-toluenesulfonate (produced by Aldrich Chemical Co., Inc.) in 70 ml of dried THF at the same temperature over 20 minutes through a dropping funnel, followed by further reacting for 1.5 hours. The resulting reaction mixture was poured into a saturated ammonium chloride aqueous solution and extracted with diethyl ether. The extract was washed twice with a saturated sodium chloride aqueous solution, and the solvent was removed by distillation under reduced pressure to obtain 10.1 g (95%) of a crude product.

[α]$_D$$^{24}$: -3.89°; MS: 300 (M+); NMR (δ, ppm): 0.85 (6H, m), 1.3 (7H, m), 2.05 (1H, s), 2.43 (3H, s), 3.8 (1H, m), 3.97 (2H, m), 7.35 (2H, m), 7.8 (2H, m).

The optical purity of the 2-positioned asymmetric carbon atom was 99.9 ee % as measured as an α-methoxy-α-trifluoromethylphenylacetic acid (hereinafter abbreviated as MTPA) derivative.

Step 3: (2R,5S)-2-Tetrahydropyranyloxy-5-methylheptyl p-toluenesulfonate (compound (3), R$^1$=ethyl)

In a 50 ml egg-plant type flask were charged 1.7 g of 3,4-dihydro-2H-pyran, 30 ml of diethyl ether, 5.0 g of (2R,5S)-2-hydroxy-5-methylheptyl p-toluenesulfonate, and 50 mg of p-toluenesulfonic acid, and the mixture was stirred at room temperature overnight. The resulting reaction mixture was neutralized with a saturated sodium hydrogencarbonate aqueous solution, and diethyl ether was distilled off under reduced pressure to obtain 6.5 g of a crude product.

Step 4: (2'R,5'S)-2-[4-(2'-Tetrahydropyranyloxy-5'-methylheptyloxy)phenyl]-5-decylpyrimidine (compound (4), R$^1$=ethyl, A=4-(5'-decylpyrimidin-21'-yl)phenyl)

In a 100 ml egg-plant type flask were charged 75 ml of dried DMF, 3.0 g of 2-(4-hydroxyphenyl)-5-decylpyrimidine synthesized in a known manner, 6.0 g of (2R,5S)-2-tetra-hydropyranyloxy-5-methylheptyl p-toluenesulfonate, and 2.15 g of potassium carbonate, and the mixture was allowed to react at 80° C. for 18 hours. Water was added thereto, and the mixture was extracted with ethyl acetate. The extract was washed twice with a saturated sodium chloride aqueous solution, and the solvent was removed by distillation under reduced pressure to obtain 7.0 g of a crude product. Purification by silica gel column chromatography gave 5.0 g (77.5%) of the titled compound.

Step 5: (2'R,5'S)-2-[4-(2'-Hydroxy-5'-methylheptyloxy)-phenyl]-5-decylpyrimidine (compound (5), $R^1$=ethyl, A=4-(5'-decylpyrimidin-2-yl)phenyl)

In a 200 ml egg-plant type flask were charged 100 ml of methanol, 5.0 g of (2'R,5'S)-2-[4-(2'-tetrahydropyranyloxy-5'-methylheptyloxy)phenyl]-5-decylpyrimidine, and 30 ml of p-toluenesulfonic acid, and the mixture was allowed to react at 40 to 45° C. for 1.5 hours. To the reaction mixture was added 1 g of potassium carbonate, and methanol was removed by distillation under reduced pressure at 50° C. or less. Water was added to the residue, and the mixture was extracted with ethyl acetate. The extract was washed twice with a saturated sodium chloride aqueous solution, and the solvent was removed by distillation to obtain 3.6 g of a crude product. Purification by silica gel column chromatography gave 2.56 g (68.2%) of the titled compound.

$[\alpha]_D^{24}$: −7.15°; MS: 440 (M⁺); NMR (δ, ppm): 0.88 (9H, m), 1.3 (18H, m), 1.6 (4H, m), 2.4 (1H, s), 2.6 (2H, m), 3.92 (1H, m), 4.06 (2H, m), 7.0 (2H, m), 8.36 (2H, m), 8.58 (2H, s).

Step 6: (2'S,5'S)-2-[4-(2'-Fluoro-5'-methylheptyloxy)phenyl]-5-decylpyrimidine (compound (6), $R^1$=ethyl, A=4-(5'-decylpyrimidin-2-yl)phenyl)

In a 50 ml flask were charged 2.4 g of (2'R,5'S)-2-[4-(2'-hydroxy-5'-methylheptyloxy)phenyl]-5-decylpyrimidine and 24 ml of methylene chloride, and the mixture was kept at 20 to 25° C. A solution of 1.52 g of hexafluoropropene-diethylamine in 2 ml of methylene chloride was added thereto over 5 minutes, followed by allowing the mixture to react at the same temperature for 45 minutes. Water was added thereto, and the mixture was washed twice with a saturated sodium chloride aqueous solution. The solvent was removed by distillation to obtain 3.4 g of a crude product. The crude product was purified by silica gel column chromatography and then by high performance liquid chromatography (HPLC). Recrystallization from ethanol gave 0.98 g (46.5%) of the titled compound.

$[\alpha]_D^{24}$: +6.05°; MS: 442 (M⁺); NMR (δ, ppm): 0.9 (9H, m), 1.29 (18H, m), 1.6 (3H, m), 1.78 (2H, m), 2.6 (2H, m), 4.1–4.5 (2H, m), 4.85 (1H, m), 7.0 (2H, m), 8.36 (2H, m), 8.58 (2H, s).

The resulting compound had a melting point of 50.5° C. and monotropically showed an S$_A$ phase and an S$_C$* phase. The S$_C$*-S$_A$ phase transition temperature (Tc) was 42.0° C., and the clear point (S$_A$-I phase transition temperature) was 47.1° C. The compound had a high spontaneous polarization (Ps) of 80.1 nC/cm² as measured at (Tc−5)° C.

Because the compounds of the present invention have a plurality of asymmetric carbon atoms, a rate of diastereomer excess (de %) was determined. The rate of diastereomer excess of the compound of Example 1 was found to be 99.2 de %.

COMPARATIVE EXAMPLE 1

Synthesis of (R)-2-[4-(2'-Fluoro-4'-methylpentyloxy)phenyl]-5-decylpyrimidine

The titled compound was prepared by fluorinating (S)-2-[4-(2'-hydroxy-4'-methylpentyloxy)phenyl]-5-decylpyrimidine with hexafluoropropenediethylamine in accordance with the process disclosed in JP-A-63-190842.

$[\alpha]_D^{24}$: +2.46°.

The compound had a melting point of 56.4° C. and monotropically exhibited an S$_A$ phase and an S$_C$* phase. The S$_C$*-S$_A$ transition point was 43.7° C., and the S$_A$-I transition point was 55.7° C. The Ps of the compound was 41.5 nC/cm² (38.7° C.), which was smaller than that of the compound obtained in Example 1. Further, the Ps value was also similar to that of the compound disclosed in JP-A-63-22042 which has no branch at the terminal, indicating that introduction of a branch to the terminal produces no effect.

EXAMPLE 2

Synthesis of (2'R,5'S)-2-[4-(2'-Fluoro-5'-methylheptyloxy)phenyl]-5-decylpyrimidine (compound (6), $R^1$=ethyl, A=4-(5'-decylpyrimidin-2-yl)phenyl)

In the same manner as in Example 1, the titled compound was synthesized from (2S,5S)-2-hydroxy-5-methylheptyl p-toluene-sulfonate (compound (2), $R^1$=ethyl) which was prepared from (S)-2-methylbutyl bromide (compound (1), $R^1$=ethyl) and (S)-glycidyl p-toluenesulfonate.

$[\alpha]_D^{24}$: +0.40°; 97.0 de %; MS: 442 (M⁺); NMR (δ, ppm): 0.88 (9H, m), 1.3 (20H, m), 1.6–1.7 (5H, m), 2.60 (2H, m), 4.16 (2H, m), 4.85 (1H, m), 7.01 (2H, m), 8.36 (2H, m), 8.58 (2H, s).

The compound had a melting point of 56.4° C. and monotropically exhibited an S$_A$ phase and an S$_C$* phase. Tc: 41.4° C. Clear point (S$_A$-I transition point): 47.6° C. Ps: 84.2 nC/cm² at (Tc−5)° C.

The compound of Example 2 was mixed with a nematic liquid crystal composition "ZLI-2582" produced by Merck & Co., Inc. at a mixing proportion of 5.05% by weight. The helical pitch of the N* phase thus induced was measured at a varying temperature and, as a result, proved to have small negative temperature dependence as shown below.

| Measuring Temp. (° C.) | N* Phase Helical Pitch (μm) |
|---|---|
| 30 | 4.72 |
| 40 | 4.55 |
| 50 | 4.45 |
| 60 | 4.36 |

When ZLI-2582 alone was injected into a TN mode cell composed of a pair of substrates having a transparent electrode and a polyimide orientation membrane, the surface of which had been rubbed, at a cell gap of about 10 μm, occurrence of reverse domains was observed. To the contrary, the same cell containing a mixture of ZLI-2582 and 1.0% by weight of the compound of Example 2 proved to be a TN mode optoelectronic element revealing no reverse domain and providing a high contrast.

COMPARATIVE EXAMPLE 2

A compound of formula shown below was synthesized according to the process described in U.S. patent application Ser. No. 07/738,638.

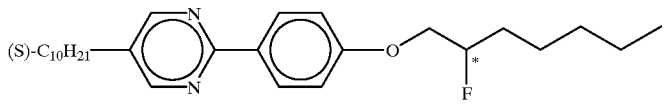

The compound had a melting point of 47.5° C. and enantiotropically exhibited an SA phase and an SC* phase. Tc: 50° C. Clear point (SA-I transition point): 65.9° C. Ps: 44.6 nC/cm$^2$ at (Tc−5)° C.

It can be seen that the compound of Example 2 has a Ps about twice that of the above-described comparative compound.

The compound of Comparative Example 2 was mixed with ZLI-2582 at a mixing proportion of 5.5% by weight, and the helical pitch of the N* phase was measured in the same manner as in Example 2.

| Measuring Temp. (° C.) | N* Phase Helical Pitch (μm) |
|---|---|
| 30 | 25.7 |
| 40 | 19.0 |
| 50 | 14.5 |
| 60 | 11.8 |

The results show that the helical pitch in the N* phase has considerable negative temperature dependence. It is thus seen that temperature dependence of the helical pitch in the N* phase can be significantly reduced by increasing asymmetric carbon as in the compound of Example 2.

EXAMPLE 3

Synthesis of (2'R,5'S)-2-[4-(2'-Fluoro-5'-methylheptyloxy)phenyl]-5-dodecylpyrimidine (compound (6), R$^1$=ethyl, A=4-(5'-dodecylpyrimidin-2-yl)phenyl)

In the same manner as in Example 1, the titled compound was synthesized from (2S,5S)-2-tetrahydropyranyloxy-5-methylheptyl prepared in Example 2 and 2-(4-hydroxyphenyl)-5-dodecylpyrimidine.

[α]$_D$$^{24}$: −0.42°; 98.7 de % MS: 442 (M$^+$); NMR (δ, ppm): 0.9 (9H, m), 1.26 (23H, m), 1.75 (4H, m), 2.6 (2H, m), 4.15 (2H, m), 4.82 (1H, m), 7.0 (2H, m), 8.38 (2H, m), 8.6 (2H, s).

The compound had a melting point of 50.2° C. and monotropically exhibited SA, SC*, and S$_3$ (chiral smectic phase of higher order) phases. S$_3$-SC* transition point: 28.3° C. (while cooling). Tc: 50.4° C. Clear point (SA-I transition point): 51.2° C. Ps: 2.4 nC/cm$^2$ at (Tc−5)° C.

The compound was mixed with ZLI-2582 at a mixing proportion of 5.04% by weight, and the helical pitch of the N* phase was measured in the same manner as in Example 2.

| Measuring Temp. (° C.) | N* Phase Helical Pitch (μm) |
|---|---|
| 40 | 4.66 |
| 50 | 4.55 |
| 60 | 4.47 |

While slight negative temperature dependence was observed, it shows a marked improvement over that observed in Comparative Example 2.

COMPARATIVE EXAMPLE 3

A compound of formula shown below was synthesized in the same manner as in Comparative Example 2.

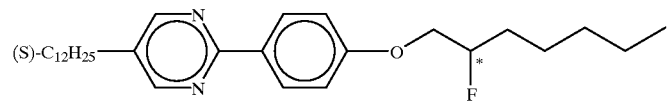

The compound had a melting point of 56.3° C. and exhibited an SA phase, an SC phase and an S$^3$ phase. S$_3$-SC* transition point: 57.3° C. Tc: 61.3° C. Clear point (SA-I transition point): 70.2° C. Ps: 36.2 nC/cm$^2$ at (Tc−5)° C., less than a half of Ps of the compound of Example 3.

The compound was mixed with ZLI-2582 at a mixing proportion of 5.0% by weight, and the helical pitch of the N* phase was measured in the same manner as in Example 2. The results shown below indicate considerable negative temperature dependence of the helical pitch.

| Measuring Temp. (° C.) | N* Phase Helical Pitch (μm) |
|---|---|
| 30 | 29.5 |
| 40 | 19.1 |
| 50 | 14.5 |
| 60 | 12.3 |

EXAMPLE 4

(2'S,5'S)-2-[4-(2'-Fluoro-5'-methylheptyloxy)-phenyl]-5-dodecylpyrimidine (compound (6), R$^1$= ethyl, A=4-(5'-dodecylpyrimidin-2-yl)phenyl)

In the same manner as in Example 1, the titled compound was synthesized from (2R,5S)-2-tetrahydropyranyloxy-5-methylheptyl p-toluenesulfonate and 2-(4-hydroxyphenyl)-5-dodecylpyrimidine.

[α]$_D$$^{24}$: +6.0°; 96.8 de % MS: 470 (M$^+$); NMR (δ, ppm): 0.9 (9H, m), 1.26 (23H, m), 1.7 (4H, m), 2.6 (2H, m), 4.15 (2H, m), 4.82 (1H, m), 7.0 (2H, m), 8.38 (2H, m), 8.6 (2H, s).

The compound had a melting point of 45.9° C. and enantiotropically exhibited an Sc* phase, with an $S_2$ phase (chiral smectic phase of higher order) appearing while cooling. $S_2$-Sc* transition point: 28.2° C. (while cooling). Clear point (Sc*-I transition point): 51.2° C. Ps: 76.9 nC/cm² at (clear point−5)° C.

EXAMPLE 5

(2'S,6'S)-2-[4-2'-Fluoro-6'-methyloctyloxy)-phenyl]-5-decylpyrimidine (compound (15), $R^1$=ethyl, A=4=(5'-decylpyrimidin-2-yl)phenyl)

Step 1: (S)-3-Methylpentanoic acid

In a flask were charged 4.6 g of magnesium and 10 ml of tetrahydrofuran (hereinafter abbreviated as THF) in a nitrogen stream. Few drops of 20 ml of a solution of 30 g of (S)-2-methylbutyl bromide (compound (1), $R^1$=ethyl) prepared in Example 1 in 150 ml of THF and a small amount of iodine were added thereto to initiate a reaction, and the rest of the (S)-2-methylbutyl bromide solution was added dropwise at 25° C., followed by stirring at that temperature for 1 hour to prepare a Grignard reagent.

Separately, 350 g of dry ice and 100 ml of THF were put in a flask and kept at −60° C. The above prepared Grignard reagent was added thereto, and the system was gradually warmed to room temperature. Then, the mixture was adjusted to pH 1 with 35% hydrochloric acid and extracted with ethyl acetate. The extract was washed with water and concentrated to obtain 19.9 g (82.3%) of (S)-3-methylpentanoic acid (compound (7), $R^1$=ethyl).

Step 2: (S)-3-Ethylpentanol (compound (8), $R^1$=ethyl)

In a flask were charged 6.4 g of lithium aluminum hydride and 320 ml of diethyl ether in a nitrogen stream, and the mixture was cooled to −5° C. To the mixture was added dropwise a solution of 19.9 g of (S)-3-methylpentanoic acid prepared in Step 1 in 115 ml of diethyl ether, followed by stirring at that temperature for 1 hour. The reaction was ceased by addition of 1 ml of water, followed by filtration. The filtrate was concentrated to obtain 15.89 g (93.78%) of (S)-3-methylpentanol (compound (8), $R^1$=ethyl).

$[\alpha]_D^{20}$: +7.82°;

Step 3: (S)-3-Methylpentyl methanesulfonate (compound (9), $R^1$=ethyl)

In a flask were charged 15.89 g of (S)-3-methylpentanol and 65 ml of pyrimidine. After cooling to 0° to 50° C., 23.63 g of methanesulfonyl chloride was added thereto dropwise, and the mixture was allowed to react at the same temperature for 1 hour. The reaction mixture was extracted with diethyl ether, and the extract was washed with water and concentrated to obtain 12.14 g (46.42%) of the titled compound.

Step 4: (S)-3-Methylpentyl bromide (compound (10), $R^1$=ethyl)

A solution of 12.14 g of (S)-3-methylpentyl methanesulfonate in 13 ml of THF was added dropwise at room temperature to a mixture of 26.79 g of lithium bromide (monohydrate), 10.73 g of sodium hydrogencarbonate, and 107 ml of THF, and the mixture was reacted at 65° C. for 3 hours. After cooling, the reaction mixture was filtered, and THF was removed by distillation. The residue was distilled to obtain 7.0 g (70.76%) of the titled compound (b.p.: 74° C./76 mmHg).

Step 5: (2R,6S)-2-Hydroxy-6-methyloctyl p-toluenesulfonate (compound (11), $R^1$=ethyl)

In a flask were charged 0.47 g of magnesium and 5 ml of THF in a nitrogen stream. A small amount of iodine and a small amount out of a solution of 3.0 g of (S)-3-methylpentyl bromide obtained in Step 4 in 30 ml of THF were added thereto to initiate a reaction, and the rest of the solution was further added dropwise at 25° C. After the dropwise addition, the mixture was stirred at the same temperature for 1 hour to prepare a Grignard reagent.

Separately, 0.42 g of lithium copper tetrachloride was dissolved in 80 ml of THF in a flask, and the solution was cooled to −50° C. The above prepared Grignard reagent was added dropwise to the solution at that temperature, followed by stirring for 15 minutes. After cooling the reaction mixture to −55° C., a mixture of 2.0 g of (R)-glycidyl p-toluenesulfonate and 20 ml of THF was added thereto dropwise to conduct reaction at that temperature for 1.5 hours. Water was added to the reaction mixture, and the mixture was extracted with ethyl acetate. The extract was washed with water and concentrated to obtain 2.85 g (25.64%) of the titled compound.

Step 6: (2R,6S)-2-Tetrahydropyranyloxy-6-methyloctyl p-toluenesulfonate (compound (12), $R^1$=ethyl)

A mixture of 2.85 g of (2R,6S)-2-hydroxy-6-methyloctyl p-toluenesulfonate obtained in Step 5, 0.8 g of 3,4-dihydro-2H-pyran, 28 ml of diethyl ether, and 0.28 g of p-toluenesulfonic acid was allowed to react in a flask for 6 hours. The resulting solution was poured into 100 ml of a 1% sodium hydrogencarbonate aqueous solution, extracted with diethyl ether, washed with water, and concentrated to obtain 3.58 g of a crude product, which was then purified by HPLC to obtain 2.13 g (99%) of the titled compound.

Step 7: (2'R,6'S)-2-[4-(2'-Tetrahydropyranyloxy-6'-methyloctyloxy]phenyl-5-decylpyrimidine (compound (13), $R^1$=ethyl, A=4-(5'-decylpyrimidin-2'-yl)phenyl)

In a flask were charged 1.56 g of 2-(4-hydroxyphenyl)-5-decylpyrimidine synthesized in a usual manner, 2.13 g of (2R,6S)-2-tetrahydropyranyloxy-6-methyloctyl p-toluenesulfonate obtained in Step 6, 2.22 g of potassium carbonate, and 65 ml of DMF, and the mixture was stirred at 80° C. for 24 hours. After cooling, the reaction mixture was extracted with ethyl acetate, and the extract was distilled to remove ethyl acetate to obtain 3.06 g of a crude product, which was then purified by silica gel column chromatography to obtain 2.7 g (96.34%) of the titled compound.

Step 8: (2'R,6'S)-2-[4-(2'-Hydroxy-6'-methyloctyloxy) phenyl]-5-decylpyrimidine (compound (14), $R^1$=ethyl, A=4-(5'-decylpyrimidin-2'-yl)phenyl)

In a flask were charged 2.7 g of the compound obtained in Step 7 and 135 ml of methanol. After cooling to 0° C., 54 ml of a 0.4% methanolic solution of p-toluenesulfonic acid was added thereto dropwise. After the addition, the mixture was stirred at room temperature for 6 hours. To the mixture was added 0.5 g of sodium hydrogencarbonate, followed by further stirring for 1 hour. Methanol was removed by distillation, and the residue was extracted with ethyl acetate. The extract was washed with water and concentrated, and the residue was purified by HPLC to obtain 2.09 g (95.66%) of the titled compound.

$[\alpha]_D^{20}$: −6.19°.

Step 9: (2'S,6'S)-2-[4-(2'-Fluoro-6'-methyloctyloxy) phenyl]-5-decylpyrimidine (compound (15), $R^1$=ethyl, A=4-(5'-decylpyrimidin-2'-yl)phenyl)

In 20 ml of methylene chloride was dissolved 1.8 g of the compound obtained in Step 8, and a solution of 1.322 g of hexafluoropropenediethylamine in 1.3 ml of methylene chloride was added thereto dropwise while keeping at 30° C., followed by stirring at the same temperature for 15 minutes. The reaction mixture was poured into water and extracted with ethyl acetate. The extract was washed with water and concentrated. The residue was purified by HPLC to obtain 0.7 g (38.8%) of the titled compound.

$[\alpha]_D^{20}$: +5.29°; 96.2 de % MS: 456 (M⁺); NMR (δ, ppm): 0.87 (9H, m), 1.15–1.48 (20H, m), 1.5–1.85 (5H, m), 2.59

(2H, t, J=7.6 Hz), 4.07–4.18 (2H, m), 4.85 (1H, m), 7.01 (2H, m), 8.37 (2H, m), 8.57 (2H, s).

The compound had a melting point of 62.5° C. and monotropically exhibited an S$_A$ phase and an S$_C$* phase. Tc: 56.0° C. Clear point: 59.0° C. PS: 59.9 nC/cm$^2$ at (Tc–5)° C.

The compound was mixed with ZLI-2582 at a mixing proportion of 5.0% by weight, and the helical pitch of the N* phase was measured in the same manner as in Example 2. As a result, slight negative temperature dependence was observed.

| Measuring Temp. (° C.) | N* Phase Helical Pitch ($\mu$m) |
|---|---|
| 30 | 5.8 |
| 40 | 5.5 |
| 50 | 5.1 |
| 60 | 4.9 |

EXAMPLE 6

Synthesis of (2'R,6'S)-2-[4-(2'-Fluoro-6'-methyl-octyloxy)phenyl]-5-decylpyrimidine (compound (15), R$^1$=ethyl, A=4-(5'-decylpyrimidin-2'-yl) phenyl)

In the manner as in Example 5, the titled compound was syntesized from (2S,6S)-2-hydroxy-6-methyloctyl p-toluenesulfonate obtained from (S)-3-methylpentyl bromide and (S)-glycidyl p-toluenesulfonate.

[$\alpha$]$_D^{20}$: +1.88°; MS: 456 (M$^+$); NMR ($\delta$, ppm): 0.87 (9H, m), 1.1–1.45 (19H, m), 1.5 (2H, m), 1.6–1.9 (4H, m), 2.59 (2H, t, J=7.6 Hz), 4.14 (2H, m), 4.85 (1H, m), 7.01 (2H, m), 8.37 (2H, m), 8.57 (2H, s).

The compound had a melting point of 66.1° C. and monotropically exhibited an S$_A$ phase and an S$_C$* phase. Tc: 55.8° C. Clear point (S$_A$-I): 58.8° C. Ps: 49.7 nC/cm$^2$ at (Tc–4)° C.

EXAMPLE 7

Synthesis of (2'S,4'S)-2-[4-(2'-Fluoro-4'-methyloctyloxy)phenyl]-5-decylpyrimidine (compound (29), R$^1$=n-butyl, A=4-(5'-decylpyrimidin-2'-yl)phenyl)

Step 1: (R)-3-Hydroxybutyric acid (compound (17))

In a flask were charged 8 g of sodium hydroxide, 13 ml of water, and 50 ml of ethanol and dissolved. To the resulting solution was added 15 g of methyl (R)-3-hydroxybutyrate (compound (16)), followed by heating at a ref luxing temperature of ethanol for 1 hour. Ethanol was removed from the reaction mixture by distillation under reduced pressure, and 50 ml of water was added to the residue to cool. The mixture was adjusted to pH 1 with 35% hydrochloric acid. Water was removed by distillation under reduced pressure, and 70 ml of ethanol was added to the residue. The thus precipitated salt was removed by filtration, and ethanol was then removed by distillation under reduced pressure. To the residue was added 50 ml of chloroform, and the mixture was dried over magnesium sulfate. Chloroform was distilled off to obtain 12.6 g (95.4%) of (R)-3-hydroxybutyric acid.

[$\alpha$]$_D^{24}$: –24.11°.

Step 2: (2'S,2R,6R)-2-(2'-Methylhexyl)-6-methyl-1,3-dioxanone-4 (compound (18), R$^1$=n-butyl)

A mixture of 100 ml of dried benzene, 10 g of (R)-3-hydroxybutyric acid obtained in Step 1, 18.5 g of (S)-3-methylheptanal, and 2.4 g of pyridinium p-toluenesulfonate was refluxed for 10 hours. After cooling, the reaction mixture was neutralized with a saturated sodium carbonate aqueous solution, washed with a sodium chloride aqueous solution, and distilled under reduced pressure to remove benzene to obtain 19.2 g of a crude product. The crude product was distilled under reduced pressure to obtain 12.3 g (57.5%) of a fraction having a boiling point of 120° C./0.5 mmHg.

Step 3: (3R,1'R,3'S)-3-(1'-Cyano-3'-methylheptyloxy) butyric acid (compound (19), R$^1$=n-butyl)

In a flask were charged 100 ml of dried methylene chloride and 16.5 g of the compound obtained in Step 2, and the mixture was cooled to –60° C. To the mixture was added dropwise a solution of 9.9 g of trimethylsilyl cyanide in 15 ml of dried methylene chloride over 5 minutes, followed by stirring for 15 minutes. Then, a solution of 16.3 g of titanium tetrachloride in 15 ml of methylene chloride was added thereto dropwise over 1 hour, and the mixture was gradually heated to room temperature, followed by stirring for 2 hours. To the reaction mixture was added 80 ml of water. The organic layer was separated, and the solvent was removed therefrom by distillation under reduced pressure to obtain 19 g of a crude product. Purification by silica gel column chromatography gave 14.8 g (58.1%) of the titled compound.

Step 4: (3R,1'R,3'R)-3-(1'-Aminocarbonyl-3'-methylheptyloxy)butyric acid (compound (20), R$^1$=n-butyl)

A mixture of 130 ml of methanol, 52 g of 1-hexene, 17 g of potassium carbonate, and 14.8 g of the compound obtained in Step 3 was kept at 20 to 25° C., and 70 g of 30% hydrogen per-oxide was added thereto over 30 minutes, followed by stirring at 24 to 28° C. for 3 hours. The reaction mixture was poured into ice-water and adjusted to pH 1 with diluted sulfuric acid. The mixture was extracted with 200 ml of ethyl acetate, and the extract was washed successively with water and then an aqueous solution of Mohr's salt. Ethyl acetate was removed by distillation under reduced pressure to obtain 12.5 g of a crude product, which was then purified by silica gel column chromatography to obtain 9.7 g (86.3%) of the titled compound.

Step 5: (2R,4S)-2-Hydroxy-4-methylcaprylic amide (compound (21), R$^1$=n-butyl)

A solution of 0.126 mol of lithium diisopropylamide in 224 ml of THF was cooled to –60° C. in a flask, and a solution of 9.7 g of the compound obtained in Step 4 in 97 ml of THF was added thereto dropwise over 30 minutes. After stirring at that temperature for 3 hours, the temperature was raised up to 0° C. over 1 hour, and the mixture was poured into a saturated ammonium chloride aqueous solution and extracted with 200 ml of ethyl acetate. The extract was washed with water and distilled under reduced pressure to remove ethyl acetate to obtain 4.4 g of a crude product. Purification by silica gel column chromatography gave 3.6 g (57.66%) of the titled compound.

[$\alpha$]$_D^{24}$: +47.67°.

Step 6: (2R,4S)-2-Tetrahydropyranyloxy-4-methylcaprylic amide (compound (22), R$^1$=n-butyl)

In a flask were charged 3.5 g of (2R,4S)-2-hydroxy-4-methylcaprylic amide synthesized in Step 5, 2.21 g of 3,4-dihydropyran, 50 ml of diethyl ether, and 0.1 g of p-toluenesulfonic acid at room temperature, and the mixture was stirred at room temperature overnight. The reaction mixture was poured into 100 ml of a 1% sodium hydrogen-carbonate aqueous solution and extracted with diethyl ether. The extract was washed with water and concentrated to obtain 6.6 g of a crude product, which was then purified by silica gel column chromatography to obtain 3.5 g (67.4%) of the titled compound.

Step 7: (2R,4S)-2-Tetrahydropyranyloxy-4-methylcaprylic acid (compound (23), $R^1$=n-butyl)

In an egg-plant type flask were charged 7.66 g of 85% potassium hydroxide, 3 ml of water, 60 ml of ethanol, and 3.0 g of the compound obtained in Step 6, and the mixture was refluxed for 10 hours. Ethanol was removed by distillation under reduced pressure, and 30 ml of water was added to the residue. The mixture was adjusted to pH 1 with concentrated hydrochloric acid and then extracted with ethyl acetate. The extract was washed with water, and the solvent was removed by distillation under reduced pressure to obtain 2.6 g of a crude product. Purification by silica gel column chromatography gave 1.8 g (59.77%) of the titled compound.

Step 8: Methyl (2R,4S)-2-tetrahydropyranyloxy-4-methylcaprylate (compound (24), $R^1$=n-butyl)

A solution of 1.17 g of (2R,4S)-2-tetrahydropyranyloxy-4-caprylic acid obtained in Step 7 in 100 ml of diethyl ether was cooled to −50° C., and 200 ml of a diethyl ether solution of 75.68 mmol of diazomethane was poured thereinto. The mixture was stirred at room temperature for 1 hour, and diethyl ether was removed from the reaction mixture by distillation to obtain 2.12 g (100%) of the titled compound.

Step 9: (2R,4S)-2-Tetrahydropyranyloxy-4-methyloctanol (compound (25), $R^1$=n-butyl)

A mixture of 0.6 g of lithium aluminum hydride and 60 ml of diethyl ether was kept at −5° to −10° C., and a solution of the ester derivative (2.12 g) obtained in Step 8 in 50 ml of diethyl ether was added thereto dropwise, followed by stirring at that temperature for 2 hours. The reaction mixture was poured into ice-water and extracted with diethyl ether. The extract was washed with water and distilled to remove the solvent to obtain 1.51 g (70.01%) of the titled compound.

Step 10: (2R,4S)-2-Tetrahydropyranyloxy-4-methyloctyl methanesulfonate (compound (26), $R^1$=n-butyl)

A mixture of 1.51 g of (2R,4S)-2-tetrahydropyranyloxy-4-methyloctanol obtained in Step 9 and 15 ml of pyridine was kept at −5° C., and 1.06 g of methanesulfonyl chloride was added thereto, followed by stirring at that temperature for 1 hour. The reaction mixture was poured into ice-water and extracted with diethyl ether. The extract was adjusted to pH 5 with 1% hydrochloric acid, washed with water, dried, and distilled to remove the solvent to obtain 1.74 g (77.81%) of the titled compound.

Step 11: (2'R,4'S)-2-[4-(2'-Tetrahydropyranyloxy-4'-methyloctyloxy)phenyl]-5-decylpyrimidine (compound (27), $R^1$=n-butyl, A=4-(5'-decylpyrimidin-2'-yl)phenyl)

In a flask were charged 1.5 g of 2-(4-hydroxyphenyl)-5-decylpyrimidine, 1.74 g of the compound obtained in Step 10, 1.99 g of potassium carbonate, and 45 ml of DMF, and the mixture was stirred at 80° C. for 24 hours. After cooling, the reaction mixture was poured into water and extracted with ethyl acetate. The extract was washed with water, and the solvent was removed by distillation under reduced pressure to obtain 2.77 g of a crude product, which was then purified by HPLC to recover 1.53 g (80.32%) of the titled compound.

Step 12: (2'R,4'S)-2-[4-(2'-Hydroxy-4'-methyloctyloxy)phenyl]-5-decylpyrimidine (compound (28), $R^1$=n-butyl, A=4-(5'-decylpyrimidin-2-yl)phenyl)

In a flask were charged 1.5 g of the compound obtained in Step 11 and 75 ml of methanol, and the mixture was cooled to 0° C. To the mixture was added dropwise 30 ml of a 0.4% methanolic solution of p-toluenesulfonic acid, followed by stirring at room temperature for 6 hours. To the reaction mixture was further added 0.5 g of sodium hydrogencarbonate, followed by further stirring for 1 hour. Methanol was removed by distillation under reduced pressure, and the residue was extracted with ethyl acetate. The extract was washed with water and concentrated, and the residue was purified by HPLC to obtain 1.10 g (87.2%) of the titled compound.

Step 13: (2'S,4'S)-2-[4-(2'-Fluoro-4'-methyloctyloxy)phenyl]-5-decylpyrimidine (compound (29), $R^1$=n-butyl, A=4-(5'-decylpyrimidin-2-yl)phenyl)

In 10 ml of methylene chloride was dissolved 1.0 g of (2'R,4'S)-2-[4-(2'-hydroxy-4'-methyloctyloxy)phenyl]-5-decylpyrimidine, and a solution of 0.75 g of hexafluoropropenediethylamine in 1 ml of methylene chloride was added thereto dropwise while keeping at 30° C., followed by stirring at that temperature for 15 minutes. Water was added thereto, and the reaction mixture was extracted with ethyl acetate. The extract was washed with water and concentrated, and the residual crude product was purified by HPLC to obtain 0.47 g of a crude product. Analysis of the product with an optically active column "CHIRALCEL OJ" (produced by Daicel Chemical Industries, Ltd.) revealed the existence of diastereomers so that the product was fractionated by use of the same column to obtain 0.15 g (14.86%) of the titled compound.

$[\alpha]_D^{24}$: −0.74°; 98.9 de % MS: 457 ($M^+$); NMR (δ, ppm): 0.88 (3H, t, J=7.0 Hz), 0.90 (3H, t, J=6.9 Hz), 0.98 (3H, d, J=6.2 Hz), 1.15–1.4 (19H, m), 1.55 (1H, m), 1.6–1.75 (5H, m), 2.60 (2H, t, J=7.6 Hz), 4.08–4.18 (2H, m), 4.95 (1H, m), 7.01 (2H, m), 8.37 (2H, m), 8.58 (2H, s).

The compound had a melting point of 34.6° C. and enantiotropically exhibited an $S_A$ phase and monotropically exhibited an $S_C^*$ phase. Tc: 28.3° C. Clear point ($S_A$-I): 39.2° C. Ps: 25.8 nC/cm² at (Tc−5)° C.

EXAMPLE 8

Synthesis of (2'R,4'S)-2-[4-(2'-Fluoro-4'-methyloctyloxy)phenyl]-5-decylpyrimidine (compound (29), $R^1$=n-butyl, A=4-(5'-decylpyrimidin-2'-yl)phenyl In the same manner as in Example 7, the titled compound was synthesized from (S)-3-hydroxybutyric acid, compound (17), and (S)-2-methylheptanal.

$[\alpha]_D^{24}$: +7.432°; 98.5 de % MS: 457 ($M^+$); NMR (δ, ppm): 0.89 (6H, m), 0.98 (3H, d, J=6.6 Hz), 1.1–1.48 (20H, m), 1.64 (3H, m), 1.75 (1H, m), 1.9 (1H, m), 2.60 (2H, t, J=7.6 Hz), 4.08–4.20 (2H, m), 4.97 (1H, m), 7.01 (2H, m), 8.37 (2H, m), 8.58 (2H, s).

The compound had a melting point of 28.3° C. and enantiotropically exhibited an $S_A$ phase and an $S_C^*$ phase. Tc: 38.1° C. Clear point ($S_A$-I): 45.6° C. Ps: 74.5 nC/cm² at (Tc−5)° C.

EXAMPLE 9

Synthesis of (2'S,3'S)-2-[4-(2'-Fluoro-3'-methylpentyloxy)phenyl]-5-decylpyrimidine Step 1: Ethyl (2S,3S)-2-hydroxy-3-methylvalerate (compound (31), $R^1$=ethyl)

In a 300 ml flask were charged 20 g of L-isoleucine (compound (30), $R^1$=ethyl) and 200 ml of 50% acetic acid, and an aqueous solution of 21 g of sodium nitrite was added thereto dropwise under cooling with ice. After the addition, the mixture was stirred at room temperature for 1 hour and extracted with diethyl ether. Diethyl ether was removed by distillation, and to the residue were added 0.5 g of p-toluenesulfonic acid, 300 ml of ethanol, and 100 ml of benzene, followed by heat-refluxing while removing by-produced water azeotropically with benzene and ethanol. Diethyl ether was added to the reaction mixture, and the mixture was washed with water and dried over magnesium sulfate. The solvent was removed by distillation to obtain a crude product, which was then purified by distillation to obtain 9.5 g (43.7%) of the titled compound (b.p.: 60° C./5 mmHg).

The optical purity of the α-positioned asymmetric carbon atom was found to be 98.2 ee % as measured as an MTPA derivative.

Step 2: Ethyl (2S,3S)-2-tetrahydropyranyloxy-3-methylvalerate (compound (32), $R^1$=ethyl)

In a 200 ml flask were charged 10 g of ethyl (2S,3S)-2-hydroxy-3-methylvalerate, 10.5 g of 3,4-dihydro-2H-pyran, 0.24 g of p-toluenesulfonic acid, and 100 ml of diethyl ether, and the mixture was allowed to react at room temperature overnight. The reaction mixture was neutralized with a sodium hydrogencarbonate aqueous solution, and diethyl ether was removed by distillation to obtain 6.15 g (49.7%) of a crude product.

Step 3: (2S,3S)-2-Tetrahydropyranyloxy-3-methylpentanol (compound (33), $R^1$=ethyl)

In a 50 ml flask were charged 1.2 g of lithium aluminum hydride and 50 ml of THF, and a solution of 7.85 g of the compound obtained in Step 2 in 20 ml of THF was added thereto dropwise under ice-cooling, followed by stirring at room temperature for 1 hour. Then, 1.2 ml of water and 20 ml of THF were added thereto dropwise over 15 minutes. To the reaction mixture was further added dropwise 3.6 ml of a 4% sodium hydroxide aqueous solution under cooling with ice over 40 minutes, followed by filtration through zeolite. The filtrate was distilled under reduced pressure to remove the solvent, and the resulting crude product was purified by silica gel column chromatography to obtain 5.9 g (20.9%) of the titled compound.

Step 4: (2'S,3'S)-2-[4-(2'-Tetrahydropyranyloxy-3'-methylpentyloxy)phenyl]-5-decylpyrimidine (compound (34), $R^1$=ethyl, A=4-(5'-decylpyrimidin-2'-yl)phenyl)

In benzene was dissolved 1.3 g of (2S,3S)-2-tetrahydropyranyloxy-3-methylpentanol obtained in Step 3, and methanesulfonyl chloride (0.77 g (1.05 eq.)) was added to the solution dropwise under cooling with ice, followed by stirring at room temperature for 6 hours. Water was added thereto, and the mixture was extracted with ethyl acetate. The solvent was removed by distillation, and to the residue were added 1.5 g of 2-(4-hydroxyphenyl)-5-decylpyrimidine, 2.0 g of potassium carbonate, and 40 ml of DMF, followed by allowing to react at 50° C. for 24 hours. After cooling, water was added thereto, and the reaction mixture was washed with a sodium chloride aqueous solution and dried over magnesium sulfate. The solvent was removed by distillation, and the residue was purified by silica gel column chromatography to obtain 1.76 g (54.8%) of the titled compound.

Step 5: (2'S,3'S)-2-[4-(2'-Hydroxy-3'-methylpentyl)phenyl]-5-decylpyrimidine (compound (35), $R^1$=ethyl, A=4-(5'-decylpyrimidin-2'-yl)phenyl)

In a 100 ml egg-plant type flask were charged 50 ml of methanol, 1.8 g of the compound obtained in Step 4, and 11 mg of p-toluenesulfonic acid, and the mixture was allowed to react at 40 to 45° C. for 1.5 hours. To the reaction mixture was added 1 g of potassium carbonate, methanol was removed by distillation under reduced pressure at 50° C. or less, water was added to the residue, and the mixture was extracted with ethyl acetate. The extract was washed twice with a sodium chloride aqueous solution and dried over magnesium sulfate. The solvent was removed by distillation under reduced pressure, and the residual crude product was purified by silica gel column chromatography and then by HPLC to obtain 0.57 g (39.0%) of the titled product.

Step 6: (2'R,3S)-2-[4-(2'-Fluoro-3'-methylpentyl)phenyl]-5-decylpyrimidine (compound (36), $R^1$=ethyl, A=4=(5'-decylpyrimidin-2'-yl)phenyl)

In a 50 ml flask were charged 0.53 g of the compound obtained in Step 5 and 20 ml of methylene chloride, and a solution of 0.82 g of hexafluoropropenediethylamine in 2 ml of methylene chloride was added thereto dropwise over 5 minute while maintaining at 20 to 25° C., followed by stirring at that temperature for 1 hour. Water was added thereto, and the reaction mixture was washed with a sodium chloride aqueous solution and dried over magnesium sulfate. The solvent was removed by distillation, and the residue was purified by silica gel column chromatography and then by HPLC to obtain 0.12 g (21.7%) of the titled compound.

$[\alpha]_D^{25}$: −1.39°; MS: 414 (M+); NMR (δ, ppm): 0.88 (3H, t, J=7.1 Hz), 1.03 (3H, m), 1.26–1.43 (21H, m), 2.15 (1H, m), 2.60 (2H, t, J=7.4 Hz), 4.19 (2H, t, J=3.6 Hz), 4.79 (1H, m), 6.99 (2H, m), 8.36 (2H, m), 8.58 (1H, m).

The compound had a melting point of 29.5° C. and enantiotropically exhibited an SA phase and monotropically exhibited an Sc* phase. Tc: 29.3° C. Clear point (SA-I): 34.8° C. Ps: 17.5 nC/cm² at (Tc−5)° C.

The compound was mixed with ZLI-2582 at a mixing proportion of 5.0% by weight, and the helical pitch of the N* phase was measured in the same manner as in Example 2. As a result, slight positive temperature dependence was observed.

| Measuring Temp. (° C.) | N* Phase Helical Pitch (μm) |
| --- | --- |
| 30 | 6.4 |
| 40 | 6.6 |
| 50 | 6.8 |
| 60 | 7.1 |

EXAMPLE 10

Synthesis of (2'S,5'S)-5-(2'-Fluoro-5'-methylpentyloxy)-2-(4-decylphenyl)pyrimidine (compound (6), $R^1$=ethyl, A=2-(4'-decylphenyl)pvrimidin-5-yl)

Step 1: (2'R,5'S)-5-(2'-Tetrapyranyloxy-5'-methylheptyloxy)-2-(4-decylphenyl)pyrimidine (compound (4), $R^1$=ethyl, A=2-(4'-decylphenyl)pyrimidin-5-yl)

In a flask were charged 3.7 g of (2R,5S)-2-tetrahydropyranyloxy-5-methylheptyl p-toluenesulfonate (compound (3), $R^1$=ethyl) obtained in Step 3 of Example 1, 2.0 g of 5-hydroxy-2-(4-decylphenyl)pyrimidine, 2.65 g of potassium carbonate, and 60 ml of DMF at room temperature, and the mixture was stirred at 80° C. 4 hours. After completion of the reaction, the reaction mixture was cooled, water was added thereto, and the mixture was extracted with ethyl acetate. The extract was washed with water, and the solvent was removed by distillation to obtain 4.23 g of a crude product. Purification of the crude product by HPLC gave 2.7 g (57.8%) of the titled compound.

Step 2: (2'R,5'S)-5-(2'-Hydroxy-5'-methylheptyloxy)-2-(4-decylphenyl)pyrimidine (compound (5), $R^1$=ethyl, A=2-(4'-decylphenyl)pyrimidin-5-yl)

In a flask were charged 2.7 g of the compound obtained in Step 1 above and 125 ml of methanol, and the mixture was cooled to 0° C. To the mixture was added dropwise 75 ml of a 0.4% methanolic solution of p-toluenesulfonic acid, followed by stirring at room temperature for 2 hours. To the reaction mixture was added 0.5 g of sodium hydrogencarbonate, and the stirring was continued for an additional 1 hour. Methanol was removed by distillation, and the residue was extracted with ethyl acetate. The extract was washed with water, and the solvent was removed by distillation to obtain 2.25 g (98.6%) of the titled compound.

Step 3: (2'S,5'S)-5-(2'-Fluoro-5'-methylheptyloxy)-2-(4-decylphenyl)pyrimidine (compound (6), $R^1$=ethyl, A=2-(4'-decylphenyl)pyrimidin-5-yl)

In 20 ml of methylene chloride was dissolved 2 g of the hydroxy derivative obtained in Step 2, and a solution of 1.52 g of hexafluoropropenediethylamine in 1.52 ml of methylene chloride was added thereto dropwise while maintaining at 30° C., followed by stirring at that temperature for 15 minutes. The reaction mixture was extracted with ethyl acetate, and the extract was washed with water, followed by concentration. The residue was purified by HPLC to obtain 0.65 g (32.8%) of the titled compound.

$[\alpha]_D^{20}$: +8.06°; 98.4 de % MS: 442 (M$^+$); NMR (δ, ppm): 0.9 (9H, m), 1.15–1.45 (18H, m), 1.53–1.85 (5H, m), 2.66 (2H, t, J=7.7 Hz), 4.20 (2H, m), 4.72 (1H, m), 7.28 (2H, m), 8.25 (2H, m), 8.48 (2H, s).

The compound had a melting point of 38.7° C. and monotropically exhibited an S$_A$ phase and an S$_C$* phase. Tc: 23.1° C. S$_A$-I Transition point: 33.8° C. Ps: 174.7 nC/cm$^2$ at (Tc−3)° C.

EXAMPLE 11

Synthesis of (3'S,5'R)-2-[4-(3',5'-Difluorononyloxy)phenyl]-5-decylpyrimidine (Compound (46), $R^1$=n-butyl, A=4-(5'-decylpyrimidin-2-yl)phenyl)

Step 1: Methyl (S)-3-benzyloxyheptanoate (compound (38), $R^1$=n-butyl)

In a 2 ℓ flask were charged 275 ml of methylene chloride, 550 ml of cyclohexane, 140 g of benzyl trichloroacetoimidate, and 75 g of methyl (S)-3-hydroxyheptanoate (compound (37), $R^1$=ethyl), and 6 ml of trifluoromethanesulfonic acid was added thereto over 5 minutes while maintaining at 20 to 25° C., followed by allowing the mixture to react at 35 to 40° C. for 5 hours. The by-produced salt was removed by filtration, and the filtrate was washed with a sodium hydrogencarbonate aqueous solution. The solvent was removed by distillation under reduced pressure, and the residue was distilled under reduced pressure to obtain 99.0 g (78.7%) of the titled compound (b.p.: 105–108° C./0.1 mmHg).

Step 2: t-Butyl (S)-5-benzyloxy-3-oxononanoate (compound (39), $R^1$=n-butyl)

In a 1 ℓ flask were charged 400 ml of dried THF and 42.6 g of dried diisopropylamine in a nitrogen stream, and the mixture was cooled to −10° to −5° C. To the mixture was added a 1.6 mole/l hexane solution of 263 ml of n-butyllithium over 30 minutes, followed by stirring at the same temperature for 1 hour to prepare a lithium diisopropylamide solution.

A solution of 48.7 g of t-butyl acetate in 50 ml of dried THF was then added dropwise to the solution from a dropping funnel at the same temperature over 30 minutes, followed by stirring for 45 minutes. The resulting reaction mixture was further cooled to −50° C., and a solution of 45.4 g of methyl (S)-3-benzyloxyheptanoate in 50 ml of dried THF was added thereto over 30 minutes, followed by stirring for 2 hours while maintaining at that temperature. The reaction mixture was poured into a saturated ammonium chloride aqueous solution and extracted with diethyl ether. The extract was washed with a sodium chloride aqueous solution, and the solvent was removed by distillation under reduced pressure to obtain 67 g of a crude product, which was then purified by silica gel column chromatography to obtain 36 g (53.3%) of the titled compound.

Step 3: t-Butyl (3S,5S)-5-benzyloxy-3-hydroxynonanoate (compound (40), $R^1$=n-butyl)

In a 500 ml autoclave were charged 95 ml of dried methanol, 22.0 g of the compound obtained in Step 2, and 0.634 g of (S)-iodo-π-p-cymene[2,2'-bis(di-p-tolylphosphino)-1,1'-binaphthyl]ruthenium iodide in a nitrogen stream, and the mixture was allowed to react at room temperature under a hydrogen pressure of 75 to 80 kg/cm$^2$ for 18 hours. The solvent was removed by distillation under reduced pressure to obtain 22.3 g of a crude product. Purification by silica gel column chromatography gave 16.3 g (73.4%) of the titled compound.

An aliquot of the resulting compound was ester-exchanged to a methyl ester and converted to an MTPA derivative. The benzyl ether moiety thereof was hydrogenolyzed using palladium-on-carbon to determine an optical purity of the 3-positioned asymmetric carbon atom. It was found to be 99.8 ee %.

Step 4: t-Butyl (3R,5S)-5-benzyloxy-3-fluorononanoate (compound (41), $R^1$=n-butyl)

In a 300 ml flask were charged 163 ml of methylene chloride and 16.3 g of the hydroxy derivative obtained in Step 3, and a solution of 10.7 g of hexafluoropropenediethylamine in 11 ml of methylene chloride was added thereto dropwise at 20 to 25° C. over 10 minutes, followed by stirring for 45 minutes. Water was added thereto, and the mixture was washed with a sodium chloride aqueous solution. The solvent was distilled off under reduced pressure to obtain 24.4 g of a crude product. Purification by silica gel column chromatography gave 10.6 g (78.4%) of the titled compound.

Step 5: t-Butyl (3R,5S)-3-fluoro-5-hydroxynonanoate (compound (42), $R^1$=n-butyl)

In a 200 ml flask were charged 60 ml of methanol, 3.18 g of 10% palladium-on-carbon, and 10.6 g of t-butyl (3R, 5S)-5-benzyloxy-3-fluorononanoate obtained in Step 4, and hydrogenolysis was conducted at room temperature for 8 hours. The catalyst was removed by filtration, and the filtrate was distilled to remove the solvent. The residue was purified by silica gel column chromatography to obtain 5.0 g (64.2%) of the titled compound.

Step 6: (3S,5S)-3-Fluoro-5-hydroxynonanol (compound (43), $R^1$=n-butyl)

In a 100 ml flask were charged dried THF and 0.59 g of lithium aluminum hydride in a nitrogen stream, followed by cooling to 5° C. To the mixture was added dropwise a solution of 5.0 g of the compound obtained in Step 5 in 17 ml of dried THF over 20 minutes, followed by allowing the mixture to react at 35 to 40° C. for 3 hours. The reaction mixture was again cooled to 5° C., and a solution of 0.6 g of water and 2 ml of THF was added thereto over 30 minutes. Then, 1.6 ml of a 4% sodium hydroxide aqueous solution was added thereto, followed by stirring at that temperature for 1 hour.

The by-produced salt was removed by filtration, and the filtrate was dried over potassium carbonate. The solvent was removed by distillation to obtain 3.9 g of a crude product, which was then purified by silica gel column chromatography to obtain 2.7 g (75.5%) of the titled compound.

Step 7: (3'S,5'S)-2-[4-(3'-Fluoro-5'-hydroxynonyloxy)phenyl]-5-decylpyrimidine (compound (45), $R^1$=n-butyl, A=4-(5'-decylpyrimidin-2'-yl)phenyl)

In a 20 ml flask were charged 7.5 ml of pyridine and 2.7 g of (3S,5S)-3-fluoro-5-hydroxynonanol obtained in Step 6, followed by cooling to 5° C. To the mixture was added 2.1 g of methanesulfonyl chloride over 5 minutes, followed by allowing the mixture to react at room temperature for 1 hour. Water was added thereto, and the reaction mixture was extracted with diethyl ether. The extract was washed with a sodium chloride aqueous solution, and the solvent was removed by distillation under reduced pressure to obtain 4.0 g of a methanesulfonic acid ester.

In a 200 ml flask were charged 4.0 g of the resulting ester, 100 ml of DMF, 2.3 g of potassium carbonate, and 2-(4-hydroxyphenyl)-5-decylpyrimidine (4.88 g), and the mixture was allowed to react at 80° C. for 2.5 hours. Water was added thereto, and the mixture was extracted with ethyl acetate. The extract was washed with a sodium chloride aqueous solution, and the solvent was removed by distillation to obtain 4.9 g of a crude product. The crude product was purified by silica gel column chromatography to obtain 1.7 g (47.4%) of the titled compound.

Step 8: (3'S,5'R)-2-[4-(3',5'-Difluorononyloxy)phenyl]-5-decylpyrimidine (compound (46), $R^1$=n-butyl, A=4-(5'-decylpyrimidin-2'-yl)phenyl)

In a 50 ml flask were charged 30 ml of methylene chloride and 1.7 g of the compound obtained in Step 7, and the solution was kept at 20° C. To the solution was added a solution of 0.963 g of hexafluoropropenediethylamine in 2 ml of methylene chloride over 5 minutes, followed by allowing the mixture to react at that temperature for 45 minutes. Water was added, and the mixture was washed with a sodium chloride aqueous solution.

The solvent was removed by distillation to obtain 2.5 g of a crude product. The crude product was purified by silica gel column chromatography and then by HPLC to obtain 0.5 g (29.3%) of the titled compound.

$[\alpha]_D^{24}$: −9.35°; MS: 474 (M$^+$); NMR (δ, ppm): 0.88 (3H, t, J=6.9 Hz), 0.92 (3H, t, J=7.2 Hz), 1.2–1.55 (18H, m), 1.55–1.80 (4H, m), 1.82–2.07 (1H, m), 2.07–2.22 (3H, m), 2.60 (2H, t, J=7.6 Hz), 4.19 (2H, m), 4.72 (1H, m), 4.98 (1H, m), 6.99 (2H, m), 8.36 (2H, m), 8.58 (2H, s).

The compound had a melting point of 54.9° C. and monotropically exhibited only an Sc* phase. Sc*-I Transition point: 53.4° C. Ps: 52.2 nC/cm² at (Tc−5)° C.

The compound was mixed with ZLI-2582 at a mixing proportion of 5.0% by weight, and the helical pitch of the N* phase was measured in the same manner as in Example 2. As a result, slight positive temperature dependence was observed.

| Measuring Temp. (° C.) | N* Phase Helical Pitch (μm) |
| --- | --- |
| 30 | 3.1 |
| 40 | 3.2 |
| 50 | 3.2 |
| 60 | 3.3 |

EXAMPLE 12

Synthesis of (3'R,5'S)-2-[4-(3', 5'-Difluorononyloxy)phenyl]-5-decylpyrimidine (compound (46), $R^1$=n-butyl, A=4-(5'-decylpyrimidin-2'-yl)phenyl)

The titled compound was synthesized in the same manner as in Example 11.

$[\alpha]_D^{24}$: +9.55°; MS: 474 (M$^+$); NMR (δ, ppm): 0.88 (3H, t, J=6.9 Hz), 0.92 (3H, t, J=7.2 Hz), 1.2–1.55 (18H, m), 1.55–1.82 (4H, m), 1.85–2.07 (1H, m), 2.07–2.25 (3H, m), 2.60 (2H, t, J=7.6 Hz), 4.2 (2H, m), 4.72 (1H, m), 4.98 (1H, m), 6.99 (2H, m), 8.36 (2H, m), 8.57 (2H, s).

The compound had a melting point of 56.8° C. and monotropically exhibited an Sc* phase. Sc*-I Transition point: 53.4° C. Ps: 54.6 nC/cm².

EXAMPLE 13

Synthesis of (3'R,5'R)-2-[4-(3'-Fluoro-5'-methylonyloxy phenyl]-5-decylpyrimidine Step 1: (R)-3-Methyl-1-heptenyldiethylamine (compound (48), $R^1$=n-butyl)

In a 500 ml pressure-resistant vessel made of glass were charged 260 ml of a 4.9 mmole/l THF solution of (S)-di[2, 2'-bis(di-p-tolylphosphino)-1,1'-binaphthyl]rhodium chlorate and 60 g of 3-methyl-2-heptenyldiethylamine (compound (47), $R^1$=n-butyl), and the mixture was allowed to react at 100° C. for 18 hours. THF was removed by distillation under reduced pressure, and the residue was distilled to obtain 56 g (93.3%) of the titled compound (b.p.: 85° C./7 mmHg).

Step 2: (R)-3-Methylheptanal (compound (49), $R^1$=n-butyl)

In a 300 ml flask were charged 86 ml of hexane and 56 g of (R)-3-methyl-1-heptenyldiethylamine obtained in Step 1, followed by cooling to 0° C. To the solution was added 73 g of 20% sulfuric acid over 1.5 hours, followed by stirring for 20 minutes. After completion of the reaction, 50 ml of diethyl ether was added thereto, and the reaction mixture was washed with water. The solvent was removed by distillation to obtain 34.2 g (86.2%) of a crude product.

Step 3: (R)-3-Methylheptanoic acid (compound (50), $R^1$=n-butyl)

In a 1 ℓ flask were charged 333 ml of water and 80 g of concentrated sulfuric acid, and the solution was kept at 20° C. To the solution was added 34.2 g of (R)-3-methylheptanal obtained in Step 2, and 42 g of potassium permanganate was further added thereto at the same temperature over 1 hour, followed by allowing the mixture to react for 2 hours. Then, 2 g of sodium sulfite was further added thereto at 20° C. or less over 30 minutes. The reaction mixture was extracted with diethyl ether, the extract washed with a sodium chloride aqueous solution, and the solvent removed by distillation, to obtain 35.5 g (91.2%) of a crude product.

The optical purity as measured as a naphthylamine derivative was found to be 96.2 ee %.

Step 4: Methyl (R)-3-methylheptanoate (compound (51), $R^1$=n-butyl)

In a 500 ml flask were charged 300 ml of methanol, 35.5 g of (R)-3-methylheptanoic acid obtained in Step 3, and 0.5 g of concentrated sulfuric acid, and the mixture was heated at a methanol refluxing temperature for 18 hours. Methanol was distilled off under reduced pressure, and the residue was extracted with diethyl ether. The extract was washed with water, neutralized with a sodium carbonate aqueous solution, and then washed with a sodium chloride aqueous solution. Diethyl ether was removed by distillation, and the residue was distilled under reduced pressure to obtain 29 g (76.8%) of the titled compound (b.p.: 80° C./20 mmHg).

Step 5: t-Butyl (R)-5-methyl-3-oxononanoate (compound (52), $R^1$=n-butyl)

In a 1 ℓ flask were charged 370 ml of dried THF and 38.4 g of diisopropylamine in a nitrogen stream, and the solution was cooled to −10° to −5° C. To the solution was added dropwise a 1.6 mole/l hexane solution of 238 ml of n-butyllithium at that temperature over 30 minutes, followed by stirring at that temperature for 1 hour. To the mixture was further added dropwise a solution of 44 g of t-butyl acetate in 44 ml of dried THF over 30 minutes while keeping at that temperature, followed by stirring for 1 hour. The resulting reaction mixture was cooled to −50° C., and a solution of 24 g of methyl (R)-3-methylheptanoate in 24 ml of dried THF was added thereto dropwise over 30 minutes, followed by allowing the mixture to further react at that temperature for 1.5 hours. After the reaction, a saturated ammonium chloride aqueous solution was added to the reaction mixture, and the mixture was extracted with diethyl ether. The extract was washed twice with a sodium chloride aqueous solution, and the solvent was removed by distillation under reduced pressure to obtain 45.2 g of a crude product. Purification by silica gel column chromatography gave 31.0 g (84.0%) of the titled compound.

Step 6: t-Butyl (3S,5R)-3-hydroxy-5-methylnonanoate (compound (53), $R^1$=n-butyl)

In a 200 ml autoclave were charged 50 ml of methanol, 14.0 g of t-butyl (R)-5-methyl-3-oxononanoate obtained in Step 5, and a solution of 0.49 g of (S)-di[2,2'-bis (diphenylphosphino)-1,1'-binaphthyl] tetrachlorodiruthenium triethylamine in 40 ml of methylene chloride, and the mixture was allowed to react under a hydrogen pressure of 60 kg/cm² for 18 hours. The solvent was removed by distillation under reduced pressure to obtain 13.6 g of a crude product, which was then purified by silica gel column chromatography to obtain 10.3 g (72.5%) of the titled compound.

An aliquot of the resulting compound was ester-exchanged to a methyl ester and converted to an MTPA derivative. The optical purity of the 3-positioned asymmetric carbon atom was found to be 99.9 ee %.

Step 7: t-Butyl (3R,5R)-3-fluoro-5-methylnbnanoate (compound (54), $R^1$=n-butyl)

In a 100 ml flask were charged 60 ml of methylene chloride and 6.0 g of t-butyl (3S,5R)-3-hydroxy-5-methylnonanoate obtained in Step 6, and the solution was kept at 20° C. A solution of 6.9 g of hexafluoropropenediethylamine in 7 ml of methylene chloride was added to the solution at that temperature over 5 minutes, followed by stirring for 45 minutes. Water was added thereto, the reaction mixture was washed with a sodium chloride aqueous solution, and the solvent was removed by distillation under reduced pressure to obtain 11.27 g of a crude product. Purification by silica gel column chromatography gave 4.2 g (40.3%) of the titled compound.

Step 8: (3R,5R)-3-Fluoro-5-methylnonanol (compound (55), $R^1$=n-butyl)

In a 100 ml flask were charged dried THF and 0.7 g of lithium aluminum hydride in a nitrogen stream, followed by cooling to 10° C. or less. A solution of 4.2 g of t-butyl (3R,5R)-3-fluoro-5-methylnonanoate obtained in Step 7 in 13 ml of dried THF was added thereto over 30 minutes, and the resulting mixture was allowed to react at 30 to 35° C. for 1.5 hours. After cooling to 5° C., a mixture of 0.7 ml of water and 2 ml of THF was added thereto over 30 minutes, and 1.5 ml of a 4% sodium hydroxide aqueous solution was then added, followed by stirring at that temperature for 1 hour. The by-produced salt was removed by filtration, and calcium carbonate was added to the filtrate to dry. The solvent was removed by distillation to obtain 2.9 g (96.5%) of a crude product.

Step 9: (3'R,5'R)-2-[4-(3'-Fluoro-5'-methylnonyloxy)phenyl]-5-decylpyrimidine (compound (57), $R^1$=n-butyl, A=4-(5'-decylpyrimidin-2'-yl)phenyl)

In a 200 ml of flask were charged 7 ml of pyridine and 1.5 g of (3R,5R)-3-fluoro-5-methylnonanol obtained in Step 8, followed by cooling to 5° C. To the solution was added 1.2 g of methanesulfonyl chloride at that temperature over 10 minutes, followed by stirring at room temperature for 1 hour. Water was added, the mixture extracted with diethyl ether, the extract washed with a sodium chloride aqueous solution, and diethyl ether removed by distillation under reduced pressure, to obtain 1.9 g of a crude methanesulfonic acid ester.

In a 100 ml flask were charged 1.9 g of the resulting crude product, 25 ml of dried DMF, 1.17 g of potassium carbonate, and 1.0 g of 2-(4-hydroxyphenyl)-5-decylpyrimidine, and the mixture was stirred at 80° C. for 2 hours. After cooling, water was added, the mixture extracted with ethyl acetate, the extract washed with a sodium chloride aqueous solution, and the solvent removed by distillation under reduced pressure, to obtain 2.5 g of a crude product. The crude product was purified by silica gel column chromatography and then by HPLC, followed by recrystallization from ethanol to obtain 0.84 g (33.7%) of the titled compound.

$[\alpha]_D^{24}$: -2.81°; MS: 470 (M⁺); NMR (δ, ppm): 0.89 (6H, m), 0.94 (3H, d, J=6.3 Hz), 1.1–1.57 (21H, m), 1.57–1.7 (4H, m), 2.03–2.12 (2H, m), 2.60 (2H, t, J=7.6 Hz), 4.18 (2H, m), 4.87 (1H, m), 6.99 (2H, m), 8.36 (2H, m), 8.57 (2H, s).

The compound had a melting point of 46.4° C. and monotropically exhibited an Sc* phase and an S₂ phase. S₂-Sc* Transition point: -5.7° C. (while cooling). Clear point (Sc*-I): 38.9° C. Ps: 95.2 nC/cm² at (clear point–5)° C.

EXAMPLE 14

Synthesis of (3'R,5'S)-2-[4-(3'-Fluoro-5'-methylnonyloxy)phenyl]-5-decylpyrimidine (compound (56), $R^1$=n-butyl, A=4-(5'-decylpyrimidin-2'-yl)phenyl The titled compound was synthesized in the same manner as in Example 13.

$[\alpha]_D^{24}$: -3.72°; MS: 470 (M⁺); NMR (δ, ppm): 0.89 (6H, m), 0.95 (3H, d, J=6.6 Hz), 1.15–1.42 (20H, m), 1.57–1.87 (5H, m), 1.96–2.16 (2H, m), 2.60 (2H, t, J=7.6 Hz), 4.18 (2H, m), 4.87 (1H, m), 6.99 (2H, m), 8.36 (2H, m), 8.57 (2H, s).

The compound had a melting point of 56.6° C. and monotropically exhibited an Sc* phase and an S₂ phase. S₂-Sc* Transition point: 13.6° C. (while cooling). Clear point (Sc*-I): 51.1° C. Ps: 72.6 nC/cm² at (clear point–5)° C.

The compound was mixed with ZLI-2582 at a mixing proportion of 5.08% by weight, and the helical pitch of the N* phase was measured in the same manner as in Example 2. As a result, no temperature dependence was observed at all.

| Measuring Temp. (° C.) | N* Phase Helical Pitch (μm) |
| --- | --- |
| 30 | 2.3 |
| 40 | 2.3 |
| 50 | 2.3 |
| 60 | 2.3 |

EXAMPLE 15

Synthesis of (3'S,5'R)-2-[4-(3'-Fluoro-5'-methylnonyloxy phenyl]-5-decylpyrimidine The titled compound was synthesized in the same manner as in Example 13.

$[\alpha]_D$24: +3.5°; MS: 470 (M⁺); NMR (δ, ppm): 0.89 (6H, m), 0.95 (3H, d, J=6.6 Hz), 1.18–1.42 (20H, m), 1.58–1.88

(5H, m), 1.97–2.17 (2H, m), 2.60 (2H, t, J=7.6 Hz), 4.18 (2H, m), 4.88 (1H, m), 6.99 (2H, m), 8.36 (2H, m), 8.58 (2H, s).

The compound had a melting point of 54.6° C. and monotropically exhibited an Sc* phase and an S$_2$ phase. S$_2$-Sc* Transition point: −13.4° C. (while cooling). Clear point (Sc*-I): 51.0° C. Ps: 75.1 nC/cm$^2$ at (clear point−5)° C.

EXAMPLE 16

Synthesis of (3'S,5'S)-2-[4-(3'-Fluoro-5'-methylnonyloxy)phenyl]-5-decylpyrimidine The titled compound was synthesized in the same manner as in Example 13.

$[\alpha]_D^{24}$: +2.89°; MS: 470 (M$^+$); NMR (δ, ppm): 0.89 (6H, m), 0.94 (3H, d, J=6.4 Hz), 1.1–1.57 (21H, m), 1.57–1.70 (4H, m), 2.0–2.15 (2H, m), 2.59 (2H, t, J=7.6 Hz), 4.18 (2H, m), 4.76 (1H, m), 6.99 (2H, m), 8.36 (2H, m), 8.57 (2H, s).

The compound had a melting point of 46.1° C. and monotropically exhibited an Sc* phase and an S$_2$ phase. S$_2$-Sc* Transition point: −5.6° C. (while cooling). Clear point (Sc*-I): 38.9° C. Ps: 91.9 nC/cm$^2$ at (clear point−5)° C.

EXAMPLE 17

The following phenylpyrimidine compounds were mixed to prepare an achiral base liquid crystal composition (A).

| | mole % |
|---|---|
| C$_8$H$_{17}$–[pyrimidine]–[phenyl]–OC$_6$H$_{13}$ | 21.1 |
| C$_8$H$_{17}$–[pyrimidine]–[phenyl]–OC$_8$H$_{17}$ | 19.7 |
| C$_7$H$_{15}$–[pyrimidine]–[phenyl]–OC$_9$H$_{19}$ | 19.7 |
| C$_6$H$_{13}$–[pyrimidine]–[phenyl]–OC$_8$H$_{17}$ | 21.1 |
| C$_8$H$_{17}$–[pyrimidine]–[phenyl]–OC$_{10}$H$_{21}$ | 18.4 |

Phase transition temperatures of liquid crystal composition (A) are shown below.

$$I \xleftarrow{67°\,C.} N \xleftarrow{50.7°\,C.} S_A \xleftarrow{48°\,C.} S_C \xleftarrow{4.1°\,C.} Cr$$

To liquid crystal composition (A) was added the compound synthesized in Example 1 to obtain a ferroelectric liquid crystal composition.

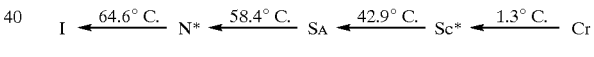

| | |
|---|---|
| [compound with F, (S),(S) stereocenters] | 9.3 mole % |
| Liquid crystal composition (A) | 90.7 mole % |

Phase transition temperatures of the resulting ferroelectric liquid crystal composition are shown below.

$$I \xleftarrow{64.6°\,C.} N^* \xleftarrow{58.4°\,C.} S_A \xleftarrow{42.9°\,C.} S_C^* \xleftarrow{1.3°\,C.} Cr$$

The ferroelectric liquid crystal composition was injected into a 3 μm thick liquid crystal cell. Characteristics of the resulting element are shown below.

| Measuring Temperature (° C.) | Ps (nC/cm$^2$) | Tilt Angle (°) | Response Time (μsec) |
|---|---|---|---|
| Tc-5 | 3.1 | 14 | 46 |
| Tc-10 | 4.4 | 17 | 78 |
| Tc-15 | 5.3 | 19 | 108 |
| Tc-20 | 6.1 | 21 | 138 |

COMPARATIVE EXAMPLE 4

To achiral base liquid crystal composition (A) was added the following compound to obtain a liquid crystal composition.

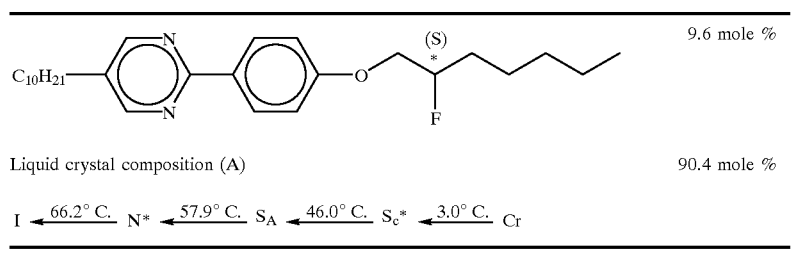

Liquid crystal composition (A)  90.4 mole %

I $\xleftarrow{66.2° C.}$ N* $\xleftarrow{57.9° C.}$ S$_A$ $\xleftarrow{46.0° C.}$ S$_c$* $\xleftarrow{3.0° C.}$ Cr Properties of the composition as a ferroelectric liquid crystal element were as follows.

| Measuring Temperature (° C.) | Ps (nC/cm$^2$) | Tilt Angle (°) | Response Time (μsec) |
|---|---|---|---|
| Tc-5 | 2.8 | 15 | 82 |
| Tc-10 | 3.6 | 18 | 113 |
| Tc-15 | 4.4 | 21 | 143 |
| Tc-20 | 5.1 | 22 | 177 |

On comparing the element of Example 17 with that of Comparative Example 4, it is apparent that the liquid crystal composition containing the compound of the present invention has a larger spontaneous polarization and a faster response time.

EXAMPLE 18

A ferroelectric liquid crystal composition was prepared from achiral base liquid crystal composition (A) obtained in Example 17 and the compound obtained in Example 2.

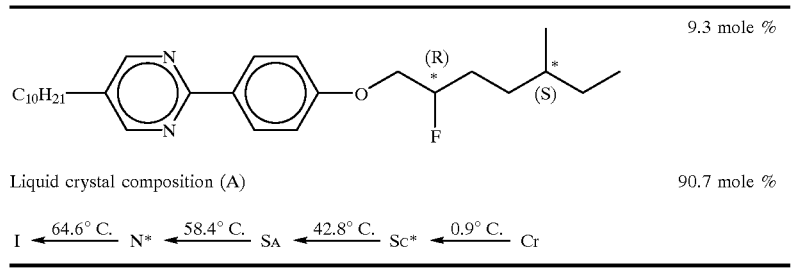

Liquid crystal composition (A)  90.7 mole %

I $\xleftarrow{64.6° C.}$ N* $\xleftarrow{58.4° C.}$ S$_A$ $\xleftarrow{42.8° C.}$ S$_C$* $\xleftarrow{0.9° C.}$ Cr Properties of the composition as a ferroelectric liquid crystal element were as follows.

| Measuring Temperature (° C.) | Ps (nC/cm$^2$) | Tilt Angle (°) | Response Time (μsec) |
|---|---|---|---|
| Tc-5 | 3.4 | 14 | 56 |
| Tc-10 | 4.6 | 17 | 87 |
| Tc-15 | 5.5 | 19 | 117 |
| Tc-20 | 6.4 | 20 | 148 |

EXAMPLE 19

A ferroelectric liquid crystal composition was obtained from achiral base composition (A) and the compound synthesized in Example 5.

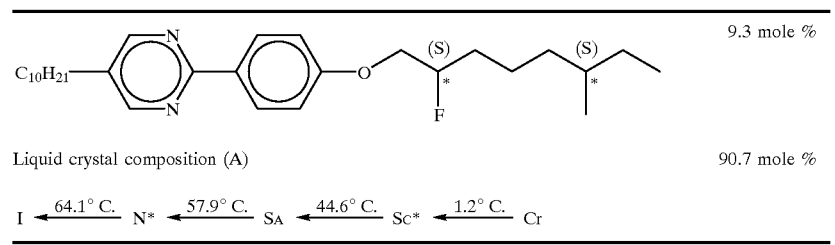

Liquid crystal composition (A)  90.7 mole %

I $\xleftarrow{64.1° C.}$ N* $\xleftarrow{57.9° C.}$ S$_A$ $\xleftarrow{44.6° C.}$ S$_C$* $\xleftarrow{1.2° C.}$ Cr Properties of the composition as a ferroelectric liquid crystal element were as follows.

| Measuring Temperature (° C.) | Ps (nC/cm$^2$) | Tilt Angle (°) | Response Time ($\mu$sec) |
|---|---|---|---|
| Tc-5 | 3.2 | 14 | 53 |
| Tc-10 | 4.4 | 17 | 87.5 |
| Tc-15 | 5.7 | 20 | 120 |
| Tc-20 | 6.1 | 21 | 144.5 |

EXAMPLE 20

A ferroelectric liquid crystal composition was obtained from achiral base composition (A) and the compound synthesized in Example 8.

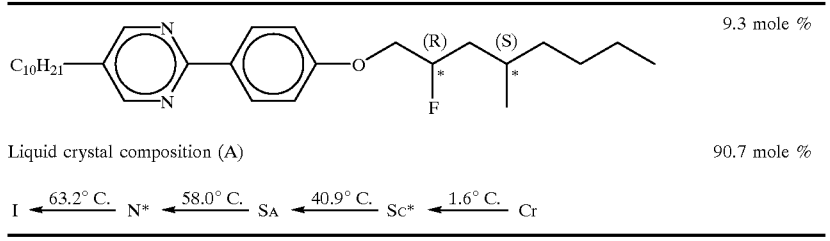

9.3 mole %

Liquid crystal composition (A)    90.7 mole %

I $\xleftarrow{63.2° C.}$ N* $\xleftarrow{58.0° C.}$ S$_A$ $\xleftarrow{40.9° C.}$ Sc* $\xleftarrow{1.6° C.}$ Cr Properties of the composition as a ferroelectric liquid crystal element were as follows.

| Measuring Temperature (° C.) | Ps (nC/cm$^2$) | Tilt Angle (°) | Response Time ($\mu$sec) |
|---|---|---|---|
| Tc-5 | 1.9 | 14 | 103 |
| Tc-10 | 2.2 | 17 | 161 |
| Tc-15 | 2.7 | 19 | 233 |
| Tc-20 | 3.0 | 21 | 317 |

EXAMPLE 21

A ferroelectric liquid crystal composition containing the compound synthesized in Example 10 was obtained.

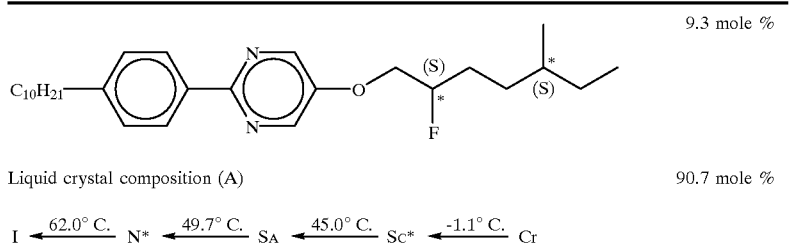

9.3 mole %

Liquid crystal composition (A)    90.7 mole %

I $\xleftarrow{62.0° C.}$ N* $\xleftarrow{49.7° C.}$ S$_A$ $\xleftarrow{45.0° C.}$ Sc* $\xleftarrow{-1.1° C.}$ Cr Properties of the composition as a ferroelectric liquid crystal element were as follows.

| Measuring Temperature (° C.) | Ps (nC/cm$^2$) | Tilt Angle (°) | Response Time ($\mu$sec) |
|---|---|---|---|
| Tc-5 | 4.5 | 18 | 88 |
| Tc-10 | 6.8 | 21 | 106 |
| Tc-15 | 8.7 | 23 | 131 |
| Tc-20 | 9.8 | 25 | 162 |

EXAMPLE 22

A ferroelectric liquid crystal composition containing the compound synthesized in Example 12 was obtained.

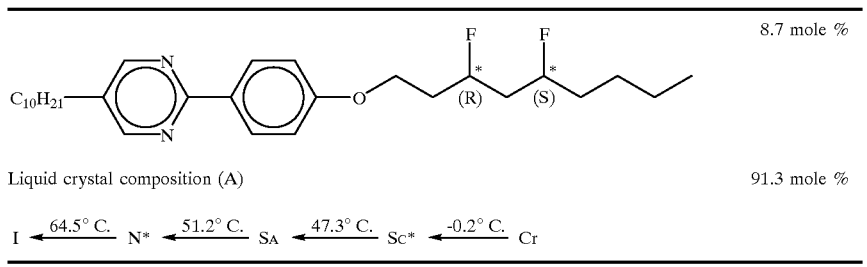

8.7 mole %

Liquid crystal composition (A)     91.3 mole %

I ←64.5° C.— N* ←51.2° C.— S_A ←47.3° C.— S_C* ←-0.2° C.— Cr

Properties of the composition as a ferroelectric liquid crystal element were as follows.

| Measuring Temperature (° C.) | Ps (nC/cm$^2$) | Tilt Angle (°) | Response Time (μsec) |
|---|---|---|---|
| Tc-5 | 1.9 | 18 | 102 |
| Tc-10 | 2.9 | 22 | 138 |
| Tc-15 | 3.4 | 24 | 185 |
| Tc-20 | 4.0 | 25 | 264 |

EXAMPLE 23

A ferroelectric liquid crystal composition containing the optically active compound synthesized in Example 14 was obtained.

Properties of the composition as a ferroelectric liquid crystal element were as follows.

| Measuring Temperature (° C.) | Ps (nC/cm$^2$) | Tilt Angle (°) | Response Time (μsec) |
|---|---|---|---|
| Tc-5 | 3.2 | 17 | 78 |
| Tc-10 | 4.5 | 21 | 106 |
| Tc-15 | 5.3 | 23 | 139 |
| Tc-20 | 5.5 | 24 | 179 |

EXAMPLE 24

A ferroelectric liquid crystal composition containing the optically active compound synthesized in Example 1 and the optically active compound disclosed in Japanese Patent Appln. No. Hei-2-201164 was obtained.

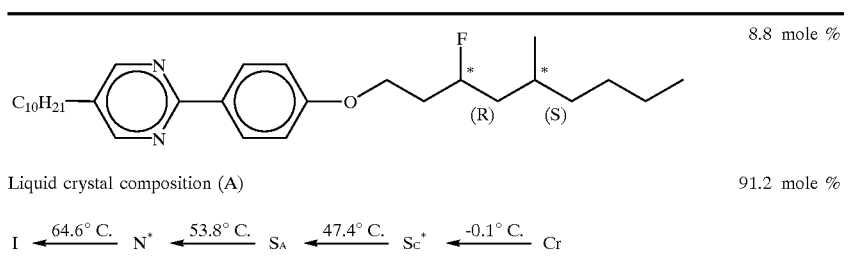

8.8 mole %

Liquid crystal composition (A)     91.2 mole %

I ←64.6° C.— N* ←53.8° C.— S_A ←47.4° C.— S_C* ←-0.1° C.— Cr

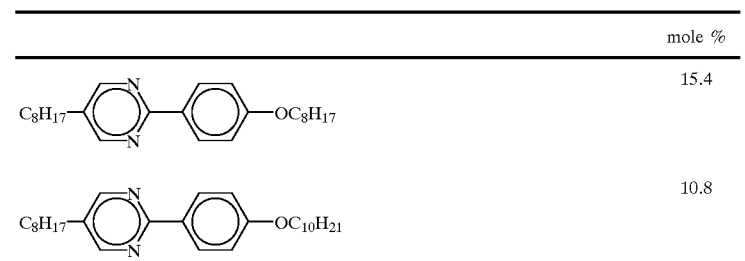

| | mole % |
|---|---|
| C$_8$H$_{17}$—pyrimidine—C$_6$H$_4$—OC$_8$H$_{17}$ | 15.4 |
| C$_8$H$_{17}$—pyrimidine—C$_6$H$_4$—OC$_{10}$H$_{21}$ | 10.8 |

-continued

| | mole % |
|---|---|
| 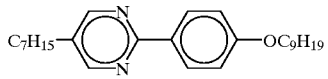 | 23.1 |
| 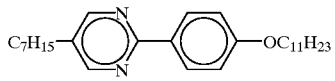 | 14.4 |
| 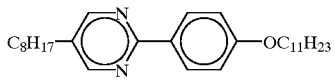 | 10.5 |
| 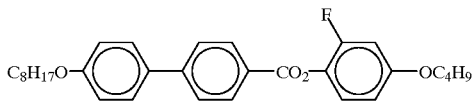 | 10.9 |
| 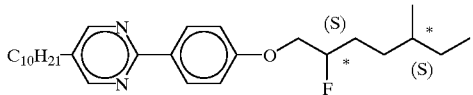 | 13.6 |
| 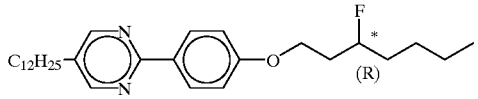 | 1.3 |

The phase transition temperatures and physical properties of the composition were as follows.

| Measuring Temperature (° C.) | Ps (nC/cm²) | Tilt Angle (°) | Response Time (μsec) |
|---|---|---|---|
| Tc-10 | 12 | 16 | 18.4 |
| Tc-20 | 12 | 19 | 38.0 |
| Tc-27.5 | 12 | 19 | 69.6 |

The liquid crystal composition showed sufficient memory properties and a high contrast ratio as a ferroelectric liquid crystal electro-optic element.

EXAMPLE 25

A ferroelectric liquid crystal composition containing the compound synthesized in Example 1 and the optically active compound disclosed in Japanese Patent Appln. No. Hei-2-201164 was prepared.

| | mole % |
|---|---|
| 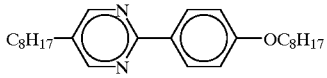 | 15.7 |
| 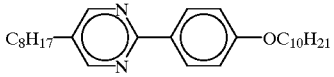 | 10.9 |
| 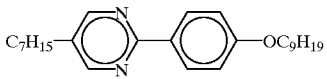 | 23.5 |

-continued

| | mole % |
|---|---|
| 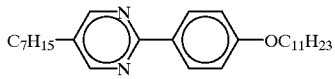 C$_7$H$_{15}$—[pyrimidine]—[phenyl]—OC$_{11}$H$_{23}$ | 14.6 |
| 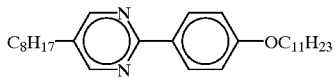 C$_8$H$_{17}$—[pyrimidine]—[phenyl]—OC$_{11}$H$_{23}$ | 10.7 |
| 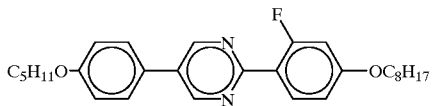 C$_5$H$_{11}$O—[phenyl]—[pyrimidine]—[fluorophenyl]—OC$_8$H$_{17}$ | 9.5 |
| 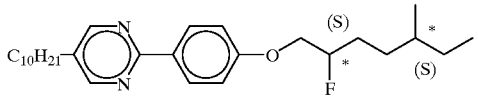 C$_{10}$H$_{21}$—[pyrimidine]—[phenyl]—O—CH(S)—CHF(S)*—CH$_2$—CH(CH$_3$)*—C$_2$H$_5$ | 13.6 |
| 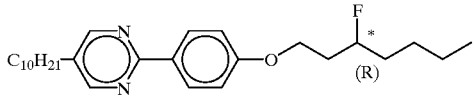 C$_{10}$H$_{21}$—[pyrimidine]—[phenyl]—O—CH$_2$—CH$_2$—CHF(R)*—C$_4$H$_9$ | 1.4 |

The phase transition temperatures and physical properties of the composition were as follows.

$$I \xleftarrow{74.6°\text{C.}} N^* \xleftarrow{68.8°\text{C.}} S_A \xleftarrow{56.9°\text{C.}} S_C^* \xleftarrow{-3.5°\text{C.}} Cr$$

| Measuring Temperature (° C.) | Ps (nC/cm$^2$) | Tilt Angle (°) | Response Time (μsec) |
|---|---|---|---|
| Tc-10 | 8.3 | 18 | 39.3 |
| Tc-20 | 11.2 | 23 | 64.3 |
| Tc-30 | 13.3 | 25 | 95.8 |

EXAMPLE 26

The following phenylpyrimidine compounds were mixed to obtain a smectic liquid crystal composition (B).

| | mole % |
|---|---|
| 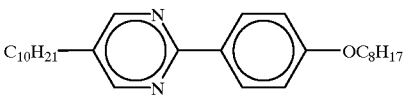 C$_{12}$H$_{25}$—[pyrimidine]—[phenyl]—OC$_8$H$_{17}$ | 16.6 |
| 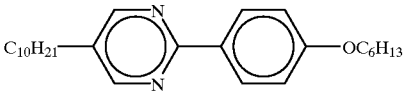 C$_{11}$H$_{23}$—[pyrimidine]—[phenyl]—OC$_9$H$_{19}$ | 16.7 |
| 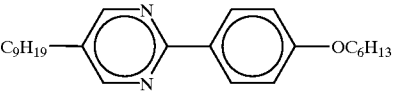 C$_{11}$H$_{23}$—[pyrimidine]—[phenyl]—OC$_7$H$_{15}$ | 16.6 |
| 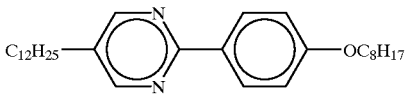 C$_{10}$H$_{21}$—[pyrimidine]—[phenyl]—OC$_8$H$_{17}$ | 16.7 |
| 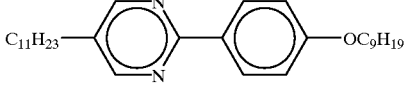 C$_{10}$H$_{21}$—[pyrimidine]—[phenyl]—OC$_6$H$_{13}$ | 16.6 |
|  C$_9$H$_{19}$—[pyrimidine]—[phenyl]—OC$_6$H$_{13}$ | 16.8 |

The phase transition temperatures of composition (B) were as follows.

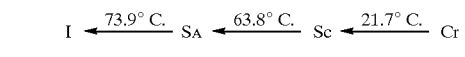

$$I \xleftarrow{73.9°\text{C.}} S_A \xleftarrow{63.8°\text{C.}} S_C \xleftarrow{21.7°\text{C.}} Cr$$

To liquid crystal composition (B) was added the optically active compound synthesized in Example 1 to obtain a ferroelectric liquid crystal composition.

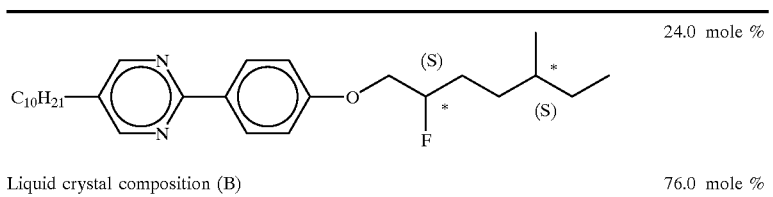 24.0 mole %

Liquid crystal composition (B)   76.0 mole %

The resulting composition had the following phase transition behavior.

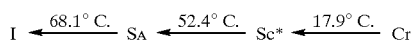

Characteristics as a liquid crystal optoelectronic element are shown below. It is seen that the element has an extremely fast response time.

| Measuring Temperature (° C.) | Ps (nC/cm²) | Tilt Angle (°) | Response Time (μsec) |
|---|---|---|---|
| Tc-5 | 10.1 | 11 | 3.8 |
| Tc-10 | 13.1 | 13 | 6.8 |
| Tc-15 | 15.2 | 14 | 8.8 |
| Tc-20 | 17.1 | 14 | 10.4 |

COMPARATIVE EXAMPLE 5

The following known compound was added to liquid crystal composition (B) to obtain a ferroelectric liquid crystal composition.

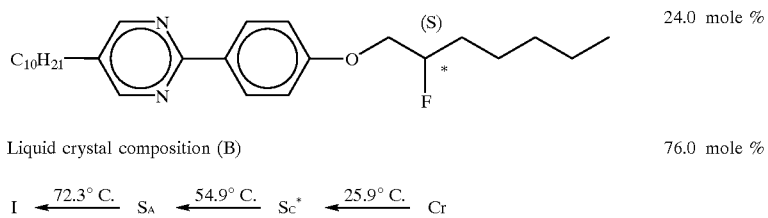 24.0 mole %

Liquid crystal composition (B)   76.0 mole %

I ←72.3° C.— S_A ←54.9° C.— S_C* ←25.9° C.— Cr

| Measuring Temperature (° C.) | Ps (nC/cm²) | Tilt Angle (°) | Response Time (μsec) |
|---|---|---|---|
| Tc-5 | 7.8 | 12 | 9.2 |
| Tc-10 | 10.0 | 13 | 12.0 |
| Tc-15 | 11.8 | 13 | 13.8 |
| Tc-20 | 13.4 | 14 | 15.4 |

On comparing Example 26 with Comparative Example 5, it is proved that the compound according to the present invention has a larger Ps and a faster response time.

As described and demonstrated above, the optically active compounds according to the present invention, when used as a ferroelectric liquid crystal, exhibit a low viscosity and provide optoelectronic elements having a very fast response time. Further, since the compounds of the invention show a chiral nematic phase whose helical pitch has very small temperature dependence, they are useful as a ferroelectric liquid crystal or as a chiral dopant for nematic liquid crystals.

Furthermore, a liquid crystal composition obtained by mixing the optically active compound of the present invention and a known compound showing a smectic C phase exhibits electro-optic effects at a very fast time and is extremely useful in electro-optic elements using liquid crystals, optical shutter arrays, and the like.

While the invention has been described in detail and with reference to specific examples thereof, it will be apparent to one skilled in the art that various changes and modifications can be made therein without departing from the spirit and scope thereof.

What is claimed is:

1. An optically active compound represented by formula (I):

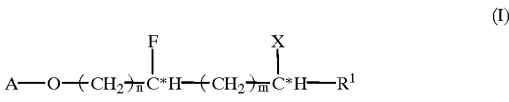

wherein A represents

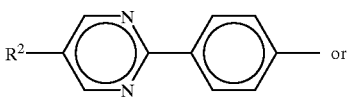

-continued

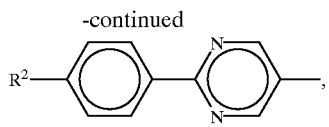

wherein R² represents an alkyl group having from 8 to 12 carbon atoms; R¹ represents a straight chain alkyl group having from 2 to 5 carbon atoms; X represents a methyl group; n represents 1 or 2; m represents an integer of from 0 to 3; and C* represents an asymmetric carbon atom.

2. A liquid crystal composition containing at least one compound represented by formula (I):

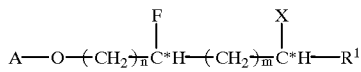 (I)

wherein A represents

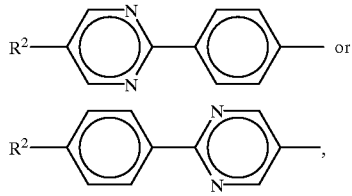

wherein R² represents an alkyl group having from 8 to 12 carbon atoms; R¹ represents a straight chain alkyl group having from 2 to 5 carbon atoms; X represents a methyl group; n represents 1 or 2; m represents an integer of from 0 to 3; and C* represents an asymmetric carbon atom.

3. A liquid crystal electro-optic element comprising a liquid crystal composition containing at least one compound represented by formula (I) as a chiral dopant:

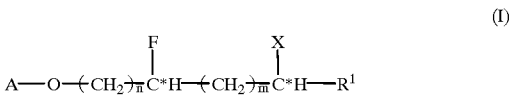 (I)

wherein A represents

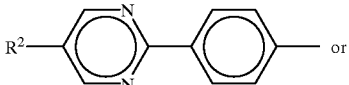

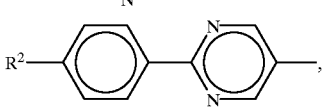

wherein R² represents an alkyl group having from 8 to 12 carbon atoms; R¹ represents a straight chain alkyl group having from 2 to 5 carbon atoms; X represents a methyl group; n represents 1 or 2; m represents an integer of from 0 to 3; and C* represents an asymmetric carbon atom.

* * * * *